US011549837B2

(12) United States Patent
Klicpera

(10) Patent No.: US 11,549,837 B2
(45) Date of Patent: Jan. 10, 2023

(54) WATER METER AND LEAK DETECTION SYSTEM

(71) Applicant: Michael Edward Klicpera, La Jolla, CA (US)

(72) Inventor: Michael Edward Klicpera, La Jolla, CA (US)

(*) Notice: Subject to any disclaimer, the term of this patent is extended or adjusted under 35 U.S.C. 154(b) by 0 days.

(21) Appl. No.: 16/356,870

(22) Filed: Mar. 18, 2019

(65) Prior Publication Data
US 2019/0234786 A1 Aug. 1, 2019

Related U.S. Application Data

(63) Continuation-in-part of application No. 15/016,178, filed on Feb. 4, 2016, now Pat. No. 10,410,501.

(60) Provisional application No. 62/795,529, filed on Jan. 22, 2019, provisional application No. 62/646,339, filed on Mar. 21, 2018.

(51) Int. Cl.
*G01M 3/26* (2006.01)
*G01F 15/063* (2022.01)
*G01F 15/02* (2006.01)

(52) U.S. Cl.
CPC .......... *G01F 15/063* (2013.01); *G01F 15/022* (2013.01); *G01M 3/26* (2013.01)

(58) Field of Classification Search
CPC ............ E03B 7/071; E03B 7/003; E03B 7/12; E03B 7/10; E03B 7/072; E03B 7/07; G01F 25/0007; G01F 25/00; F16K 31/02; F16K 31/002; G06Q 50/06
See application file for complete search history.

(56) References Cited

U.S. PATENT DOCUMENTS

| | | |
|---|---|---|
| 2,283,525 A | 5/1942 | Witham |
| 4,949,976 A | 7/1990 | Gastouniotis |
| 5,284,523 A | 2/1994 | Badami et al. |
| 5,298,894 A | 3/1994 | Cerny |
| 5,580,791 A | 12/1996 | Thorpe |
| 5,636,653 A | 6/1997 | Titus |
| 5,660,198 A | 8/1997 | McClaran |

(Continued)

OTHER PUBLICATIONS

The Evolution of 801.11 Wireless Security, Benton, Apr. 8, 2010 (Year: 2010).*

*Primary Examiner* — Benyam Haile
(74) *Attorney, Agent, or Firm* — Michael E. Klicpera

(57) ABSTRACT

The present invention is a water meter and leak detection system that has a private or public property(ies) facility water supply interruption system. The system is comprised of a water meter collection node system with shut-off/on mechanism that has wireless Bluetooth, Bluetooth low energy, Zigbee, Z-wave LoRa, Wi-Fi, radio frequency and cellular technology with a private or corporate network, or internet connection that transfer water parameter data to a remote computer or server. Or the system can consist of a water meter collection node that communicates by Bluetooth, Bluetooth low energy, Zigbee, Z-wave LoRa, Wi-Fi, radio frequency and cellular technology with a data communication hub whereby the communication hub is in wired or wireless communication with an internet router that communicates with an internet connection, or with a private or commercial network system, to a remote computer/server or a cloud-computing commercial service.

51 Claims, 13 Drawing Sheets

(56) References Cited

U.S. PATENT DOCUMENTS

| | | |
|---|---|---|
| 5,719,564 A | 2/1998 | Sears |
| 5,971,011 A | 10/1999 | Price |
| 6,105,607 A | 8/2000 | Caise |
| 6,181,257 B1 | 1/2001 | Meek |
| 6,246,677 B1 | 6/2001 | Nap |
| 6,397,687 B1 | 6/2002 | Gamas |
| 6,539,968 B1 | 4/2003 | White |
| 6,543,479 B2 | 4/2003 | Coffee et al. |
| 6,556,142 B2 | 4/2003 | Dunstan |
| 7,012,546 B1 | 3/2006 | Zigdon |
| 7,103,511 B2 | 9/2006 | Petite |
| 7,124,452 B1 | 10/2006 | Bauza |
| 7,360,413 B2 | 8/2008 | Jeffries et al. |
| 7,605,717 B2 | 10/2009 | Olson |
| 7,626,511 B2 | 12/2009 | Lazar |
| 7,711,796 B2 | 5/2010 | Gutt et al. |
| 8,013,732 B2 | 9/2011 | Petite |
| 8,073,931 B2 | 12/2011 | Dawes et al. |
| 8,086,702 B2 | 12/2011 | Baum et al. |
| 8,086,703 B2 | 12/2011 | Baum et al. |
| 8,122,131 B2 | 2/2012 | Baum et al. |
| 8,209,400 B2 | 6/2012 | Baum et al. |
| 8,214,496 B2 | 7/2012 | Gutt et al. |
| 8,217,804 B2 | 7/2012 | Laughlin-Parker |
| 8,269,651 B2 | 9/2012 | Zigdon |
| 8,335,842 B2 | 12/2012 | Raji et al. |
| 8,451,986 B2 | 5/2013 | Cohn et al. |
| 8,473,619 B2 | 6/2013 | Baum et al. |
| 8,477,011 B2 | 7/2013 | Tubb et al. |
| 8,478,844 B2 | 7/2013 | Baum et al. |
| 8,478,871 B2 | 7/2013 | Gutt et al. |
| 8,539,827 B2 | 9/2013 | Benson |
| 8,602,384 B2 | 12/2013 | Williamson |
| 8,612,591 B2 | 12/2013 | Dawes et al. |
| 8,621,206 B2 | 12/2013 | Chang |
| 8,625,722 B2 | 1/2014 | Rouquette |
| 8,635,499 B2 | 1/2014 | Cohn et al. |
| 8,638,211 B2 | 1/2014 | Cohn et al. |
| 8,644,804 B2 | 2/2014 | Blackwell |
| 8,713,132 B2 | 4/2014 | Baum et al. |
| 8,819,178 B2 | 8/2014 | Baum et al. |
| 8,825,871 B2 | 9/2014 | Baum et al. |
| 8,833,390 B2 | 9/2014 | Ball |
| 8,836,467 B1 | 9/2014 | Cohn et al. |
| 8,878,690 B2 | 11/2014 | Olson |
| 8,963,713 B2 | 2/2015 | Dawes et al. |
| 8,988,221 B2 | 3/2015 | Raji et al. |
| 8,996,665 B2 | 3/2015 | Baum et al. |
| 9,019,120 B2 | 4/2015 | Broniak |
| 9,047,753 B2 | 6/2015 | Dawes et al. |
| 9,059,863 B2 | 6/2015 | Baum et al. |
| 9,100,446 B2 | 8/2015 | Cohn et al. |
| 9,141,276 B2 | 9/2015 | Dawes et al. |
| 9,144,143 B2 | 9/2015 | Raji et al. |
| 9,147,337 B2 | 9/2015 | Cohn et al. |
| 9,172,553 B2 | 10/2015 | Dawes et al. |
| 9,253,754 B2 | 2/2016 | Sanderford |
| 10,267,651 B2 | 4/2019 | Pedreiro |
| 10,520,333 B2 | 12/2019 | Comfort |
| 2003/0192600 A1* | 10/2003 | Ford ................ E03B 7/071 137/624.12 |
| 2003/0210151 A1 | 11/2003 | Kimberlain et al. |
| 2003/0227387 A1 | 12/2003 | Kimberlain et al. |
| 2003/0233885 A1 | 12/2003 | Bird et al. |
| 2004/0069345 A1 | 4/2004 | Doan |
| 2004/0128034 A1* | 7/2004 | Lenker ................ G05D 7/0635 700/282 |
| 2004/0193329 A1 | 9/2004 | Ransom |
| 2004/0226614 A1* | 11/2004 | Lane ................ E03B 7/071 137/487.5 |
| 2005/0065755 A1 | 3/2005 | Mccarter et al. |
| 2008/0001104 A1 | 1/2008 | Voigt |
| 2008/0183842 A1 | 7/2008 | Raji et al. |
| 2008/0149180 A1 | 8/2008 | Parris |
| 2008/0295895 A1 | 12/2008 | Vincent |
| 2009/0090663 A1 | 4/2009 | Hirata et al. |
| 2009/0096586 A1 | 4/2009 | Tubb |
| 2009/0165866 A1* | 7/2009 | Fima ................ F16K 5/0605 137/551 |
| 2009/0215110 A1 | 8/2009 | Gibson et al. |
| 2009/0303055 A1 | 12/2009 | Anderson et al. |
| 2010/0082744 A1 | 4/2010 | Raji et al. |
| 2010/0156632 A1* | 6/2010 | Hyland ................ G01N 33/0075 702/188 |
| 2010/0207017 A1 | 8/2010 | Horiuchi et al. |
| 2011/0035063 A1 | 2/2011 | Palayur |
| 2012/0030460 A1 | 2/2012 | Chang |
| 2012/0233885 A1 | 2/2012 | Chang |
| 2014/0082351 A1 | 3/2014 | Chang |
| 2014/0279712 A1* | 9/2014 | Ortner ................ G06Q 30/0283 705/412 |
| 2015/0046131 A1* | 2/2015 | Fei ................ G06Q 50/06 703/2 |
| 2015/0249588 A1* | 9/2015 | Leon ................ H04L 43/0876 709/204 |
| 2015/0276238 A1* | 10/2015 | Matsuoka ................ F24F 11/00 700/278 |
| 2016/0041565 A1* | 2/2016 | Edwards ................ G05B 15/02 700/282 |
| 2016/0161310 A1* | 6/2016 | Leaders ................ G01F 1/663 702/48 |
| 2016/0335875 A1* | 11/2016 | Alcorn ................ G01F 1/34 |
| 2016/0342379 A1* | 11/2016 | Keipert ................ H04N 5/4403 |
| 2017/0023434 A1* | 1/2017 | Jerez ................ G01M 3/2815 |
| 2017/0184417 A1* | 6/2017 | Pedreiro ................ G01D 4/002 |
| 2017/0238072 A1* | 8/2017 | Mackie ................ G01D 4/004 340/870.03 |
| 2017/0285665 A1* | 10/2017 | Nunally ................ E03B 7/071 |
| 2017/0335550 A1* | 11/2017 | Sterling ................ E03B 7/072 |
| 2018/0230681 A1 | 8/2018 | Poojary |
| 2018/0302698 A1 | 10/2018 | Comfort |

* cited by examiner

Water Use

Average Time: [ 10 ▼ ] minutes

Average Water Use: [ 25 ▼ ] gallons / minute

Average Cost: $ [ 2.00 ▼ ] / 1000 gallons

Water Heater Use

Energy Type: [ Natural Gas ▼ ]

State: [ California ▼ ]

Cost: $ [ 1.789 ▼ ] per therm

Efficiency: [ .927 ▼ ]

Water Temp: [ 55 ▼ ] °F

Temperature: [ Hot ▼ ]

Water Use (gallons)

|  | Day | Week | Month | Year | Five Year |
|---|---|---|---|---|---|
| Water | 25 | 175 | 750 | 9125 | 45625 |
| Energy | 0.194 | 1.359 | 5.824 | 70.858 | 354.290 |

Water Cost

|  | Day | Week | Month | Year | Five Year |
|---|---|---|---|---|---|
| Water | $0.05 | $0.35 | $1.50 | $18.25 | $91.25 |
| Energy | $0.23 | $1.60 | $6.87 | $83.54 | $417.71 |
| Total | $0.28 | $1.95 | $8.37 | $101.79 | $508.96 |

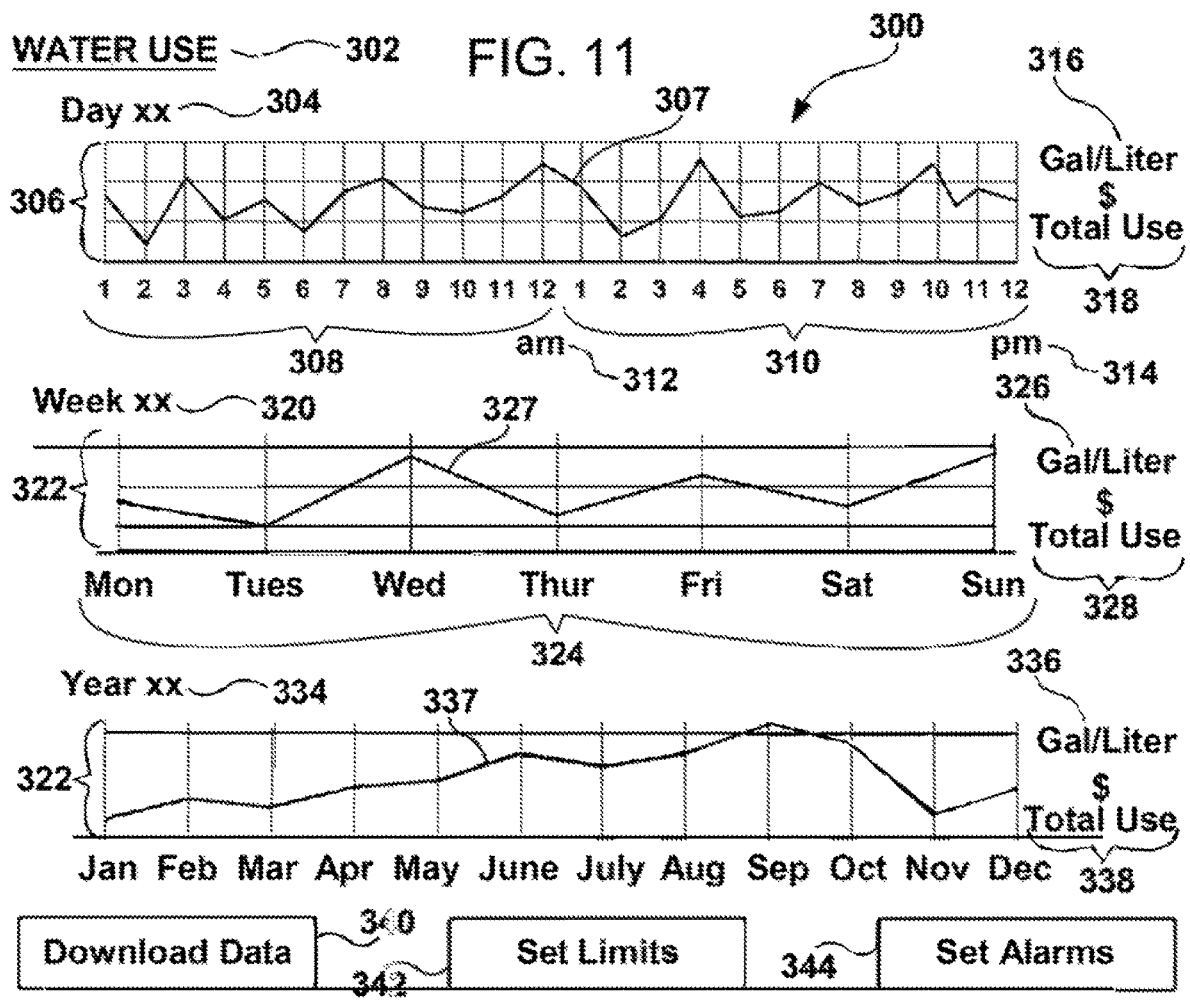
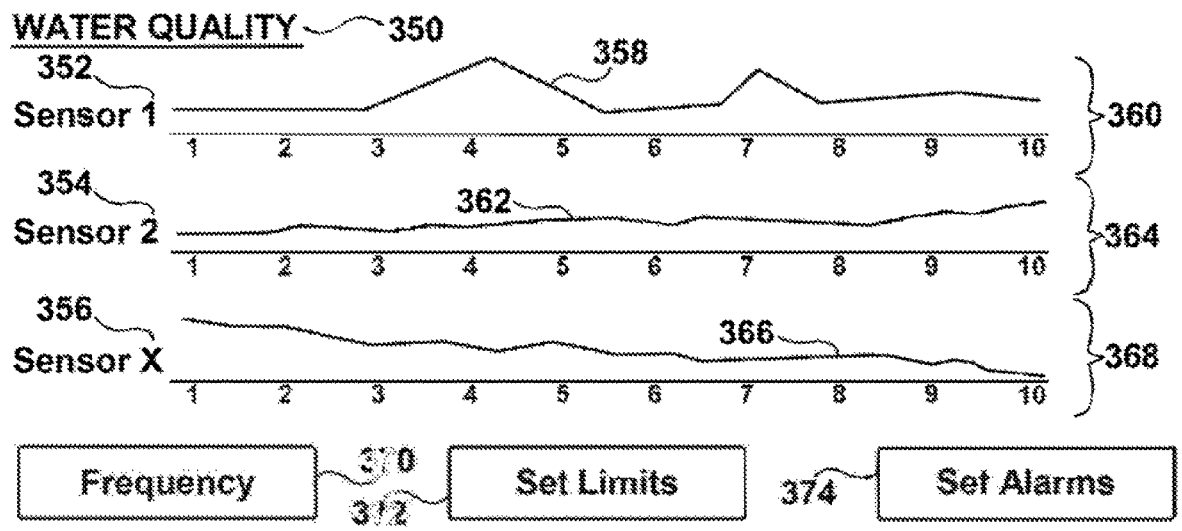
FIG. 11

WATER METER AND LEAK DETECTION SYSTEM

RELATED APPLICATIONS

This application is a continuation-in-part of U.S. patent application Ser. No. 15/061,178 filed on Feb. 4, 2016 and is incorporated herein by this reference. This Applicant claims priority from Provisional Patent Application No. 62/646,339 filed on Mar. 21, 2018 entitled "Water Meter and Leak Detection System" and Provisional Patent Application No. 62/795,529 filed on Jan. 22, 2019, both of which are incorporated by reference herein its entirety.

FIELD OF THE INVENTION

This apparatus and the method of use relates to water supply systems. More particularly, the invention relates to a water meter and leak detection system for private and/or public property(ies) to monitor and provide water use and water leak information and to minimize water loss and related damage.

BACKGROUND OF THE INVENTION

Water is increasingly becoming a precious resource. While fresh water supplies have been challenged due to climate (short rainy seasons and long droughts) and increased pollution, water demand has been rising due to the growing population along with increased development. The increasingly limited supply of fresh water is a humanitarian concern and water conservation is becoming a major issue for many communities. An apparatus for real-time monitoring of water use and real-time detection of leak conditions at private and/or public property(ies) (e.g., residential structures and yards, business/industrial/commercial facilities, and governmental/institutional sites) can be useful in assessing and controlling water resources and supporting water conservation.

Water losses to private and/or public properties caused by broken or compromised water pipes and by unobserved leaks are enormous. Broken or compromised water pipes are often underground and are undetected, or, for example, when the property owner is absent or sleeping, and the resulting water loss and property damage can be catastrophic. Property insurance agencies report that a significant portion of total insurance losses are water related. It has been found that losses due to water leaks in residential homes amount to a significant percentage of the total water use.

SUMMARY OF THE INVENTION

The water meter and leak detection System monitors real-time water use and provides real-time leak detection with notification for private and/or public property(ies) (e.g., residential structures and yards, business/industrial/commercial facilities, and/or governmental/institutional sites). The water meter and leak detection system connects in series to the water supply for one or more private and/or public properties. This invention comprises a water meter collection node and an optional communication hub or receiving station. The collection node is essentially a water meter which can include: one or more water flow rate sensors, one or more optional control valves, one or more optional temperature sensors, one or more optional pressures sensors, one or more optional acoustic sensors, and wireless radio technology. Use of the optional communication hub or receiving station provides longer wireless range capability. The water meter collection node with or without the optional communication hub or receiving station can utilize long range wireless technology [LoRa, Sigfox, WiMAX, Ultra Narrow Band (UNB), 6LoWPAN, standard WiFi and WiFi3 (with Wi-Fi extenders)], limited range technology [Bluetooth, Bluetooth low energy (BLE), Zigbee and Z-wave], other wireless technology, wired and wired technology [X10, universal powerline bus (UPB), HART Communications Protocol], established cellular technology [3GPP, LTE-M, NB-IoT, and 5G], and any combinations thereof.

In one embodiment, the water meter collection node utilizes a LoRa, WIMAX, 6LoWPAN, ultra narrow band (UNB), or NB-IoT radio that communications with the optional communication hub or receiving station that has a corresponding LoRa, WiMAX, 6LoWPAN, ultra narrow band (UNB), or NB-IoT radio that communications with the collection node, and the optional communication hub has a second radio with a Wi-Fi or Wi-Fi3 technology that communicates with a wireless router. In addition, the communication hub can be hard-wired to a wireless router using the ethernet ports. Bluetooth, Bluetooth low energy {BLE), Zigbee or Z-Wave can also be used for shorter range communications. The wireless communication technology can utilize and communicate with an application programming interface (API) protocol, a simple object access protocol (SOAP), a representational state transfer (REST} protocol, or another API technology. The API interface is software code that allows two programs to efficiently communicate with each other for website presentation. The wireless technology is in duplex format as water use monitoring transmits water use data to a remote server while the leak detection capability needs to send a signal to control the water control valve. The long range wireless technology (LoRa, Sigfox, WiMAX, UNB, 6LoWPAN, NB-IoT, standard Wi-Fi and Wi-Fi3 (with Wi-Fi extenders), limited range technology (Bluetooth, BLE, Zigbee and Z-wave), wired technology (X10, UPS, HART Communications Protocol), established cellular technology (3GPP, NB-IoT, LTE-M), and any combinations thereof transfers data through a private or corporate network system or through a router connected to the internet. These methods of transfer communicate water use, water leaks, and/or water quality data to remote server(s) with database(es) The water meter and leak detection system is connected to the water supply piping using a continuous, water flow event use (basis), or on a demand basis for monitoring water use from the main water supply line used within a private and/or public property{ies}. The present invention can be used with private and/or public water sources such as public municipalities and/or private wells and other non-municipal related water sources. The remote server and database can be used to support a computer portal that designated or registered users or owners can access water use data and/or leak detection information on a cell or smart phones, computers, or similar apparatuses can use to access and observe water use, leak conditions, and/or water quality parameters for relevant private and/or public property(ies).

The housing of the water meter and leak detection system collection node and optional communication hub or receiving station can be fabricated from materials and can use technologies that provide protection for moist and wet conditions, hot environments and cold/freezing situations. The water meter and leak detection system includes a central processing unit (CPU), microprocessor and/or microcontroller, data storage, timing and wireless circuitry, water flow rate sensors, optional water quality sensors, optional pressure sensors, optional acoustic sensors, and a power generation means. The types of water flow rate sensor(s) can be invasive (i.e. within water pipe; e.g. turbine sensor), non-invasive (i.e. outside water pipe; e.g. ultrasonic sensor), and/or sensitive water flow sensors (e.g. pressure sensor). The water meter and leak detection system has the capability to utilize several different sensors to accomplish the goals of real-time monitoring water use and detecting leaks. Furthermore, the water meter and leak detection system can monitor separately indoor and outdoor water use or can monitor one or more designated areas of one or more sites. Optionally, a temperature sensor can be incorporated into the water meter collection node to determine, communicate, and address temperature conditions, e.g. assess freezing conditions (water temperature is approaching 32 degrees Fahrenheit or 0 degrees Celsius) and communicate with the property structure's thermostat or heating system to maintain a specified temperature within the structure, drain water from pipes, and/or perform other damage protection techniques. The optional pressure sensor, with associated use of the control valve, can be used for detecting [very] extremely small leaks. This is accomplished by shutting off the water supply with the control valve and monitor pressure over time. The resulting loss of pressure can generate graphical curves or charts that demonstrate that type of small leak, e.g. leaking faucet, leaking toilet flapper valve. The pressure sensor can also be used to detect pressure fluctuations during standard flow conditions.

The water meter and leak detection system with control valve(s) can be shut-off/on manually or be programmed to automatically turn off the water control mechanism. when a leak is detected, or program for a schedule using a cell or smart phone, computer, or other electronic apparatus. The water meter and leak detection system can be programmed to follow a work, vacation, leak monitoring or other schedule. The water meter and leak detection system can be set to automatically shut-off when the private and/or public property{ies} is unoccupied or vacant. The occupancy of the private and/or public property(ies) can be determined by feedback from electronic lock{s}, passive infrared sensor(s) (PIRs), alarm(s), security system(s), or other security devices. Furthermore, the water meter and leak detection system is designed with electrical and communication circuitry to send a signal to the cell or smart phone, computer, or other electronic apparatus that the water supply line is on or off.

The water meter and leak detection system provides wireless remote leak detection notification using water event or water event basis monitoring and software analysis. Alternately, continuous data monitoring can be stored in a data module in the water meter collection node and periodically transferred wirelessly to a remote computer or server as described herein. The water meter and leak detection system monitors water use and detects non-typical, abnormal, or continuous water use and alerts, signals, or messages via a cell or smart phone, computer, or other electronic apparatus to one or more property owners, users, or responsible individuals of any water leak condition(s). Thus, leak notification can be provided when the property (ies) is vacated or unsupervised.

The water meter and leak detection system's collection node communicates through a private or commercial network system or communicates with the optional communication hub or receiving station and through a router to the internet.

The water meter and leak detection system's collection node with water shut-off/on mechanism can be battery operated and can utilize re-chargeable batteries or super capacitators. The re-chargeable components can be connected to electricity generation means such as a water turbine generator(s), solar cell(s), or wind generation means to supplement electrical energy. The Water Meter and Leak Detection System with shut-off/on mechanism can also be AC or DC powered.

Finally, many other features, objects and advantages of the present invention will be apparent to those of ordinary skill in the relevant arts, especially considering the following discussions, drawings, detailed descriptions and claims.

BRIEF DESCRIPTION OF THE DRAWINGS

FIG. 1 also shows several methods of wireless capability for the water meter and leak detection system to communicate water use and leak detection information to a conveniently located cell or smart phone, computer, or similar apparatus. FIG. 1 shows wireless communication for the property owner and/or municipal representative using a custom display/recorder for a governmental, civil, commercial or municipal operators or agencies. In one example, FIG. 1 shows a wireless means for communicating directly to a home owner, or offsite central monitoring computer using long range wireless technology and/or telephone lines via satellite, microwave technology, the internet, cell tower, telephone lines, and other similar technology.

FIG. 2 shows a hot-water and a cold/ambient water input and a hot water and cold/ambient water output for monitoring hot and cold water (water energy). But FIG. 2 also represents (but not shown) a single cold or ambient water input and a cold or ambient water output.

FIG. 10 is an illustration of an "APP" or programmed application that provides water use data in various example formats that is transferred from the water meter collection node or with optional communication hub or receiving station to a remote display/recording apparatus, or to a remote computer/server that allows access to a registered user of a cell or smart phone, computer, or similar electronic apparatus.

FIG. 11 is an illustration of another "APP" or programmed application, or another page of an "APP" or programmed application the displays water use data in another format that is transferred from the water meter collection node or with optional communication hub or receiving station to a remote display/recording apparatus, or to a remote computer/server that allows access to a registered user of a cell or smart phone, computer, or similar electronic apparatus.

Figure 1:
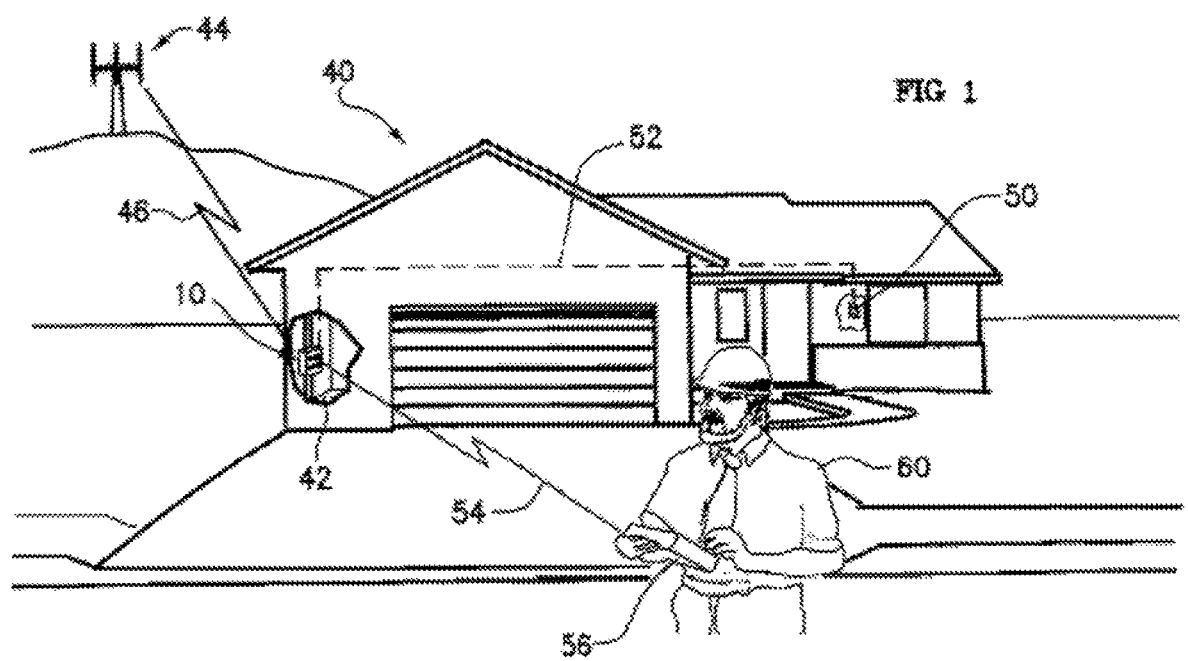
FIG. 1 is an illustration of the embodiment comprising a water meter and leak detection system connected in series to the water supply piping to monitor water use and detect leak(s) for an example property, a residential structure.

The figures are not intended to be exhaustive or to limit the disclosed technology to the precise form disclosed. It should be understood that the disclosed technology can be practiced with modification and alteration, and that the disclosed technology be limited only by the claims and the equivalents thereof.

DESCRIPTION OF THE PREFERRED EMBODIMENTS

The following description is non-limiting and is made merely for the purpose of describing the general principles of the disclosed embodiments. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Water Use refers to the total volume or volume of water used over a period of time.

Water flow event or water flow event basis is defined as monitoring and sensing the initiation of water flow until the water flow is stopped, whereby the water flow rate, the duration of water flow, and the total water volume can be calculated and recorded. The water flow event will inherently save CPU and wireless transmission energy by not recording or transmitting no water use data and allowing the CPU or microprocessor to go into a sleep mode between each water event use thereby providing a superior method for analyzing water signatures and patterns for reliable discernment of leak and leak locations.

Private and/or public property(ies) refers to the structure(s), site(s), area(s), land(s), and/or location(s) whether indoor, outdoor, or a combination thereof that is/are owned, controlled, used by or designated for use by any type of entity(ies) (i.e. personal, residential, commercial, corporate, business, industrial, establishment, government, administrative, institutional, organizational, etc.). Examples include but are not limited to homes and yards, office buildings, commercial structures and grounds, farming lands, government or institutional facilities, multi-unit apartments, condominiums or townhomes, hospitals, dormitories, university or corporate campuses, water or irrigation system defined areas, water wells, sports fields, exercise facilities, parks, golf courses, home owner association (HOA) areas, and military bases.

Authentication refers to the technology that confirms or ensures that a message(s), control/command signal(s), data, and/or information that is downloaded and/or transferred from one person or device to another that is received only by the intended person or device. One example of an authentication method is the Challenge Handshake Authentication Protocol (CHAP) which provided authentication technology to a user communication with a network entity, which may be any remote private or corporate server and/or the Internet using a service provider (e.g. ATT U-verse, Xfinity/Comcast) CHAP provides users authenticated passwords when accessing remote servers, which also are authenticated prior to allowing the user access. For example, short distance wireless technology Bluetooth, Bluetooth low energy, Zigbee, Z-wave and Wi-Fi short range wireless technologies can be used for an authentication pairing procedure to initially establish remote wireless communications. Such authentication pairing procedure can be inputting a Service Set Identifier (SSID) and password which can include two factor authentication.

In the water meter environment, encryption refers to a privacy technology that uses a process of encoding which prevents any individual mobile communication device or water meter but the intended recipient mobile communication device or water meter to access, download, read, or review a message(s), control/command signal(s), data, and/ or information by providing a confidential transfer between the individual, mobile communication device or water meter one or more sensors transferring data or information to a remote computer or server.

In the water meter context, integrity refers to technology that ensures that a message(s), control/command signal(s), data, and/or information transferred from a water meter to another meshing water meter, or to a remote computer or mobile communication device (cell phone), is not altered, compromised, or corrupted, completely lost or having partially lost segments, during transmission or when accessed or downloaded.

In the water meter environment, non-repudiation refers to the technology that confirms or ensure and prevents a sender or receiver from denying that a message(s), control/command signal(s), data, and/or information was sent or received. Block chain technology is an upcoming technology that will ensure non-repudiation compliance.

Cellular format technology refers to all current and future variants, revisions and generations [e.g. third generation (3G), fourth generation (4G) and 3GPP (and enhancement revisions), fifth generation (5G), 3GPP cellular technology, all future generations of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiNAX, LTE, Flash-OFDM, HIPERMAN, WiFi, IBurst, UMTS, W-CDMA, BSPDA+HSUPA, UNTS-TDD, other formats for utilizing cell or smart phone technology, telephony antenna distributions, and/or any combinations thereof] and includes the use of satellite, microwave technology, the internet, cell tower, telephony, and/or public switched telephone network lines.

Cell or art phones, computers, or other electronic apparatuses includes all cellular phones and mobile electronic communication devices (with cellular equipment, public switched telephone network lines, satellite, and/or mesh technology); personal digital assistants (PDAs); tablets (refers to all current and variants, revisions, and generations of the APPLE™, SAMSUNG™, HP™, ACER™, MICROSOFT™, NOOK™, GOOGLE™, SONY™, KINDLE™ and other tablets manufactured by these and other manufacturers); APPLE IPOD TOUCH™; smart or internet capable televisions; wireless timepieces or wireless watches; other electronic apparatuses with Wi-Fi and wireless capability; remote computers and controllers having internet, cellular technology, Wi-Fi, ZigBee, Bluetooth, Bluetooth low energy (BLE), and any combinations thereof.

LoRa, also known as LoRaWan (and referred to as "LoRa" herein) comprises a low-power wide area and long-range network protocol based on Semtech or HopeRF LoRa technology for IoT devices, and LoRa networks and machine-to-machine (M2M) applications. LoRa uses chirp spread spectrum (CSS) technology developed by the company Semtech. Chirp spread spectrum modulation, which is like Frequency Shifting Keying (FSK) modulation, but it increases the communication range significantly. Chirp spectrum uses its entire allocated bandwidth to broadcast a signal. Because the chirp spectrum utilize a broad band of the spectrum, chirp spread spectrum is also resistant to multi-path fading even when operating at very low power. Also, chirp spread spectrum is resistance to Doppler effect, which is typical in radio applications. LoRa focuses on secure bi-directional communications in an asynchronous protocol that is designed for long wireless range with extended battery life. LoRa manufacturers use the entire allocated bandwidth to broadcast a communication or signal, making the LoRa protocol robust to minimize channel noise and excellent at handling interference and overlapping networks. The LoRa protocol provides interoperability among smart devices without the need of complex local installations. LoRa network architecture is based on a star-of-stars topology with gateways as a transparent bridge relaying messages between end-devices and a central network server in the backend. Existing gateways are connected to the network server via standard internet protocol connections while end-devices use single-hop wireless communication to one or many gateways. All communication is generally bi-directional or duplex format, but also supports multicast operations for enabling software upgrades or mass distribution messages to reduce the on-air communication time. Communication between end-devices and gateways is spread out on different frequency channels and data rates. The selection of the data rate is a trade-off between communication range and message duration. Due to the spread spectrum technology, communications with different data rates do not interfere with each other and create a set of "virtual" channels increasing the capacity of the gateway. LoRa data rates range from 0.3 kbps to 50 kbps. To maximize both battery life of the end-devices and overall network capacity, the LoRa network server can manage the data rate and radio frequency output for each end-device individually by means of an adaptive data rate (ADR) scheme. The LoRa technology offers high penetration, low bandwidth, low energy, long range wide area, and secure data that is gaining significant traction penetration into the IoT networks.

The LoRa wireless system makes use of the unlicensed frequencies below 1 GHz that are available worldwide:
  868 MHz for Europe
  915 MHz for North America
  433 MHz band for Asia Using lower frequencies than those of the 2.4 or 5.8 GHz ISM bands enables much better coverage to be achieved especially when the nodes are within buildings enabling superior penetration of large buildings and penetrate solid walls.

Lora's main and upcoming competitor is Sigfox which employs the differential binary phase-shift keying (DBPSK) and the Gaussian frequency shift keying (GFSK) that enables communication using ISM radio bands 868 MHz in Europe and 902 MHz in the United States. Sigfox utilizes a wide-reaching signal that passes freely through solid objects and is considered to be a "Low-power Wide-area network" or LPWAN. The Sigfox signal can also be used to easily cover large areas and to reach underground objects. Presently Sigfox technology is being installed and utilized throughout the world as a wireless platform for IoT communications.

With traditional Wi-Fi, most networks were designed on the ranges delivered by 802.11 standard operating frequencies 2.4 and 5.8 GHz and protocol for distance and performance. Newer Wi-Fi technology being developed is known as WiFi3. In the foreseen near future, companies like Edgewater Wireless will develop and market Wi-Fi3 powered technology that will deliver reliable, high-capacity indoor and outdoor Wi-Fi wireless communication and protocols for high-density environments. The high channel density will enable multiple channels of a single chip meaning aggregate output on a single Wi-Fi3 enabled device will outperform traditional, single channel Wi-Fi technology.

Thus, the fewer access points will deliver higher quality of service that can considerably lower the cost of deployment of IoT devices. Remote and rural infrastructure installations are easily achievable due to the extended network coverage and performance capabilities of Wi-Fi3.

WiMAX refers to interoperable implementations of the IEEE 802.16 family of wireless-networks standards ratified by the WiMAX Forum. Wireless WiMAX suffers like most other wireless technology that the further away from the source the slower their connection becomes. The WiMAX Forum has proposed an architecture that defines how a WiMAX network can be connected with an IP based network. WiMAX Forum published three licensed spectrum profiles: 2.3 GHz, 2.5 GHz and 3.5 GHz, to establish standardization.

Ultra Narrow Band (UNB) refers to technology that transmits over a very narrow spectrum (for example less less than 1 KHz) to achieve ultra-long range for data communication between a sensor collection node transmitter or a communication between a sensor collection node transmitter and a communication receiving hub. By transmitting in a UNB channel, little power is required to transmit data over a considerable distance. UNB systems are frequently used in one-way, half duplex e.g. from collection node sensor(s) to an optional communication hub but can mimic two-way full duplex communication when the receiver/sensor is sleeping most of the time and must open once a few times each hour to listen for signal commands or messages.

The goal of the NB-IoT is another wireless technology designed to address the needs for very low data rate devices that need to connect to mobile networks, and often powered by battery power. Because NB-IoT is a cellular-based wireless technology that uses orthogonal frequency division multiplexing (OFDM) modulation, the chips are more complex to manufacture. Using typical cellular technology to obtain a high level of performance is penalized with an increase cost associated with involved tower installations and greater power consumption. NB-IoT is similar to Sigfox and LoRa but has a much faster modulation rate that can handle a lot more data than those Sigfox and LoRa technologies. However, NB-IoT is not an IP-based communication protocol A user can usually not communicate or access an IP network with NB-IoT or expect to use it with an APP running on a cell phone or smartphone. It was made for simple IoT applications and is more power efficiency.

6LoWPAN is an acronym that combines the new Internet Protocol (IPv6) with a sub 1 GHz frequency and low power wireless personal area networks. The 6LoWPAN supports hundreds of hops for developing wireless mesh networks with high self-healing (node failure) and self-maintenance of mesh routes. The 6LoWPAN architecture consists of a local network with routers/servers which utilizes a one or more edge router(s) to connect to the access network. The one or more edge router(s), communicating with the internal servers, then provides the IoT sensor and applications to access to the internet. IPv6 is also in use on the smart grid network enabling smart meters (water meter and leak detection systems) and other devices to build a micro mesh network before sending the data back to the main remote servers with database for monitoring and billing operations.

Bluetooth Low Energy (BLE) refers to a newer version of standard Bluetooth. Standard Bluetooth was originally designed for continuous streaming of data applications. Both standard Bluetooth and BLE low energy operate in the 2.4 GHz ISM band. However, the BLE remains in a sleep mode constantly except for when a connection is initiated. The actual connection times are on a few milliseconds, unlike standard Bluetooth's continuous streaming. BLE short time connection allows for higher data transfer rates of approximately 1 Mb/s.

Cellular (3GPP) refers to refers to a $3^{rd}$ Generation. Partnership that formulated the original release 8 and the associated enhancements (9-14). The original LTE 4G release 8 included high peak data rates, up to 300 Mbps in downlink and 75 Mbps in uplink when using a 20 MHz bandwidth that includes high spectral efficiency and flexible bandwidths (1.4 MHz, 3 MHz, 5 MHz, 10 MHz, 15 MHz and 20 MHz), 5 millisecond latency for IP packets in ideal radio conditions, simplified Architecture, orthogonal frequency-division multiple access (OFDMA) in downlink and Single-carrier frequency-division multiple access scheme (SCFDMA) in uplink, all IP network, and using the multiple in and multiple out (MIMO) multiple antenna pattern.

The LTE Cat-MI (also known as LTE-M} technology is designed for Internet of Things (IoT) devices. The LTE-M has different data speeds, frequency spectrum, power usage and signal range. LTE-M trades in data rate for better power efficiency and longer signal range and is therefore considered an "Internet of Things" (IoT) cellular technology. The 5G connects directly to a network, without the typical node/computer network that passes traffic from a local network to other networks or the Internet router (a gateway). Devices can connect to 5G networks with microchips that are less expensive to fabricate because these microchips are half-duplex and have a narrower bandwidth. Such designed devices can enter a "deep sleep" mode called Power Savings Mode (PSM) and only wake up periodically while connected. Because the maximum data rate of LTE-Cat-Ml (LTE-M) and 5G devices is only about 100 kbits/s, these cellular protocols do not burden the typical cellular network. Cellular 5G version uses a system of cell sites that divide their territory into various sectors and send encoded data through radio waves. Each cell site must be connected to a network backbone, whether through a wired or wireless connection. 5G networks will use a type of encoding called orthogonal frequency-division multiplexing (OFDM), which includes an interface that will be designed for much lower latency and greater flexibility than LTE-M. The 5G networks differ from 4G networks by managing significantly more, smaller cells that can dynamically change their size and shape so 5G networks need to be more intelligent than previous systems like 4G. But with existing macro cells, 5G is expected to boost capacity by over current 4G systems by utilizing wider bandwidths and advanced antenna technologies.

Wired communication can be standard wired technology, such as X10, UPB and the HART Communication Protocol (Highway Addressable Remote Transducer). X10 is a protocol for communication among electronic devices primarily used in the home automation industry. It primarily uses the power line wiring for signaling and control, where the signals involve brief radio frequency bursts representing digital information that transmits along the previously installed home electrical wiring. Universal Powerline Bus is a proprietary software protocol for power line communications between devices and again used for primarily in the home automation industry. Household electrical wiring is used to send digital data between UPB devices using pulse position modulation. The newer UPB protocol is more reliable that the older X10 technology, which allowed the UPB protocol to significantly penetrate the wired market. Communication can be peer to peer with no central controller necessary. The HART Communication Protocol (Highway Addressable Remote Transducer) is a hybrid analog+ digital industrial automation open protocol. Its most notable advantage is that it can communicate over legacy 4-20 mA analog instrumentation current loops, sharing the pair of wires used by the analog only systems. HART is widely used in process and instrumentation systems ranging from small automation applications through highly sophisticated industrial applications. Due to the huge installed base of 4-20 mA systems throughout the world, the HART Protocol is very popular for industrial protocols.

The terms wired (e.g. X10, UPB, HART Communication Protocol) and wireless electronic communication (e.g. Wi-Fi, Wi-Fi version 3 or WiFi3, 6LoWPAN, ZigBee, Z-wave, Bluetooth, Bluetooth low energy (BLE), WiMAX, long range low power technology such as LoRa, Ultra Narrow Band (UNB), and cellular technology 3GPP and LTE-M and 5G) correspond to the concept of "internet of things" or "IoT". The internet of things is defined herein as a network of physical objects or things that is comprised of electronic apparatuses (collect node and communication hub), programmable software, various sensor technology (flow, temperature and water quality and leak detectors), and local routers/servers and/or remote network and internet connectivity, which enable apparatuses to collect and exchange data. The internet of things allows devices to be sensed and controlled remotely across existing network infrastructure, creating opportunities for more direct integration between the physical world and computer-based systems and resulting in improved efficiency, monitoring accuracy and economic benefit. The internet of things encompasses technologies such as smart grids, smart homes, and intelligent wire and wireless electronic communications.

IoT Protocols refers to 1) MQ Telemetry Transport (MQTT) which is a machine-to-machine or "Internet of Things" connectivity protocol on top of TCP/IP. It allows extremely lightweight publish/subscribe messaging transport, 2) Extensible Messaging and Presence Protocol is a communication protocol for message-oriented middleware based on XML. It enables the near real-time exchange of structured yet extensible data between any two or more network entities, 3) Constrained Application Protocol (CoAP) is a specialized web transfer protocol for use with constrained nodes and constrained networks in the Internet of Things. The protocol is designed for machine-to-machine (M2M) applications such as smart energy and building automation, 4) Advanced Message Queuing Protocol (AMQP) is an open standard application layer protocol for message-oriented middleware. The defining features of AMQP are message orientation, queuing, routing, reliability and security. AMQP mandates the performance of the messaging provider and client to the extent that implementations from different vendors are interoperable, in the same way as SMTP, HTTP, FTP, etc. have created interoperable systems, 5) THREAD is an IPv6-based, low-power mesh networking technology for IoT products, intended to be secure and future-proof specification that is available at no cost, but requires agreement and continued adherence to an end user license agreement, 6) Zigbee is an IEEE 802.15.4-based specification with a group of high-level communication protocols used to create personal area networks with small, low-power digital radios, such as for home automation, medical device data collection, and other low-power low-bandwidth needs, designed for small scale projects which need wireless connection. Zigbee is a low-power, low data rate, and close proximity wireless ad hoc network, 7) Z-wave is a wireless communications protocol used primarily for home automation but applicable to IoT applications. It is a mesh network using low-energy radio waves to communicate from device to another device, allowing for wireless control, 8) Data Distribution Service (DDS) is an Object Management Group (ONG) machine-to-machine standard that aims to enable scalable, real-time, dependable, high-performance and interoperable data exchanges using a publish-subscribe pattern, 9) Hypertext Transfer Protocol (HTTP) is an application protocol for distributed, collaborative, hypermedia information systems. HTTP is the foundation of data communication for the World Wide Web, where hypertext documents include hyperlinks to other resources that the user can easily access and/or 10) a custom designed protocol.

Figure 6:
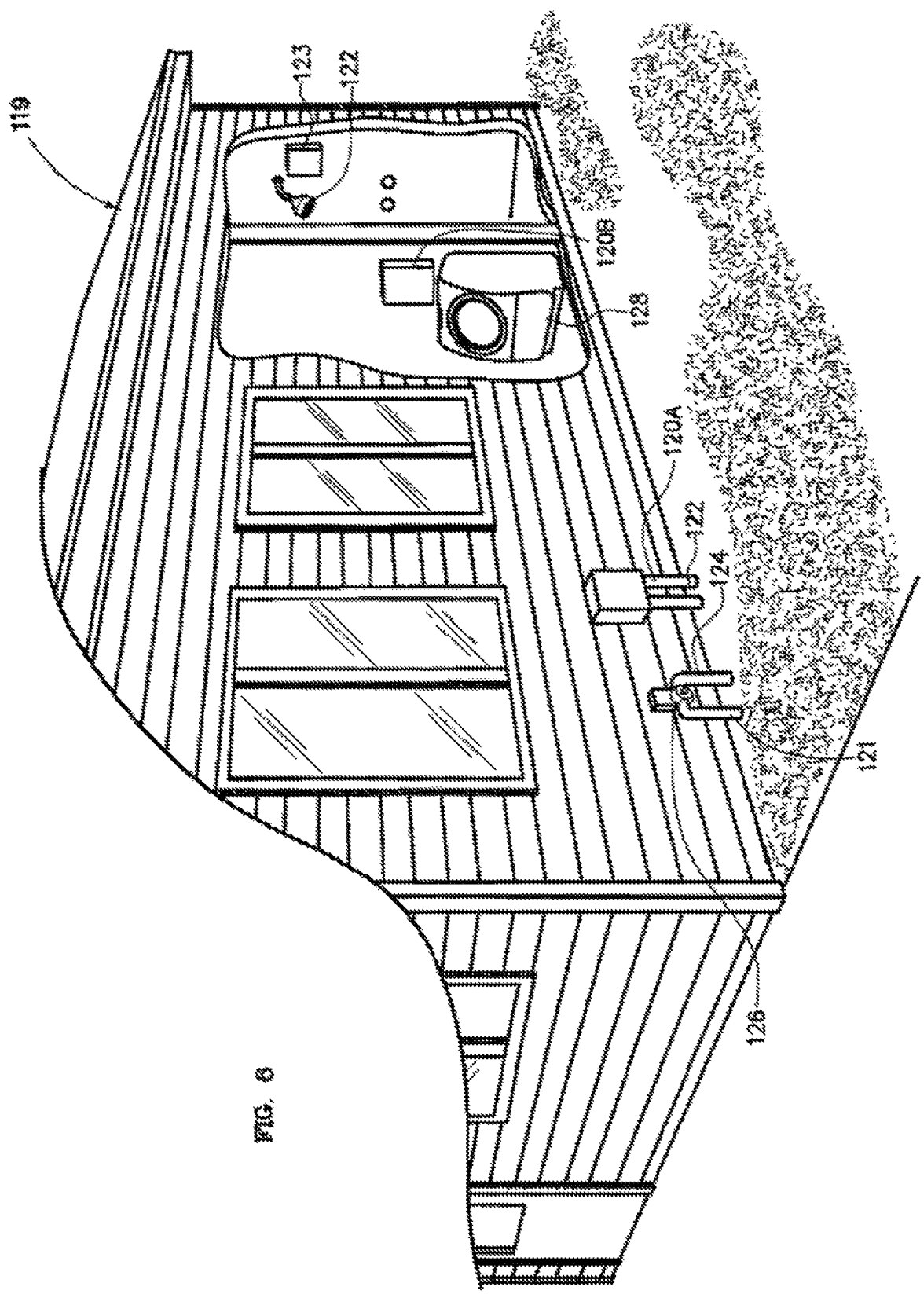
FIG. 6 is an illustration of a plurality of water parameter transceivers attached to various locations for monitoring water use.

Referring now to the drawings and particularly to FIG. 1, shown is an illustrative view of the water meter and leak detection system 10 (126 shown in FIGS. 6 and 200 shown in FIG. 7) connected in series to the water supply lines in an appropriate location for local water monitoring 42 and for monitoring water use and leak detection within a private or public property(es) 40. For accurate measurements of water use, the present invention can be installed in the standard water meter location or installed between the pressure reducing valve and the civil, commercial, governmental, or municipal supply water source(s) and before any distribution lines. It is also anticipated by the Applicant that the water meter and leak detection system 10 (126 shown in FIGS. 6 and 200 shown in FIG. 7 can be used on wells and in situations where the water source is not obtained from civil, commercial, governmental, or municipal operations. The water use and leak detection apparatus 10 (126 shown in FIGS. 6 and 200 shown in FIG. 7) can have a sampling rate to upload or download water and energy use on various frequencies, e.g. once every 1-20 seconds (for monitoring the water event use), once per minute, once per hour, once per day, once per any frequency, or preferably can send information upon sensing the initiation of water flow until the water flow is stopped (defined herein as an "water event use" or "water event use basis") Monitoring on a water event basis allows for a quantitative analysis using software instructions, algorithms, and artificial intelligence to learn the daily, weekly or monthly water use patterns and frequencies of a specific private or public property(ies) to improve identification and evaluation of water use characteristics and Improved leak detection system. The water parameter information can be viewed on a custom display/recorder screen 50, or cell or smart phones, computers, or similar apparatuses having an application program or APP (shown in FIGS. 10-13).

The water parameter information can also be uploaded, either with the use of an optional communication hub or receiving station to an internet router using wired or wireless technology which transmits the data through remote servers (for example, Amazon Web Services, Oracle Cloud, Microsoft Azure Cloud) and associated database(s) or, alternately, through a private or commercial network with privately own servers.

Also shown in FIG. 1 is a wireless (or wired) communication means 52 from the water meter and leak detection system 10 (126 shown in FIGS. 6 and 200 shown in FIG. 7) for transmitting water use, water quality and leak detection information and/or data. The wireless (or wired) technology 52 can communicate with a conveniently located remote display 50 in a location for review by a private or public property owner, user, or responsible individual(s). Remote display 50 can be a custom apparatus or TV, computer, iPad, or another conveniently available display technology. All wireless (or wired) communications should preferably be a duplex format. Since the wireless communication means 52 is in relatively proximity to the water meter and leak detection system 10 (126 shown in FIGS. 6 and 200 shown in FIG. 7), the wireless means can consist of Bluetooth or BLE, Z-wave, ZigBee, 6LoWPAN, or WiFi/WiFi3 or similar technology that can communicate with router technology. It is anticipated that WIMAX, LoRa, Ultra Narrow Band (UNB), 3GPP, and/or cellular LTE-M, NB-IoT and 5G technology might be necessary for longer distance communication using long range, low power, and/or high-density technology that can communicate with one or more communication hubs. The electronic communication comprises, in part, a segment of the internet of things (IoT) concept. The wireless (or wired) communication means 52 can also electronically communicate with a local router, which uses the internet and remote computer server(s) (Cloud technology) to provide remote access of the water data.

Also shown in FIG. 1 is another wireless communication means 54 from the water meter and leak detection system 10 (126 shown in FIGS. 6 and 200 shown in FIG. 7) for communicating water use and/or water quality information to a governmental, civil or municipal employee or individual 60 using a second custom remote display/recorder 56 for civil, commercial, governmental, or municipal operators/representatives. Since the wireless communication means 52 is not relatively close to the water meter and leak detection system 10 (126 shown in FIGS. 6 and 200 shown in FIG. 7), this wireless technology should consist of a longer-range technology such as LoRa, WIMAX, 6LoWPAN, UNB, Wi-Fi/Wi-Fi3 (with Wi-Fi extenders), Cellular 3GPP, NB-IoT, LTE-M and 5G. However, Bluetooth and BLE, ZigBee, Z-wave or similar wireless protocols are also possible as these technologies are improving in range and security measures and are offering better capabilities.

FIG. 1 shows another wireless communication 46 that is designed to communicate information or data utilizing cellular format technology with offsite central monitoring using cellular or other telephone lines including satellite or microwave technology, the internet, cell towers, telephone lines, or similar technologies. Such cellular format could be CDMA, GSM, 3GPP, LTE-M, NB-IoT and 5G or another cellular format. It is anticipated that the wireless communication 46 can transmit information to a remote database, which communicates with a registered cell or smart phone, computer, or similar apparatus for displaying use and leak detection data. The wireless communication 46 should include specific identification information e.g. the private or public property address. The wireless communication 46 can send data on various frequencies, e.g. once per minute, once per hour, once per day, once upon any frequency (e.g. every 1-15 seconds), or preferably upon a water event basis. The wireless communication can also send information upon sensing the observation of a leak condition, e.g. alarm situation, to the registered to the owner of a cell or smart phone, computer, or similar electronic apparatus. Alternately, continuous data monitoring can be stored in a data module in the water meter collection node and periodically transferred wirelessly to a remote computer or server as described herein. The water event basis monitoring can minimize the use of wireless signals within the private or public property(ies) or building (s), conserving energy, minimizing the interference with other wireless devices, and reduce the exposure of wireless energy to individuals.

Furthermore, the wireless communication 46 can consist of two-way transmission, commonly known as duplex transceiver technology, such that the water meter and leak detection system 10 (126 shown in FIGS. 6 and 200 shown in FIG. 7) can transmit and receive electronic signals with a remote station, cell or smart phone, computer, or similar apparatus. The wireless communication 46 can also comprise a radio frequency (RF) mesh-enabled or point-to-point device (meters, relays) technology that is connected to several other mesh-enabled or point-to-point devices, which function as signal repeaters, relaying the data to an access point. The access point device aggregates, encrypts, and eventually transmits the data back to a municipal or government agency over a secure third-party private or commercial network. The resulting RF mesh or point-to-point network can span large distances and reliably transmit data over rough or difficult terrain. If the water meter and leak detection system 10 (126 shown in FIGS. 6 and 200 shown in FIG. 7) or optional communication hub transmitter drops out of the network, its neighboring water meter and leak detection system 10 (126 shown in FIGS. 6 and 200 shown in FIG. 7) or optional communication hub will find another route. The mesh or point-to-point technology continually optimizes routing to ensure information is passed from its source to its destination as quickly and efficiently as possible. When the wireless communication 46 is being used, the water use data can be routed through a Bluetooth, Bluetooth low energy (BLE), Wi-Fi/WiFi3, ZigBee, Z-wave, LoRa, Sigfox, 6LoWPAN, WiMAX, Ultra Narrow Band (UNB), NB-IoT or other wireless technology using a local router/server or private or commercial network that transfers the water use data over the internet and remote servers (cloud technology). Signals and/or data can also be transferred by standard cellular format, 3GPP or LTE-M and 5G cellular technology (using a cell phone, smart phone, computer or similar electronic apparatus) from cellular towers to remote servers (cloud technology) and/or over the internet to a local router/server. The wireless communication 46 can be either half duplex and/or full duplex two-way transmission.

The wireless communications 52, 54 and 46 are preferred to transmit, upload or download water parameter data or information via a secure wireless communication network. It is anticipated that the wireless communication 54 can be received by a moving vehicle or can communicate with cell phone towers 44 and cellular technology using wireless communication 46. The electronic communication(s) comprises, in part, a segment of the internet of things (IoT) concept. The wireless communication 54 or wireless communication 46 can also electronically communicate with a local router/server which uses the internet to communicate with remote computers (cloud) to allow remote access of the water use data. Such remote cloud-based computers can be provided by a large commercial cloud computer company.

It is anticipated that the wireless communications 54 and 46 and the wireless or wired communication 52 utilizing wired technologies (X10, UPB etc.) can be used with the water meter and leak detection system 10 (126 shown in FIGS. 6 and 200 shown in FIG. 7) in any combination, thereof. For example, the present invention's collection node can use Bluetooth, Bluetooth Low Energy (BLE), Ultra Narrow Band (UNB), NB-IoT, Wi-Fi, Wi-Fi3, WiMAX, 6LoWPAN, Zigbee and/or Z-wave to communicate with a custom display device 18, 56, 110 or with a cell or smart phone, computer, or similar apparatus 400. The collection node can also communicate with a local wireless router or through a private or corporate network system to a private, commercial, or government remote computer(s) or server(s). The collection node can also be connected by wired technology directly or through X10, UPB or HART Communication Protocol to communicate with a device such as a smart speaker hub or router. The collection node can also connect to a private or commercial network system or to a router that communicates with the internet, all linked to a private, commercial, or government remote computer(s) or server(s). The collection node can also have a standard, 3GPP or LTE-M and 5G cellular technology to communicate wirelessly to the private, commercial, or government remote computer(s) or server(s). Also, one or more collection nodes can wirelessly communication using Lora, UNB, NB-IoT, 6LoWPAN, or WiMAX technology to one or more communication hubs (with point-to-point or meshing technology) whereby the communication hub or receiving station is either hard wired or uses Wi-Fi to communicate with a wireless router (or cable modem) to communication over the internet to a private or commercial remote server. These are just a few examples of combinations using various wired and wireless technologies with the present water meter and leak detection system.

Wireless communication means 46, 52 and 54 preferably utilize encryption, authentication, integrity and/or nonrepudiation techniques to provide a secure transfer of the water information from the water meter and leak detection system 10 (126 shown in FIGS. 6 and 200 shown in FIG. 7) to the first custom display/recorder apparatus 50, to the second custom display/recorder apparatus 56 and/or to the cell or smart phone, computer, or similar apparatus 400. Also, wireless communication means 46, 52 and 54 should include specific identification information e.g. property address, IP address. The wireless communication means 46, 52 and 54 can send data on various frequencies, e.g. once per minute, once per hour, once per day, or preferably will send information on a water flow event basis to a first remote 50, a second remote 54 or a remote computer/database which will allow access to registered owners of cell phone, smart phone, computer or similar electronic apparatus 400. Furthermore, wireless communication means 46, 52 or 54 can send data or information upon the sending of a request command. The request command can be generated by, for example, the pushing of a requesting button located on the first 50 remote, the second 56 remote or the cell phone, computer, smart phone or similar electronic apparatus 400 that transmits a request for water use and water quality use information or data to the water meter and leak detection system 10 (126 shown in FIGS. 6 and 200 shown in FIG. 7). The use of the request command can minimize the use of wireless signals within the private or public property{ies} building, conserving energy, minimizing the interference with other wireless devices and reduce the exposure of wireless energy to individuals.

Furthermore, the wireless means can consist of two-way transmission, commonly known as duplex transceiver technology, such that the water meter and leak detection system 10 (126 shown in FIGS. 6 and 200 shown in FIG. 7) can transmit water parameter data from the first, second remotes, 50, 56 or cell phone, smart phone, computer or similar electronic apparatus 400 and similarly, the first and second optional remotes 50, 56 and cell phone, smart phone, computer or similar electronic apparatus 400 can transmit electronic commands to the water meter and leak detection system 10 (126 shown in FIGS. 6 and 200 shown in FIG. 7) to e.g. regulate a water control valve.

The water meter and leak detection system 10 (126 shown in FIGS. 6 and 200 shown in FIG. 7) should be able to reliably and securely communicate the information collected to a remote central computer location. Difficult environments and distant locations for water meter installation can present wireless communication challenges. Solutions include using cell technology networks, satellites, licensed RF technology, unlicensed RF technology, and/or wired power lines. Additional remedies include fixed wireless, mesh, or point-to-point (and hybrid) networks or any combinations thereof. There are several other potential network configurations possible, including the use of Wi-Fi and other internet related networks. To date, no one solution seems to be optimal for all applications. Rural municipalities such as mountainous regions or areas ill-served by wireless and internet companies have very different wireless communication issues than urban or established area utilities.

TCP/IP technology has become a common communication and management platform for sensor to device applications, so software developers can utilize multiple communication systems while using TCP/IP technology. TCP/IP is a combination of two technologies where TCP comprise the fourth layer, and IP comprises the third layer, of the network and transport sections of the Open Systems Interconnect model (OSI model). Wireless technology such as LoRa, WIMAX, 6LoWPAN, UNB, Wi-Fi/Wi-Fi3 (with WiFi extenders), Cellular 3GPP, and/or LTE-M, NB-IoT and 5G, Bluetooth and BLE, ZigBee, Z-wave or similar wireless protocols or other communication technologies using the TCP/IP technology to transfer or download water data from a private or public property(ies) or used to upload data, information or software updates to the water mater and leak detection system 10 (126 shown in FIGS. 6 and 200 shown in FIG. 7).

Figure 7:
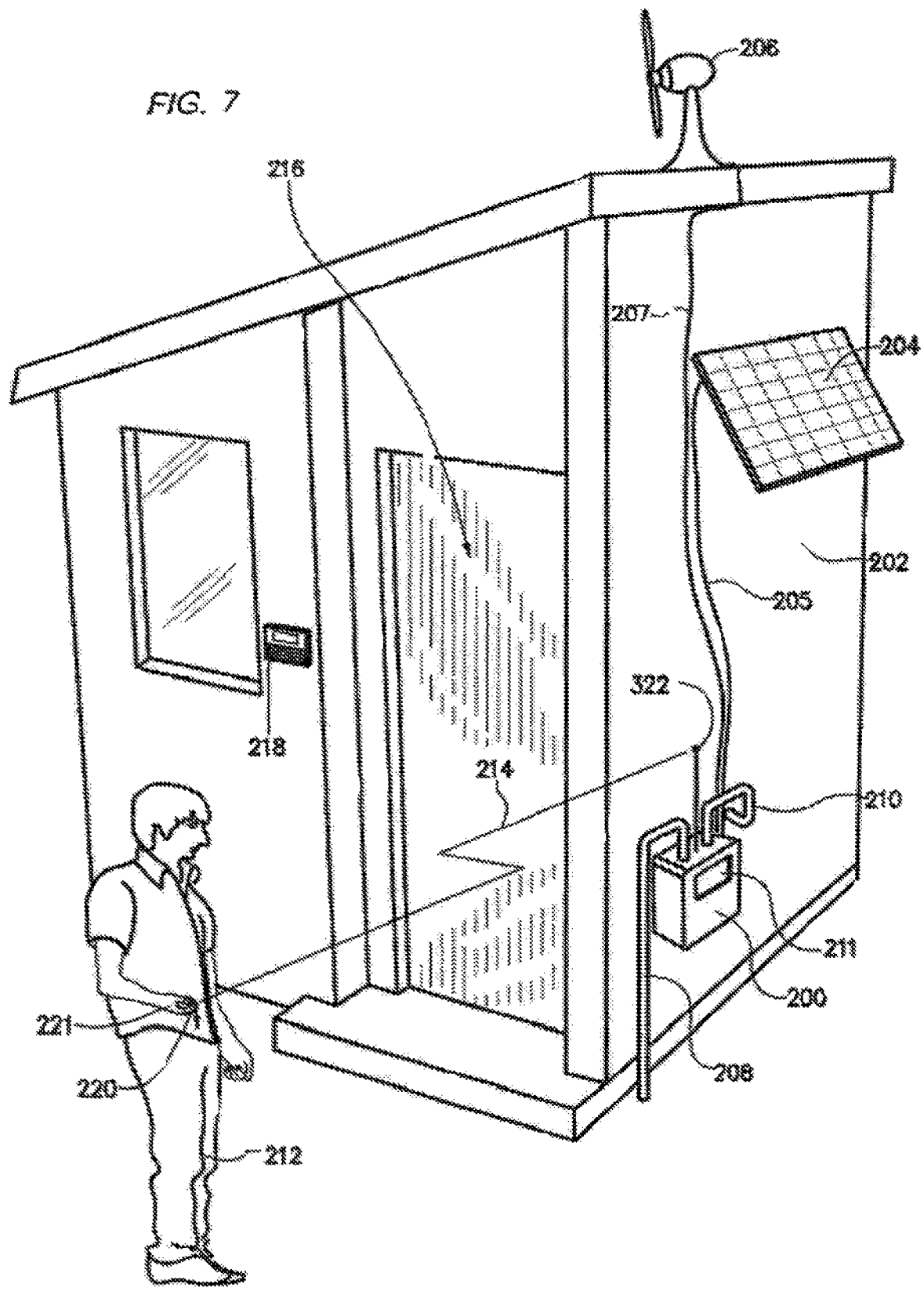
FIG. 7 is an illustration of the water meter and leak detection system attached to a residential building with wind and solar energy generation and a person having a cell or smart phone, computer, or similar apparatus communicating with the Water Meter and Leak Detection System for obtaining water parameter data or controlling a water control valve.

Calibration of the sensors with the water meter and leak detection system 10 (126 shown in FIGS. 6 and 200 shown in FIG. 7) can be initiated by pressing hard button 114, 116, and 118 and/or soft button activators 140, 144, and 146 on the water meter and leak detection system 10 (126 shown in FIGS. 6 and 200 shown in FIG. 7) or by the custom display and/or a recording apparatus 50, and/or by cell or smart phones, computers, or similar apparatuses 400 can be located remotely from the Water meter and leak detection system 10 (126 shown in FIGS. 6 and 200 shown in FIG. 7).

In another embodiment, the multiple independent flow sensors 105 can be engaged to the main water supply, irrigation system, or water use devices such as washing machine, water heater, dishwasher, kitchen faucets, bathroom faucets, shower, and/or toilets, and any combinations thereof. Each independent flow sensor 105 sends a unique code to the CPU, microprocessor or microcontroller 84 for identification associated with the water use device. Each independent flow sensor 105 can communicate the water usage by wired or wireless communicating with a unique code to the water meter and leak detection system 10 (126 shown in FIGS. 6 and 200 shown in FIGS. 7 and 15). The water data can be transferred to a remote device(s), e.g. remote display and/or a recording apparatus 50, 110 and/or cell or smart phones, computers, or similar apparatuses 400.

In another embodiment, which does not utilize an independent flow sensor at each water use device but rather a single flow sensor, can allow an owner/user to enter into a programmed "Device Calibration Mode" by pressing a specific hard or soft button (126 shown in FIGS. 6 and 200 shown in FIG. 7) or touch screen display 80, or by sending an electronic command from a display and/or recording apparatus 50, 110 and/or another remote device such as a cell or smart phone, computer, or similar electrical apparatus 400. The water flow sensor 105, optional pressure sensor 65, optional acoustic sensor (with sophisticated software), and/or optional temperature sensor 93 can be combined within the water meter collection node (base station) that can monitor specific flow rates, flow durations, and total water use volumes, while the optional pressure sensor 65 can monitor unique pressure patterns, and the optional acoustic sensor can monitor unique sound patterns. Thus, a single set of localized sensors (flow rate sensor 105, optional pressure sensor 65, optional acoustic sensor, and/or optional temperature sensor 93) can be utilized and incorporated into the water meter and leak detection system 10 (126 shown in FIGS. 6 and 200 shown in FIG. 7). The optional pressure sensor(s) 65 and optional acoustic sensor(s) assist in identifying the specific water valve(s) for each water use device. During Device Calibration Mode, the user turns on or cycles one water use device, fixture or appliance (e.g. washing machine, dishwasher, shower) for a time period and the water meter and leak detection system's monitors the water flow rate, water duration, and total, water volume and, if applicable, utilizes optional, temperature sensors, optional pressure sensors and optional acoustic sensors to observe patterns water valves (movement and noise) to identify water valves for specific water use devices. The user continues this process for each water use device, fixture or appliance (e.g. main water supply, irrigation system, washing machine, shower, water heater, dishwasher, kitchen faucet, bathroom faucets, the toilets) until water use device(s) water use signature or pattern are calibrated and/or the specific water valve(s) is identified. The software uses data from the flow sensor for each water use device and record its water use signature (actual independent flow rates, variation of flow rate over time, water use duration, total volume used). To facilitate the "Device Calibration" a factory specification software signatures and patterns can be incorporated which approximate irrigation, washing machine, shower, water heaters, dishwashers, kitchen and bathroom faucets and toilets each independent water uses, that can be modified by the AI and software algorithms to be calibrated at the private and/or public property(ies) The optional pressure sensor(s) and optional acoustic sensor(s) observe movement, vibration, and noise patterns (sound and pressure patterns) to identify water valves for specific water use devices. The water, use data can be communicated to a display and/or a recording apparatus 50, 100 and/or cell or smart phone, computer, or similar electronic apparatus 400 and the flow rates and water use for each water use device can be displayed appropriately.

It is anticipated by the Applicant that an "Automatic Sensor Learning Mode", where the software learns about the users water use at a private or public property (ies), can be completed without the calibration steps. The Automatic Learning Mode utilizes artificial intelligence (AI), software algorithms and other software to perform this operation. In this embodiment, a single sensor (e.g. flow rate sensor) 150, with optional pressure sensor(s) 65, optional acoustic se or(s), and/or temperature sensor(s) 93 can be located within or near the water meter and leak detection system 10 (126 shown in FIG. 6 and 200 shown in FIG. 7), Since independent water valves have unique pressures and sounds patterns when being closed or opened, the optional pressure sensor 65 and optional acoustic sensor can be incorporated into the water meter and leak detection system 10, 126 and function to assist in identifying the water valve(s) of a specific water use device(s). To facilitate the "Automatic Learning Mode" a factory specification software water uses signatures and patterns which approximate irrigation, washing machine, shower, water heaters, dishwashers, kitchen and bathroom faucets and toilets each independent water uses, that can be modified by the AI and software algorithms at the private and/or public property (ies). A user can enter into a programmed "Automatic Learning Mode" by pressing a specific hard or soft button on the water meter and leak detection system 10 (126 shown in FIGS. 6 and 200 shown in FIG. 7) or touch screen display 80 or by sending an electronic command from a display and/or recording apparatus 50, 110 and/or another remote device such as a cell or smart phone, computer, or similar apparatus 400. In this Automatic Learning Mode, the water meter with leak detection system automatically tracks water use parameters over the period until enough information is observed. Such operation initiates the software to monitor the water use that occurs during the next days, weeks and/or months and, during this period, the learning AI software enters an aggressive learning phase. With the Automatic Learning Mode, the water meter and leak detection system 10 (126 shown in FIGS. 6 and 200 shown in FIG. 7) monitors water use, optional water pressure sensor, and temperature sensor to get water signatures or patterns from water use devices. Using the water flow rate sensor, the water flow rate, variation of flow rates over time, total volume, and duration of flow parameters can be used for signatures or patterns. The optional pressure sensor, temperature sensor and acoustic sensor can supplement the water meter and leak detection system 10 (126 shown in FIGS. 6 and 200 shown in FIGS. 7 and 15) signature or patterns to further characterize water use devices. The software can also track water use temporal patterns during a day or week period to further enhance the signature and pattern a public or private building or structure. For example, in a private residence, many showers might occur during the early morning hours as individuals are getting ready for work or school. During weekends, the showers occurrence might shift to a later period, and washing machine and, dishwasher water cycles might occur. The optional pressure and acoustic sensor(s) observe movement, vibration, and noise patterns (sound and pressure patterns) to identify water valves for specific water use devices. The Artificial Intelligent (AI) and software algorithms are used to process water use data (water signature and patterns) from the main water supply, irrigation system, and water use devices (e.g. washing machine, water heater, showers, dishwasher, kitchen and bathroom faucets). The AI software determines water use parameters, temporal characterization, property occupation and optionally monitor specific sounds and pressure patterns associated with water use (and non-water use) remembers water usage with consideration of time and day/week/month. The water meter and leak detection system transfers water data to a remote computer(s) or server(s) with database(s). Subsequently, the water data can be downloaded to a designated remote computer and database for registered cell or smart phone, computer or similar electronic apparatus to gain access.

For example, after a period of time (historical analysis), Automatic Sensor Leaning Mode using AI, software algorithms and other software can monitor a washing machine's range of water flow used and records the water use duration periods, water flow rate patterns (water flow rates for washing machine cycles and variations of water flow rates over time). The Automatic Sensor Learning Mode can use optional pressure sensor(s) for determining variations in pressure patterns and can use optional acoustic sensor(s) for identifying water valve movement and sounds when opening and closing and any vibrations during fully open valve with water flowing through the valve. In another example, when a toilet is flushed, the Automatic Sensor Leaning Mode software recognizes the toilet water use pattern. If a bathroom faucet is turned on for hand washing, the software can identify the combination pattern of the toilet filling and the faucet water use. In this case an optional acoustic sensor can identify and differentiate the toilet and bathroom faucet water valves to more accurately monitor the water used by these different waters use devices at the public or private property or structure. The Automatic Sensor Leaning Mode software can analyze, record, and store actual independent flow rates, variation of flow rate over time, duration periods, temporal activities, optionally variations in pressure patterns (e.g. rate of flow at onset of water flow and rate of flow when turned off, and any variations during water flow duration, and optional acoustic sensor observing water valve characteristics to assign the signature or pattern of water use for the toilet and bathroom faucet.

The water meter and leak detection system's water leak detection and monitoring capability can use wireless technology such as LoRa, WIMAX, 6LoWPAN, UNB, Wi-Fi/ Wi-Fi3 (with WiFi extenders), Cellular 3GPP, and/or LTE-M and 5G, Bluetooth and BLE, ZigBee, Z-wave or similar wireless protocols or other communication technologies using the TCP/IP or other OSI technology to transmit an alarm or message to notify of leak condition(s) at a private or public property(ies). Leak notification can be provided via call to a registered or designated cell or smart phone, computer, or similar apparatus or the water meter and leak detection system can send an alarm(s) or message(s) to a governing utility or municipality.

Analog sensors with analog data can be amplified by a circuit and connected to the CPU, microprocessor and/or microcontroller 84 through the use of an analog-to-digital module(s). Digital sensors can communicate with the CPU, microprocessor and/or microcontroller 84 directly.

The remote display devices 46, 52, 54 and 400 can communicate wirelessly are located remotely from the water sensor(s), CPU, microprocessor and/or microcontroller 84, electrical circuitry, and data transfer technology 83. The water meter and leak detection system 10, 126, 200 uses various wireless technologies. Examples include Bluetooth modules (using the 2.4 GHz band as Wi-Fi) such as the RN-41 Bluetooth modules available from Roving Networks in Los Gatos, Calif.; the KC-41, KC 11.4, KC-5100, KC-216 or KC-225 data serial modules from KC Wireless in Tempe Ariz.; and the BT-21 module from Amp'ed RF wireless solutions in San Jose, Calif. Wi-Fi examples include the Photon manufactured by Particle, Inc. and numerous other Wi-Fi products. Cellular technology examples include the Electron manufactured by Particle, Inc. numerous other cellular products. Wireless protocols that can be utilized with the water meter and leak detection system include, but are not limited to IEEE 802.11a, IEEE 802.11b, IEEE 802.11g and IEEE 802.11n modulation techniques. An example of the North America 915 MHz frequency is the wireless long range and low power technology known as "LoRa", which is marketed by many manufactures such as HopeRF (RFM95 W-915S2) and Semetech (SX1276). LoRa can be used with the collection node and the communication hub of the water meter and leak detection system 10, 126, 200. LoRa is a low power wide area network specification intended for wireless battery operation. LoRa includes key requirements of Internet of Things (IoT) such as secure bi-directional communication, mobility, and localization services. Texas Instruments manufactures a competing technology known as the sub-1 GHz with 15.4-star networks (CC1125 or CC1310 device). NB-IoT chipsets and being developed by manufactures such as Snapdragon and Intel, just name a few. Other wireless protocols that can be utilized with the water meter and leak detection system are ZigBee, Z-Wave and IEE 802.15.4 modulation technology. Examples of cellular technology and protocols include CDMA and GSM and numerous other cellular protocols.

The Applicant recognizes there are numerous wireless protocols and technologies that have been developed and, although not specifically listed herein, could be utilized with the present invention for data transfer purposes.

To increase wireless range and provide compatibility with wireless routers or corporate networks, the water meter and leak detection system 10 (126 shown in FIGS. 6 and 200 shown in FIG. 7) can be divided into two main components: 1) "collection node water meter" or "collection node", which comprises a water meter with electrical circuitry with power source, CPU/microprocessor/microcontroller, sensor(s) (water flow sensor(s), optional temperature sensor(s), optional pressure sensor(s), and/or optional acoustic sensor(s)) and 2) the receiving station or "communication hub", includes electrical circuitry, CPU/microprocessor/microcontroller, and one or more RF radios that communicate with the collection node water meter and one or more RF radios or cellular technology that communicate with a public or private network. Alternatively, the communication hub or receiving station can be hardwired or use wireless communication with an internet router.

The water meter collection node's electric circuitry includes a generally low power long-range wireless radio and the water meter collection node's power source can be AC or DC voltage, battery, and/or super capacitors. The battery and/or super capacitors can be supplemented with a water turbine electric generator. The water meter collection node communicates wirelessly with the communication hub which can extend the range of wireless technology. The communication hub has a CPU/microprocessor, electrical circuitry with a generally a first long-range wireless radio and a second Wi-Fi radio, and a power source (battery or AC or DC voltage). In one embodiment, the communication hub has a first wireless long-range LoRa, Sigfox, UNB, NB-IoT, 6LoWPAN, or WiMAX radio 103 that communicates with the water meter collection node (that has a corresponding LoRa, Sigfox, UNB, NB-IoT, 6LoWPAN or WiMAX radio). The communication hub, which has programmed instructions for processing the water flow data from the first long-range radio into a second wireless radio that communicates with a wireless router, or RF technology) and cellular radio that communicates with a private or public corporate network. The communication hub can alternately be hard wired to the router and then the Wi-Fi radio is not a necessary component of the electrical circuitry. The water meter collection node can communicate with one or more water meters collection nodes and/or with one or more communication hubs (using mesh technology and/or point-to-point technology). The communication hub can wireless communicate with one or more water meter collection nodes and/or with one or more communication hubs (using mesh technology and/or point-to-point technology).

The wireless or wire data transfer can be connected to the Internet using the IP or DHCP protocols whereby the water parameter data can be monitored remotely over the Internet using a software program(s) designed to record, display, analyze and/or audit the data. Data access would likely require server log on to perform query and obtain response.

Some wireless routers support a form of point-to-point or bridging operation which could be used to transfer water parameter data from the water meter collection node to a communication hub. Other proprietary protocols can be used with the Water meter and leak detection system 10 (126 shown in FIGS. 6 and 200 shown in FIGS. 7 and 15), for example, ISM (industrial, scientific and medical) bands. ISM bands are defined by the ITU-R in 5.138, 5.150, and 5.280 of the Radio Regulations. Countries' individual use of ISM bands may differ due to variations in national radio regulations. In the United States, ISM bands use is governed by Part 18 of the FCC rules, while Part 15 Subpart B contains the rules for unlicensed communication devices including those that use the ISM frequencies. Part 18 rules prohibit using ISM for certain communications. The ISM bands defined by the ITU-R are:

| Frequency range [Hz] | Center frequency [Hz] |
| --- | --- |
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

While currently the 430 MHz and 900M1 Hz frequencies are commonly used in the United States, it is anticipated by the Applicants that other frequencies could be used for water use and water quality information or data communication transfers.

Cell phones receive and transmit electromagnetic waves that exist between 800 and 2400 megahertz and the most popular protocols are CDMA and W-CDMA, GSM, 3GPP, LTE-M and 5G, EDGE, HSPA and other generations.

Many newer internet protocols have been developed commonly known as an application programming interface (API). An A.PI for website usage is a code that allows two software programs to efficiently communicate with each other. The API defines a well organized and resourceful way for a programmer or developer to write software instructions in the program separate from an operating system or other application. One such API is the RestAPI system which aims for fast performance, standardization, reliability, and with the ability to grow, by re-using components that can be managed and updated without affecting the commercial system. A RestAPI uses HTTP requests to GET, PUT, POST and/or DELETE data or send control signals. A RestAPI, also referred to as a RESTful web service, is based on the representational state transfer (REST) technology, an architectural style and approach that has communications often used in web service development and communications between mobile device APPs and computer servers. REST technology is generally preferred API protocol because it utilizes less bandwidth, making it more suitable for internet and IoT usage. With cloud-company services on the rise, APIs are being developed to facilitate communication with web services mobile APPs. REST is a logical choice for building APIs that allow users to connect and interact with Cloud services.

RestAPI has a uniform interface, which serves as the interface between water meter data generated and transferred to remote computers, cell phones and computers with mobile APPs or stations with computer programs and remotely located computer servers. The uniform interface simplifies and decouples the REST architecture, which enables the device APPs or station computer programs and remotely located computer servers to evolve independently. The main guiding principles of the uniform interface are described below.

First by using resources for identified using Uniform Resource Identifiers (URIs) as resource identifiers. The identifiers are separated from the representations that are returned to the client. The commercial or private server does not transfer data directly from the database, but rather, utilizes HTML, XML or JSON code that is designed to represent database records expressed in variable width character encoding, depending on the details of the structured query language (SQL) request and the server implementation.

Second, a representation of a resource, including any metadata attached, and the software will verify that it has enough security information to modify or delete the resource on the server only under proper server permissions.

Then, a third process includes that each message includes enough information to describe how to process the message invoking specified content by an Internet media type. Responses also explicitly indicate their cache-ability.

On the fourth process the delivery of data or information utilizes SQL or non-SQL parameters, body content or headers, and requested URI for transmission communications. Computer or servers respond via body content, response codes, and response headers to the request. Hypermedia as the Engine of Application State (HATEOAS) links are contained in the returned body (or headers) to supply the URI for retrieval of the database objects from a remote computer server(s) with database(s).

Stateless of the REST architectural style and associated RestAPI protocol handles any sent requests, whether as part of the URI, query-string SQL or non-SQL parameters, body content, or headers. The URI uniquely identifies the resource and the body content contains the state (or state change) of the resource. After server/computer processes the request, the appropriate state (or the piece(s) of state that matter) is communicated back to the requesting mobile APP or computer program via headers, status, and response body.

The RestAPI protocol includes a properly managed caching that facilitates client-server transfers o water meter data, and communication with cell phone APPs, station programs and remotely located server interactions, further improving scalability and performance. Since remote computers and servers are not directly concerned with the water meter, computer and servers can be scalable. Computers and servers may be replaced, process operating system or software updates, and/or developed independently and whereby the RestAPI interface is maintained and unaltered.

The LoRa open specification create a low power, wide area LoRa technology network that is designed to wirelessly connect battery operated devices and sensors to the internet. The LoRa protocol utilizes the unlicensed radio spectrum in the Industrial, Scientific and Medical (ISM) band. The specification defined the device/sensor to infrastructure of the LoRa physical layer (OSI) and provides seamless interoperability between devices, sensors APPs and computers.

Once a user sets up a service, an activation or pairing application delivers a first display to the user on either a display means of the cell or smart phone, computer or similar apparatus 400, smart internet TVs, smart central hub listening and speaker devices, and home control systems, on the water meter and leak detection system 10 {126 shown in FIG. 6 and 200 shown in FIG. 7) and/or on a display means on the remote devices 480. Pairing technology or other application secure means associates a new user with a purchased or installed remote device and the water meter and leak detection system 10 (126 shown in FIGS. 6 and 200 shown in FIGS. 7 and 15). For example, when the new user activates the APP the first screen will request the SSID and password of the local LAN or wireless router and then records this for subsequent access or alternately, scan a QR code with the cell phone camera. A computer program or web portal can use the internet to allow access for new user's water use and leak detection data by inputting a username or SSID and password or using a two-step authentication scheme (email, phone call or code authenticator).

The water meter and leak detection system 10 (126 shown in FIGS. 6 and 200 shown in FIG. 7) will require the transfer of water use and water quality data or leak detection information using security measures due to violation of municipal or governmental laws and ordinances, and for obstructing fraudulent activities.

There are several important security techniques that taken as a whole, or in part, function to meet the objectives to, including authentication, integrity, encryption and non-repudiation that provide secure communications.

Several current security techniques that utilize public key cryptography are the Public Key Infrastructure (PKI), the Public Key Encryption (PKE) and the Digital Signature protocols. PKI enables digital certificates to be used to electronically identify an individual or an organization. A PKI requires a certificate authority (CA) that issues and verifies digital certificates and can utilize a registration authority (RA) that acts as the verifier of the CA when a new digital certificate is issued. PKE is a message or command signal that is encrypted with a recipient's public key. The message cannot be decrypted by any individual or machine that does not possess the matching private key. PKE is a security protocol that is used to maintain confidentiality, Similarly, Digital signatures are also utilized with key pair technology, in association with authentication, integrity and non-repudiation confidentiality techniques. In practice, when a user transmits a message or signal or data with a digital signature, the message or signal includes a one-way hash prior to transmission, and the recipient uses the sender's public key to decrypt the hash and verify the digital signature. PKI, PKE, and digital signers are currently being supplemented with two factor authentication that utilizes a confirmation protocol after password input with a follow up email, phone call, or utilizing a authenticator number scheme. Furthermore the PKI, PKE and digital signature techniques might become archaic when block chain technology becomes more generally adopted.

Various encryption algorithms such as include the original RSA algorithm, Advanced Encryption Standard (AES), Data Encryption Standard (DES) and Triple DES.

Secure technologies include the Secure Sockets Layer ("SSL") which creates a secure connection between two communicating programs or applications. SSL is a standard security technology for establishing an encrypted link between a server and a client-typically a web server and a mail server or a mail client (e.g., Gmail). The SSL protocol are commonly utilized by web browsers and web servers in conjunction with HTTP protocol to perform cryptographically secure web transactions.

Another security technology is the Internet Protocol Security ("IPSec") which protects internet protocol traffic across the Internet and is particularly useful for implementing VPNs that utilized tunnel and encryption techniques. IPSec originally utilized an IP authentication header. IP encapsulating security payload was an optional packed header that can provide superior confidentiality through encryption of the packet. Point-to-Point Tunneling Protocol ("PPTP") is another secure protocol that allows entities to extend their local network through private "tunnels" over the Internet. Layer Two Tunneling Protocol ("L2TP") is an extension of the PPTP protocol.

A Media Access Control Address ("MAC Address") is a unique number assigned to a network interface controller for communications with the data link layer of the Open Systems Interconnection Model (OSI Model.) The MAC address is appended to a digital message and provides authentication and integrity for the message.

A further security protocol, the extensible Markup Language (XML) Signature associates a cryptographic signature value with Web resources using XML markup, XML signature also provides for the signing of XML data. Javascript object notation (JSON} has become more popular alternative to XML for various reasons, for example, JSON is less verbose than XML which uses more words than necessary and JSON is faster processing whereas XML software is generally slow and cumbersome.

The water meter and leak detection system 10 (126 shown in FIGS. 6 and 200 shown in FIG. 7) should communicate securely with remote displays/recorders 52, 54 or cell phone, smart phone, or similar apparatus 400 and therefore they need to be provided with unique identities. The identity must not be easy to detect either intentionally or accidentally.

Residential and corporate location identity are particularly relevant in multi-site scenarios, where the water meter and leak detection system 10 (126 shown in FIGS. 6 and 200 shown in FIG. 7) are aggregated across a wide geographic area containing multiple sites, serviced by multiple utilities, each site operating on one or more municipal agencies. Each water meter and leak detection system 10 (126 shown in FIGS. 6 and 200 shown in FIG. 7) will need to identify itself when transmitting water use or water quality data or information, or queried by a civil, commercial, municipal or governmental operator or agency.

Each the water meter and leak detection system 10 (126 shown in FIGS. 6 and 200 shown in FIG. 7) will have its own identification means that will be recorded in a remote database. The identification can be the Media Access Control (MAC) address (OSI data layer), internet TCP/IP address (OSI transport and network layers), private or public property(ies) building address or users email address or incorporate a distinctive set of numbers or characters associated with a particular municipality or governmental agency.

It essential that water meter and leak detection systems 10 (126 shown in FIGS. 6 and 200 shown in FIGS. 7 and 15) will have the same identity within a specific geographical area. It might be also be preferred that the entity, municipality or authority name become a portion of the unique identification code. During the fabrication process, the unique identification code could include adding a unique municipality or authority name code in the water meter and leak system apparatus 10 (126 shown in FIGS. 6 and 200 shown in FIGS. 7 and 15) or software downloaded upon installation or inserted during a repair or maintenance periods.

It is essential that water meter and leak detection system 10 (126 shown in FIGS. 6 and 200 shown in FIG. 7) will have the same identity within a specific geographical area. It might be also be preferred that the entity, municipality or authority name become a portion of the unique identification code. During the fabrication process, the unique identification code could include adding a unique municipality or authority name code in the water meter and leak detection system 10 (126 shown in FIGS. 6 and 200 shown in FIG. 7)

or software downloaded upon installation or inserted during a repair or maintenance periods.

A unique identification code registry is maintained within a remote database that is associated with the installation and operation of water meter and leak detection system 10 (126 shown in FIGS. 6 and 200 shown in FIG. 7). The unique identification code registry may be updated whenever a water meter and leak detection system 10 (126 shown in FIGS. 6 and 200 shown in FIGS. 7 and 15) is brought into or removed from service. The unique identification code registry may be incorporated into the relevant remote database with a unique host name (municipality or governmental agency) or installation region encoded within unique identification code. This would result in several databases that are unique to a given municipality, governmental agency or geographic region. Alternatively, the unique identification registry can be implemented as a single large database. The registry can be implemented as a relational database (e.g. MySQL, MariaSQL), non-relational database (e.g. Amazon DynamoDB), XML files, Comma Separated Value (CSV) Excel files, or Resource Description Files (RDF), or any mechanism that allows associated verification when combined with the appropriate software analysis. The unique identification registry enforces distinctiveness, thereby preventing two water meter and leak detection system 10 (126 shown in FIGS. 6 and 200 shown in FIG. 7) from having the same unique identification code.

Encryption, authentication, integrity and non-repudiation may be important characteristics when the water meter and leak detection system 10 (126 shown in FIGS. 6 and 200 shown in FIG. 7) is transferring water use or water quality data or information to a remote server/database via a public or private network that provide wireless subsequent access to registered computers and cell, smart and mobile phones 400. When the water mater and leak detection system 10 (126 shown in FIGS. 6 and 200 shown in FIG. 7) receives or uploads data and information such as a control command signal to send or transmit data and information it is critical that the device can authenticate the sender and be sure of the integrity of the data and information. Encryption provides privacy by converting the data or information into an "encrypted" code to prevent unauthorized access. Encryption can be provided point-to-point, or end-to-end, and transmit messages using encryption schemes such as Pretty Good Privacy (PGP), Secure/Multipurpose Internet Email (S/MIME), XML, or SSL encryption protocols. Non-repudiation prevents the sender from denying that they sent or received data/information or a message. Non-repudiation can be provided by signing, electronic witnessing and technologies that assert a document was read before it was signed. One of the main advantages of the Block Chain technology is that non-repudiation is nearly immutable. Here, the water meter and leak detection system 10 (126 shown in FIGS. 6 and 200 shown in FIG. 7) can include digital signature technology, data packets or messages using PGP, S/MIE, XML and Digital Signature, TLS/SSL and two-step authentication to provide for non-repudiation of those messages, information or data.

The water meter and leak detection system 10 (126 shown in FIGS. 6 and 2 how n in FIG. 7) will transfer data to remote computers or servers whereby a user can obtain water use data or water quality information on a predetermined programmed frequency. The preferred method of data transfer will be on a water flow event basis which monitors the initiation of water use, its initial water flow rate, intermediate water flow rates, and when the water ceases to flow (turned off) the water use duration and total water used is calculated. The frequency can be programmed for various time periods erg. e.g. once per minute, twice per hour, once per day, once per week, once per month or once per year or can be transfer to a remote computer/server and accessed by a cell phone, smart phones, mobile phone, computer or other mobile electronic communication device. Also, when the data or information can be processed by an automated system and reports are only created every day, or week, or month, there s some flexibility when the data must be sent. The water meter and leak detection system 10 (126 shown in FIGS. 6 and 200 shown in FIG. 7) can be programmed to communicate at other time frequencies, such as every 5 seconds or every minute, or preferably in a water flow event basis to identify leaking conditions. In this case, data transfer and signature calculations can be executed only when there is free processing time. This scheme performs well with the water meter and leak detection system 10 (126 shown in FIGS. 6 and 200 shown in FIGS. 7 and 15) where important water flow event basis provides real-time calculations that can take up significant available calculation time for small periods, but over time periods of a few hours, when water is not flowing, there is processing time to spare.

In an alternate embodiment, the encrypted data is transmitted optionally to a local router/server and then across the Internet or cell tower technology, or via directly to a public or private network as it has been described herein. This is accomplished directly by the water meter collection node or by using remote receiving stations or communication hub with Wi-Fi/Wi-Fi3 101 or LoRa, WiNAX, Ultra Narrow Band (UNB), NB-IoT, 6LoWPAN, standard WiFi and (WiFi3 with Wi-Fi extenders) 103 duplex wireless or wired directly to the internet router that communicates to remote servers. In the LoRa or WiMAX (or Ultra Narrow Band (UNB), 6LoWPAN, standard WiFi and WiFi3 with Wi-Fi extenders) 103 wireless communication, the current marketed routers would have to be modified to receive the LoRa, WiMAX (UNB, 6LoWPAN) wireless duplex transmission. This has the advantage that water meter and leak detection system 10 (126 shown in FIGS. 6 and 200 shown in FIG. 7) does not need to store, but can, encrypted data.

The water meter and leak detection system 10 (126 shown in FIGS. 6 and 200 shown in FIG. 7) can include a removable or a non-removable storage device that can contain use and/or water quality data. This removable storage device may be removed when there is a disruption in wireless transmittal of data, to upgrade configuration programs, or to download stored data. The Water meter and leak detection system 10, (126 shown in FIGS. 6 and 200 shown in FIG. 7) may be fitted with a physical lock that prevents unauthorized individuals from detaching the removable storage device.

Software may be designed to validate digital signatures before water use or water quality data or information can be downloaded or allow registered users to upload updated software and/or firmware. The water use data, updated software and/or firmware may incorporate its own code (e.g. RestAPI) to verify digital signatures to ensure that the original software and/or firmware has not been tampered with and is from an authorized source. The uploaded firmware or software can be written in various languages, to name a few, such as Java, JavaScript, NodeJS, Prolog, Haskell, binary executable code, C+ and C++, and ECMA Common Language Runtime ("ECMA CLR"). In additional, the Water meter and leak detection system 10 (126 shown in FIGS. 6 and 200 shown in FIG. 7) or the remote display means 18, 50, 56, or computer, cell, smart or mobile phone 400 could include a microprocessor that has a data memory bank with data memory that stores the water use data that can be compared with the data that has been transferred and uploaded by the government or municipal second remote display/recorded means 56.

In addition, any stored data, including cached data and data stored in a database, is identified with a digital signature. When the data is retrieved, the digital signature can be used to verify that the data has not been tampered or changed.

Figure 2:
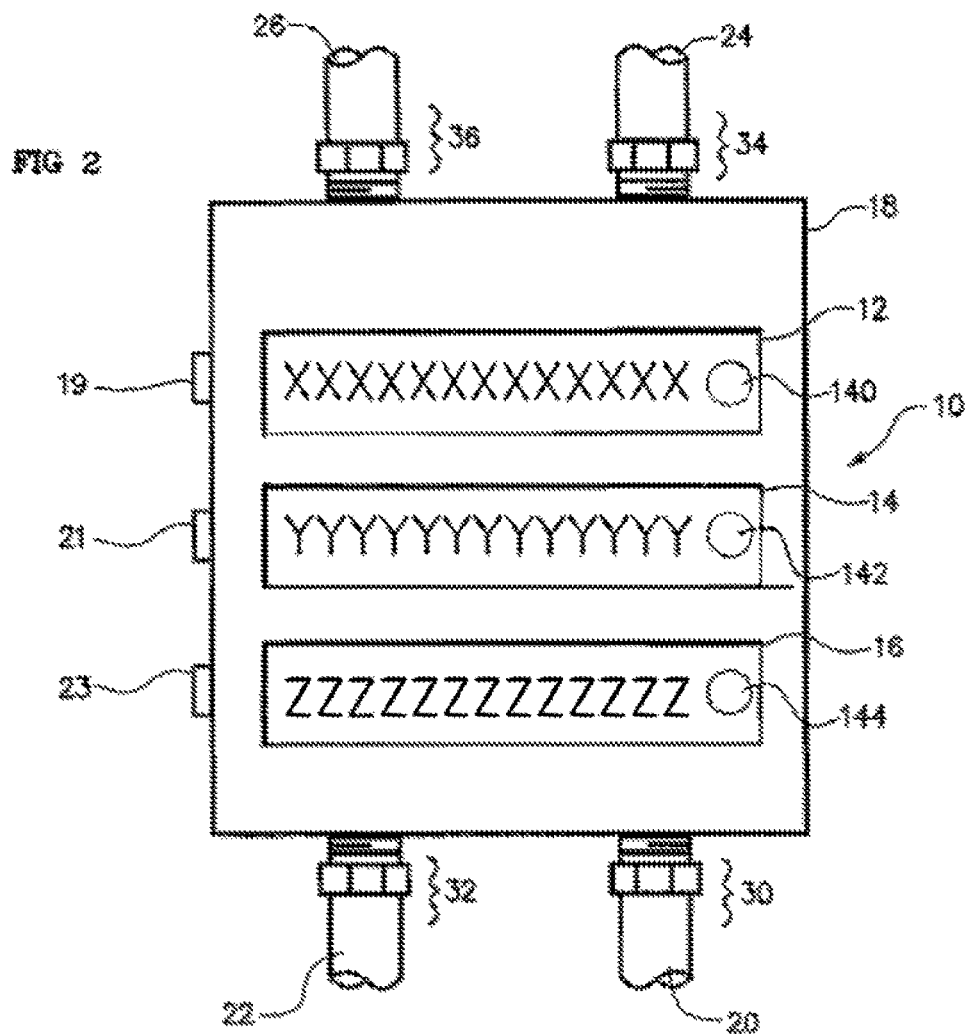
FIG. 2 is a front illustration of an optional display on the water meter and leak detection system showing input and output of a water supplies lines with a display means having one or more display screens and a plurality of hardware and/or software buttons.

Referring now to the drawings and particularly to FIG. 2 is a perspective view of the first embodiment comprising an optional primary or secondary water meter and leak detection system 10 (126 shown in FIGS. 6 and 200 shown in FIG. 7) attached to the cold and hot input water supply piping 14 and water supply piping.

The plurality of water pipe unions or joints 30, 32, 34 and 36 can be fabricated from typical metallic or polymeric materials. Male/Female thread consisting of NPT tapered threads, NPSM straight thread (with O-ring or washer sealing technology) or metric thread configuration or other attachment means, such as adhesive, snap fit joint, compression fitting, flare fitting or other technologies can be employed. The plurality of optional display means 12, 14, and 16 and as presented in FIG. 2 utilizes one or more illuminating technologies, such as LCD, LED, gas plasma, fluorescence, incandescent, halogen, halide, or other lighting technologies. FIG. 2 shows a hot-water and a cold/ambient water input and a hot water and cold/ambient water output for monitoring hot and cold water (water energy). But FIG. 2 also represents (but not shown) a single cold or ambient water input and a cold or ambient water output.

The optional display means 12, 14, and 16 can be programmed to display one or more water parameters in a visual means that can be either an analog, character or digital display, or combination of display formats. Information obtained from the appropriate sensors monitoring or measuring the water parameters such as temperature, date/time, and flow rate can be displayed in an appropriate format on the display means.

Also shown in FIG. 2, one or more optional ergonomically 19, 21, and/or 23 placed buttons or activators can be incorporated into the display housing to allow the modification of certain parameter units (e.g. metric to US), set alarm conditions (e.g. flow/volume rate-set points), or to program certain settings, e.g. over water use alarm, monitor continuous leakage (valve not complete shut off). The buttons will electrically communicate with the electronic circuit board contained with the housing 18 and respond to programmed instructions integrated within the CPU or microprocessor 84 and associated circuitry of the electronic circuit board.

An optional visual alarm or command can be incorporated into the Water meter and leak detection system 10 (126 shown in FIGS. 6 and 200 shown in FIG. 7) whereby a preset alarm or programmed alarm, changes the one or more screen displays, for example, blinking a parameter, or changing the color of a parameter (green to red). For example, one or more displays can exhibit a first background or text color (e.g. green) when a first volume range of water use has been monitored. After a second volume range of water use has been monitored, the one or more displays can exhibit a second background or text color (e.g. yellow). And when a third volume range of water use has been monitored, the one or more displays can exhibit a third background or text color (e.g. red) when a third volume range of water use has been monitored.

The optional visual alarm or command might include visual reference on the water meter or on a cell phone, for example, an in-operative condition, broken sensor, low power source, no flow, reverse flow, and/or some default limits. Programmed visual alarms would allow for individual selection (e.g. volume over set point, flow rate set point, total volume exceeded set points) which might be restricted or not by the default settings.

In addition, an optional auditory alarm can be incorporated into the present invention whereby a preset alarm or programmed alarm, changes the screen display, for example, using sound or pulsing a specific noise, or changing the color of a parameter. For example, the temperature or pressure display can change from green to red when a preset temperature or pressure is beyond a specific or programmed limit. A preset alarm might include visual reference, for example, an in-operative condition, broken sensor, low power source, backward water flow, and some default limits. Programmed auditory alarms would allow for individual selection (e.g. water use over set point, time past set point, flow rate set points) which might be restricted or not by the default settings.

In addition, the water meter and leak detection system 10 (126 shown in FIGS. 6 and 200 shown in FIG. 7) can include water shut off means to turn off the water supply if an alarm condition or setting point is exceeded and has been activated. The water shut off means is electrically connected to the CPU or microprocessor and has an electrical power to move a ball valve position or energize a solenoid valve, such the computer controls the application of electrical power to activate or de-activate the water shut off means. The water shut off means can comprise, for example, a typical electronically controlled ball valve or solenoid shut off valve incorporated into, or in series with, the water meter collection node such that water from the source is closed. The electronically controlled ball or solenoid valve can also be incorporated into the water meter collection node as an integrated unit. The water shut off means can be activated if an alarm state has been achieved, e.g. 200 gals/day of water is exceeded the total of e.g. 50 continual gallons of water has flowed in an unusual duration or flow rate since the water source was opened. The alarm or settings can be a default setting installed by the manufacturer or programmed by the user. In addition, the water meter and leak detection system 10 (126 shown in FIGS. 6 and 200 shown in FIG. 7) can have capabilities such as vacation mode that turns off the water on a specific date and then turns the water on for the returning date. A scheduling mode can also be programmed that turns off the water when the home is unoccupied, e.g. when the family is at work from 8 a.m. to 5 p.m. In addition, the scheduling can be coupled with the vacation mode to allow the water to be turn on only for the date and times the irrigation is desired to be operational. The water control valve can have a variable open design whereby different opening of e.g. ball valve, electrical activation or de-activation can change the opening and resulting flow rates.

Figure 3:
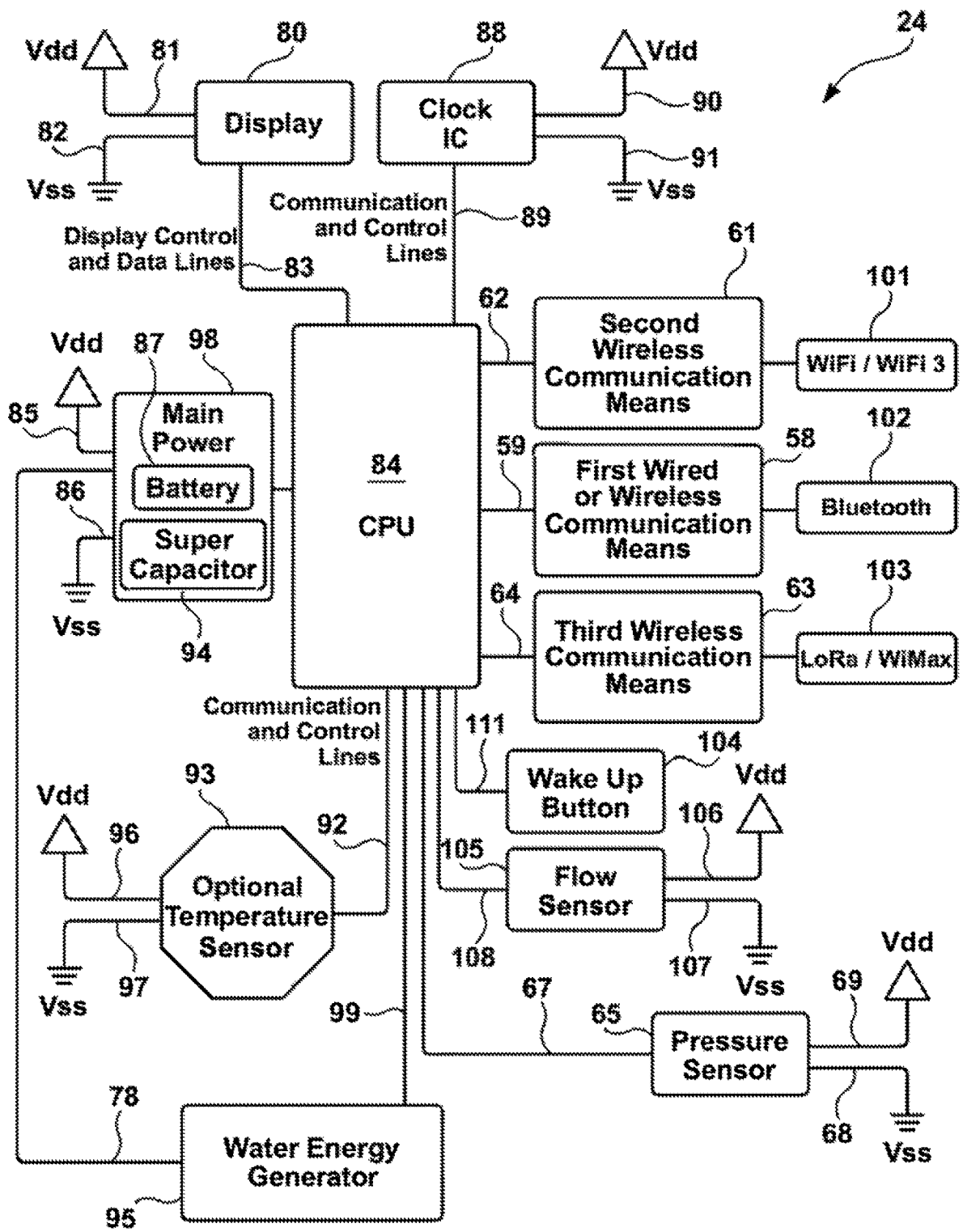
FIG. 3 is an electrical schematic showing the main power, CPU or microcontroller, the analog or digital optional display means, the clock circuit, one or more flow sensors, optional temperature sensor, optional pressure sensor and/or water quality sensor(s), and optional water energy generator, and a first, second and/or third wireless communication technology for data transfer through either a private or public network system and/or the optional collection hub to an internet router. Similar electronic circuitry without the sensors can be used with the optional communication hub.

Now referring to FIG. 3, shown is a is a timing clock integrated circuit 88 with data transfer means 89 for communicating with the CPU or microprocessor, or microcontroller 84 and having a power line 85 and ground line 86. The timing circuit 88 can communicate with the CPU, microprocessor, or microcontroller 84 to an optional display 80 such information such as the time of day and current date and/or a time stamp for the duration that the water supply has turned been on and off. For monitoring the time stamp parameters of the water flowing through the present invention, the use of various trip switches or water sensors near the flowing water can be monitored. The timing clock IC 88 will assists by communicating a signal to the CPU or microprocessor 84 that the water supply has been turn on and then shut off such that the software instructions and CPU or microprocessor can calculate various parameters, such as, but not limited to, the duration of water supply, total number of gallons or liters of water used and flow rates.

An optional temperature sensor 93 with a data transfer means 92 for communicating with the CPU, microprocessor and/or microcontroller 84 and having a power line 96 and ground 97. Also shown is one or more flow sensors 105 (e.g. flow rate, pressure, ultrasonic, turbine, acoustic with a data transfer means 108 for communicating with the CPU, microprocessor and/or microcontroller 84 a power line 106 and ground line 107. Any associated integrated circuits for the timing clock 88, temperature sensor 93 and flow sensor 105 can include circuitry to convert analog data to a digital format. Also shown is a first wireless electronic communication radio or means 58 consisting of Bluetooth, Bluetooth low energy (BLE), Z-wave and Zigbee and other similar short-range wireless technology 102 with a data transfer 59. A second wireless electronic communication radio or means 61 with a data transfer 62 consisting Wi-Fi and WiFi3 and other similar wireless technology where data transfer means 62 communicates with the CPU 84. A third wireless electronic communication means 63 with a data transfer means 64 consisting LoRa, WiMAX, Ultra Narrow Band (UMB), NB-IoT, 6LoWPAN and other similar long-range wireless technology where data transfer 64 communicates with the CPU 84. The third wireless communication can also include cellular technology (46 as shown in FIG. 1) that is designed to communicate data utilizing a cellular format (standard 2G, 3GPP or LTE-M and LG5 cellular) with connection to offsite central monitoring computer using cell towers and other telephone lines via satellite, microwave technology, and the internet. Such cellular format could be CDMA, GSM or another advanced cellular formats (3GPP/LTE-M, NB-IoT, and 5G). The water meter and leak detection system can use any combination of the wireless electronic communication 58, 61, 63. Meters can have removable replacement modules that can be exchanged such that different types of wireless technology modules can be changed in the manufacturing factory or in the field to accommodate wireless needs in different environmental situations.

Also shown in FIG. 3 is an optional display 80 with a power line 81 and ground line 82. The display can utilize LCD, LED, gas plasma, fluorescence, incandescent, halogen, halide, or other lighting technologies.

An optional water energy generator 95 with data transfer communication 99 for communicating with the CPU (microprocessor and/or microcontroller) 84 with a power line 78 to the main power supply 98. The water energy generator 95 can be a turbine, paddle, Pelton type or other similar technology. Recharging batteries 87 or super capacitors 94 can be accessed from a water-resistant door of the collection node housing or with a water-resistant electrical coupler on the housing where the battery(ies) reside outside of the housing for periodic maintenance.

Also shown is an optional pressure transducer or sensor 65 with date transfer communication 67 and a power line 69 and ground line 68. The optional pressure transducer or sensor 65 can be used to provide pressure waves and changes in pressure when water use devices are actuated. The optional pressure transducer or sensor 65 can also be used to monitor pressure loss over a time when the control valve is closed as a leak test.

In efforts to save energy due to wireless transmission and CPU operations, a wake-up button 104 can be included the function to initialize electrical energy after the system goes into a sleeping mode. The wake-up button has a date communication line 111 to the CPU (microprocessor and/or microcontroller). The wake-up procedure preferably is controlled by software that automatically initiates periodically monitoring for the initiation of water flow.

Main power 98 produces a power line 85 and a ground line 86. The main power 98 is preferably one or more batteries 87 and/or on or more super capacitors 94 as the power source. With the one or more batteries or super capacitors, is would be preferable to have the water energy generator 95 to supplant energy when generated during periods that water flow occurs. An example of long-life batteries that can be used with the water meter and leak detection system 10 (126 shown in FIGS. 6 and 200 shown in FIG. 7) are the industrial lithium thionyl chloride (Li-SOCl$_2$)) bobbin-type or spiral wound batteries produced by companies such as Tadiran Battery company. Super capacitors store energy by means of a static charge caused by a voltage differential on position and negative plates. Super capacitors should have a high capacitance which is ideal for applications that require frequent charging and discharging at high current and a short duration. A super capacitor can also operate like a battery with the addition of special electrodes and electrolytes to increase its energy density. Higher voltage can be produced, but the trade-off is shorter service life. To obtain higher voltage, super capacitors must be connected in series. When two or more super capacitors are connected in series, protective circuitry is required to prevent any cell from going over-voltage. The self-discharge rate of a super capacitor can be much higher than a Li-ion battery, as certain super capacitors can discharge 50% to 100% of their available capacity in 30 to 40 days. A LiSOCl$_2$ bobbin type battery with a hybrid super capacitor would be an ideal primary cell power source that offers the highest capacity and highest energy density of any sole lithium cell, along with an extremely low annual self-discharge rate.

It is anticipated that solar panels (water meter box cover) or wind generator can be also used to supplant electrical energy. It is also anticipated that AC or DC (AC-DC adapter) can be used for electrical energy.

The CPU 84 that processes the information supplied by the flow sensor 105, the optional temperature sensor 93, the optional pressure sensor 65, and timing circuit 88 uses internal instructions to control the information projected on a display, transferring water use data by wired or wireless communication, and for processing leak detection alarm states. The microprocessor can include an EEPROM or any type of memory section that allows for specific programming to be incorporated as processing instructions. Furthermore, the microprocessor may have the capability to convert analog signals into digital information for decoding and processing. The CPU can have Analog-to-Digital Inputs that can provide the means for converting the information obtained from the flow sensor 105, the optional temperature sensor 93, the optional pressure sensor 65 from its analog format into a digitized form for processing by the instruction sets of the CPU or microprocessor 84. It is anticipated by the Applicant that more powerful microprocessors with more memory capacity may be utilized to accommodate the more complex operations. There are many other variants or other microprocessors, whether commercially marketed or privately fabricated, that can be used with the present invention.

In addition, a means to record and digitally story the water parameters or data can be incorporated into the present invention. An integrated memory circuit can be incorporated into the CPU or microprocessor 84, or can be a separate memory circuit, and can include associated circuitry with a means to transfer the recorded data to a removable media, such as a flash mount on an electronic circuit board to control the display means and communicate with the sensors. Various data access ports, such as serial, parallel, or USP can be used to transfer the stored data to another device, such as a computer. The CPU or microprocessor 84 and associated circuitry mounted on the electronic circuit board can also have the capability to be programmed for controlling certain display means (e.g. U.S. or metric units), programming alarm or setting states (e.g. flash all display means red when the total volume has exceeded a certain volume, for example, 175 gallons/day).

Because the water meter and leak detection system (126 shown in FIGS. 6 and 200 shown in FIG. 7) can be used in situations where the source of water comes for a well or non-commercial operation, and furthermore, where the commercial operations water treatments plants are under pressure to provide more water supplies or where problems, breakdowns or accidental situations can cause contamination of the water source, the present invention can be fitted with, display parameters of, and provide warning for, numerous mineral, elements and biological contaminates.

Not shown but could be included with the water meter and leak detection system (126 shown in FIGS. 6 and 200 shown in FIG. 7) or added as a removeable and replacement modules as described herein, is the acoustic sensor technology and associated software that can be used to identify water valve movement.

Figure 4:
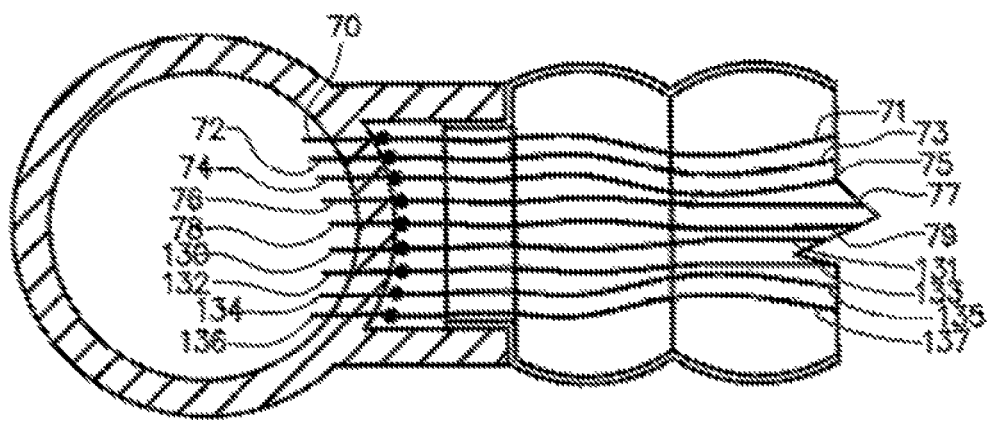
FIG. 4 is a cross-section illustration showing a plurality of water flow and water quality parameter sensors located in relative positions within the water supply line lumen and the connecting wires.

As illustrated in FIG. 4 is a cross-section showing the one or more sensors 70, 72, 74, 76, 78, 130, 132, 134, and 136 located in close proximity to, or within a, water supply line and/or a water delivery supply line and their relative position of the sensors in the supply line lumen and the connecting wires 71, 73, 75, 77, 79, 131, 133, 135 and 137 for the display means, data transfer etc. For exemplary purposes, sensor 72 could be a timing sensor e.g. to monitor when water is flowing, sensor 74 can be another temperature sensor, sensor 76 can be a pH sensor, 78 can be a halogen (e.g. chloride or fluoride) sensor, 130 can be a total dissolved solids sensor, 132 can be a biological or fecal sensor, and 134 can be a water hardness sensor and 136 can be a specific iron or other mineral sensor.

In general, a sensor is type of transducer that is generally paired with an indicator display. Most sensors are electrical or electronic, although other types exist (e.g. mechanical).

Technological progress allows for more and more to be manufactured on the microscopic scale as micro-sensors using MEMS technology. In most cases a micro-sensor reaches a significantly higher speed and sensitivity compared with macroscopic approaches.

There are many types of sensors that can be used with the present invention. Since a significant small change involves an exchange of energy, sensors can be classified according to the type of energy transfer that they detect. For measuring or monitoring the temperature of the water flowing through the water meter and leak detection system 10, 126, the use of various thermocouples or thermistor sensors 70 as depicted in FIG. 3 is protruding within the water supply lumen 38 (or in close proximity to the water to be measured) and mounted within the articulating joint mechanism 22.

Wires 71 are shown extending from the sensor 70 to electronically communicate with the CPU or microprocessor 84 and display unit.

A thermistor is a type of resistor used to measure temperature changes, relying on the change in its resistance with changing temperature. Thermistors can be classified into two types depending on the sign of k. If k is positive, the resistance increases with increasing temperature. If is negative, the resistance decreases with in decreasing temperature, and the device is called a negative temperature coefficient (NTC) thermistor.

It is anticipated by the Applicant that various types of thermocouples or thermistors can be used for the present invention. It is not important what type of thermocouple or thermistor is utilized for monitoring the water supply lines except that it is accurate for the appropriate temperature range monitored or measured.

To monitor or measure the flow rate of the water being delivered by the water supply line various flow measuring technologies are applicable to the present invention water meter.

The flow sensor 105 can be fabricated from pressure sensor technology. There are three general types of pressure sensors and each offers advantages and disadvantages for applied pressure monitoring operations. The three types are 1) absolute, pressure, 2) differential pressure measurement and 3) gauge pressure measurement. Absolute pressure references pressure in in a perfect vacuum. Differential pressure measurement compares the difference between two applied pressures. Gauge pressure measurement is a subtype of differential pressure measurement and compares the ambient atmospheric to the applied pressure. Pressure sensors can be utilized with the present invention for accurate monitoring or small leaks. Examples of pressure sensors are the pressure transducer (sensor) TI2C marketed by Anfield and for a differential sensor the Motorola MPX5700 series. Pressure sensors can be particularly useful in measuring small leaks by shutting of the water supply line and then monitoring the pressure loss over time.

There is also a category of pressure sensors that are designed to measure in a dynamic mode for capturing very high-speed changes in pressure. These sensors are commonly manufactured out of piezoelectric materials like quartz. Pressure sensors can perform as a flow rate sensor (e.g. the differential pressure gauges Motorola MPX5700) or be sensitive types that can sense pressure waves and pressure changes for water pattern analysis. One particular use would be to use the pressure sensor (e.g. ceramic capacitive pressure sensor) to monitor the pressure of a private or public property(ies) after a water control valve has turned off the water supply. The pressure sensor can then measure the decay in pressure reads to observe and indicate small leaks (dripping faucet).

Acoustic sensors are advancing to the point where they can monitor water flow and pressure readings that are approaching accurate quantifiable results. But acoustic sensor original function is to listen and record water valve noises and vibration frequencies. It is anticipated that all water devices have a valve with a unique "open" and "close" noise and vibration frequency. An acoustic sensor can therefore be significantly useful for identifying various water devices such as showers, washing machines, toilets, irrigation valves, bathroom and kitchen faucets, and other water fixtures and appliances. As each of the water use devices is used, the acoustic sensor can specifically identify the particular water use device. This is useful to characterizing water use as shown n FIG. 13. It so useful in apartment or condo situations where this is only a single water meter serving apartments or condos. The acoustic sensor will be able to characterize all the various water use fixtures, appliance and devices contain within these apartments and condos. The acoustic sensor can also be used to detect water leaks as water leaks make noises like water valves opening and closing, But water leaks (e.g. toilet flapper valves, dripping faucets) tend to have more continual noise patterns that can last for longer periods. The acoustic sensor identifies use water valve movements and noises when being opened or close, or observing vibrational frequencies when water is flowing past the water valve (toilet flapper valve). Proper billing for water use can then be accomplished without plumbing modifications. To supplement the acoustic sensor, various noise making orifices or vibration devices can be installed at various locations for identification by the acoustic sensor. With artificial intelligence (AI) and other programming software, the acoustic sensor can now monitor water flow characteristics. Like a flow rate sensor, the acoustic sensor with programming software can also monitor or add information to augment the flow rate, the duration and the total water volume to determine water signatures and patterns of water fixtures and appliances.

In addition, various flow measuring technologies can be utilized as the flow sensor 105. In general, a flow sensor is a device for sensing the rate of fluid flow. Typically, a flow sensor is the sensing element used in a flow meter. There are various kinds of flow meters, including invasive (sensor movement within the tube or pipe) that have a vane, wheel, or turbine structure that is pushed by the fluid, and can drive a rotary potentiometer, or other similar device to monitor the flow rate. Flow meters can use a displacement piston, pushing it against a calibrated spring is a qualitative method and can only be used to show if the flow is on or off. Non-invasive flow rate sensors (sensor outside of the pipe) can be time-based or Doppler-based ultrasonic technology, or magnetic type flow sensors for measuring and recording water flowing through a tube or pipe.

The Pelton wheel turbine, paddle wheel and axial turbine translates the mechanical action of the specifically shaped objects rotating in the liquid flow around an axis that is translated into a user-readable rate of flow magnetic or optical monitoring technology. To function adequately, the specifically shaped object or paddle must be at least partially inserted into the water flow.

In addition, non-invasive (outside the water flow pathway) magnetic and ultrasound flow meters can be utilized with the present invention to function as the flow sensor 105. Modern innovations in the measurement of flow rate incorporate electronic circuitry to correct for varying pressure and temperature. The magnetic flow meter, utilizes a magnetic field is applied to a tubular structure that has electrical insulating properties.

The ultrasonic flow meters can measure water flow using two methods; transit time and 2) doppler shift. Both methods are possible by use of modern electronics. The transit time method measures the difference of the transit time of ultrasonic pulses propagating in and against flow direction. This time difference is a measured for the average velocity of the water flowing through a specified path by the ultrasonic beam. The Doppler shift method monitors water flow rate by passing an ultrasonic beam through the water pipe, bouncing the beam off a reflective plate that reverses the direction of the beam, such that the flow rate of water flow can be estimated. The speed of transmission is affected by the movement of water in the pipe and by comparing the time taken to complete the cycle upstream versus downstream the flow of water through the pipe can be measured. The difference between the two speeds is a measure of true flow rate.

Fluid flow rate can be measured using monochromatic laser diode. The laser probe is inserted into a water stream and turned on, whereby the laser light scatters, and, a portion is reflected back to the probe. The signal is then electronically processed to calculate flow rate within the water pipe. The laser diode flow meter is more useful for relative rather than absolute measurements.

Multi-jet meters, positive displacement meter, single jet meters, pressure sensors, magnetic, ultrasound and Coriolis flow meters can be utilized with the present invention to function as the flow sensor 105.

In addition, as shown in FIG. 4, is an optional halogen (chloride or fluoride) sensor 78, Total Dissolved Solids (TDS) sensor 132, optional sensor 136 to measure or monitor the amount of iron and other metallic ions, biological or fecal coliform sensor 132, optional pH sensor and optional water hardness sensor 134.

Figure 5:
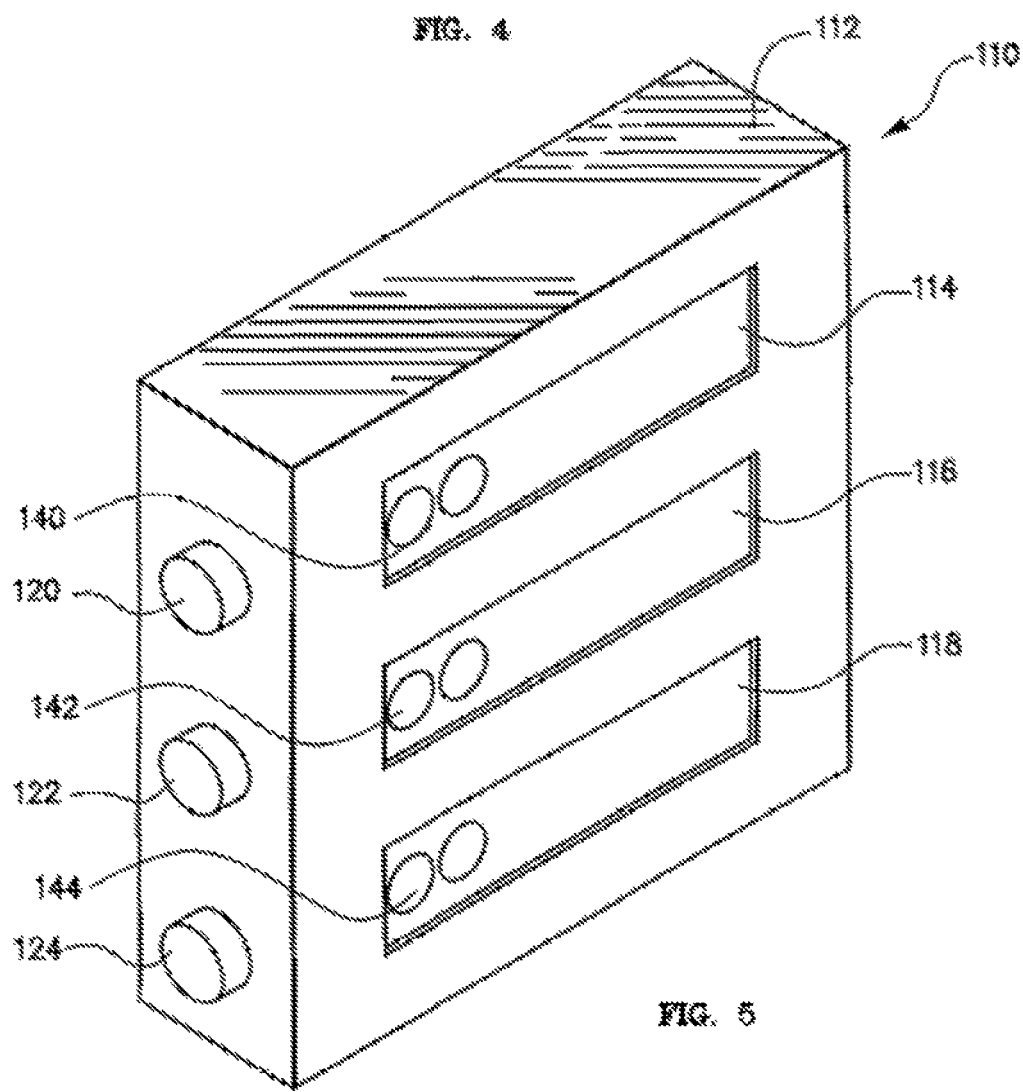
FIG. 5 is an illustration of an optional custom wireless display/recording remote apparatus having a plurality of display means and a plurality of software controlling buttons.

Nor referring to FIG. 5, which presents an example 110 of either the custom display/recorder 50 or the second optional (handheld) display/recorder 56. The first display/recorder 50 or optional second (handheld) display/recorder 56 includes a housing or container 112, display means 114, 116, and 118, software control buttons 120, 122, and 124, the electronic circuit board with wire or wireless capability, and power source are common between the two apparatuses. It is also anticipated that a third type of display/recorder (not shown) could utilized with computer, television or cell phone, smart phone or similar apparatus that has an internet, intranet, wire or wireless means. In this first display/recorder 50, the second display/recorder 56, or a third computer, television or cell phone, smart phone or similar electronic apparatus 400 can utilize custom software and/or market software that will be used to transfer the water parameter information from the water meter and leak detection system 10 (126 shown in FIGS. 6 and 200 shown in FIG. 7) to the first display/recorder 50, the second display/recorder 56, or the third computer, television, or cell phone, smart phone, computer or similar electronic apparatus 400.

The display means 114, 116, and 118 can be programmed to display one or more parameters in a visual means that can utilize analog, character or digital display technology, or combination of the different display technology. Information obtained from the appropriate sensor monitoring or measuring the water parameters such as temperature, date/time, total volume over time, and flow rate can be displayed in an appropriate format on the display means. For example, when a sensor is monitoring or measuring the rate of water flowing from a water source and through the water meter and leak detection system 10, 126, the display means could show any flow between 0.1 gal/min (0.1 liters/min) to many thousands of gals/day.

Also shown in FIG. 5, one or more ergonomically 120, 122, and/or 124 placed buttons or activators which can be incorporated into the display means housing to allow the modification of certain parameter units (e.g. metric to US), set alarm conditions (e.g. flow/volume rate-set points), or to program certain settings, e.g. over water use alarm, monitor continuous leakage, and/or control valve not complete shut off or completely open. The buttons will electrically communicate with the electronic circuit board contained with the housing or container 112 and respond to programmed instructions integrated within the CPU or microprocessor and associated circuitry of the electronic circuit board. The buttons or activators 120, 122 and/or 124 should be mounted with the display means housing 124 with the capability to protect the buttons and electronic circuitry with the housing for exposure to moist and wet, or freezing conditions.

Now referring to FIG. 6 is a perspective view of a plurality of optional water flow rate with transceivers located near or attached to water use appliances. The flow sensors/transceivers modules communicate wirelessly with the water meter and leak detection system 10, 126 (and 200 in FIG. 7) at various locations for monitoring water use and furthermore for monitoring for water leaks. Shown in FIG. 6 is water input supply line 121 connected to the water meter and leak detection system 10, 126 (and 200 in FIG. 7) and a water supply output 124. The water then travels irrigation controller (shown as a box) with wireless connectivity module 120a that communicates with and the water meter and leak detection system 10, 126 (and 200 in FIG. 7) and having an irrigation input and output supply lines 122. Also shown is a typical washing machine 128 with wireless connectivity module 120b that communicates with the water meter and leak detection system 10, 126 (and 200 in FIG. 7). Shower 123 with wireless connectivity devices (flow sensors/transceiver) module 120c that communicates with the water meter and leak detection system 10, 126 (and 200 in FIG. 7). The independent flow sensors/transceivers can also be located on water use devices such as sinks, toilets, hot water heaters 120b, bathtubs, dishwashers, pool filling equipment and the like.

The water meter and leak detection system 10, 126 (and 200 in FIG. 7) can include a series of water flow sensors or pressure sensors that can be connected to different locations, such as at the private and/or public property(ies) main indoor water supply and the irrigation system. In this way, the use of indoor water use (data acquired by the installed water meter and leak detection system 10, 126 and 200 shown in FIG. 7) and outdoor water (data acquired by flow or pressure sensor at irrigation system) use can be independently monitored. This Can be useful for an individual or commercial operator to employ water conservation methods (e.g., reduce the sprinkler frequency or duration). Alternately, the monitoring of indoor water use, and outdoor water use, could be utilized by the water supplying municipality or government agency to apply different rates for indoor water use and outdoor water use. In certain situations, a control valve can be located at a particular location, e.g. the irrigation valve whereby by utilizing the two-way wireless capability of the water meter and leak detection system 10, 126 (and 200 shown in FIG. 7), whereby the water supplying municipality or government agency can remotely control water use (e.g. send out a code that inhibits outdoor water use on certain days or at certain hours of the day).

The water meter and leak detection system 10, 126, (and 200 shown in FIG. 7) can also communicate with the invasive flow sensor, non-invasive flow sensor, pressure sensors and/or sensitive flow sensors with transceivers to include software instructions for programming time intervals for water parameter data transmission.

Coordination of data packet transmissions from the invasive flow sensor, non-invasive flow sensor, optional pressure sensors, and optional acoustic sensors can be programmed to define a schedule to communicate or transfer data from each sensor. The water meter and leak detection system 10, 126, (and 200 shown in FIGS. 7 and 15) can run a master schedule for querying each invasive flow sensor, non-invasive flow sensor, optional pressure sensors, and optional acoustic sensors. For example, water meter and leak detection system 10, 126 (and 200 shown in FIGS. 7 and 15) can transmit a message to a specific collection node and that collection node can then sequentially request data from each of its invasive flow sensor, non-invasive flow sensor, optional pressure sensors, and optional acoustic sensors. This systematic process can reduce data packet collision on the network and can make the water meter and leak detection system 10, 126 (and 200 shown in FIG. 7) immediately aware of any invasive flow sensor, non-invasive flow sensor and/or sensitive flow sensors with transceivers that might be having trouble transmitting its data packet. The water meter and leak detection system 10, 126 (and 200 shown in FIG. 7) can transmit an acknowledgement to each invasive flow sensor, non-invasive flow sensor and/or highly sensitive flow sensors with transceivers after successfully processing a data packet.

The software in the water meter and leak detection system 10, 126 (and 200 shown in FIG. 7) is designed to perceive water flow characteristics in the facility for a given unit of time, such as, for example, a day, for every unit in the facility. The software should be designed to identify numerous conditions, such as, for example, faulty toilet valves, periodic and irregular water flow for example toilets, irrigation leaks, faucets, and a slow (or fast) constant water flow, a characteristic of a leakage condition.

Referring to FIG. 7, the water meter and leak detection system generally comprises a water meter and leak detection system 10, 126, 200 with water shut-off/on mechanism 310 strategically located between a main supply line 208 from a water main and a household water supply line 210 to a private and/or public property(ies) 202. The water meter and leak detection system 10, 126, 200, with water shut-off/on mechanism can be activated and deactivated by a remote controller 220 to selectively turn on and off the water through the household water supply line 210. In the preferred embodiment of the present invention, the water meter and leak detection system 10, 126, 200 with water shut-off/on mechanism 310 is located with respect to the water supply line 208 such that water flow through the water supply line 210 to the living quarters of the private and/or public property(ies) 202 may be prevented while still allowing water flow to non-residential areas, such as to sprinkler lines.

It is anticipated by the Applicant that separate water shut-off/on mechanisms 310 can located on the water supply line 208 and the irrigation water supply lines. The multiple water shut-off/on mechanisms will have electrical circuitry and wireless radios such they can be controlled remotely through communication and commands/signals with the remote server over the internet from a cell phone APP. It is also anticipated by the Applicants that the water meter with leak detection system 10, 126, 200 with water shut-off/on mechanism 310 can take the place of, and function as, the main water meter and/or incorporate a pressure reduction valve (see FIG. 9). FIG. 7 also shows the Water meter and leak detection system 10, 126, 200 with water shut-off/on mechanism 310 connected with a wired means 205 from a solar electrical generation 204 and/or connected with a wired means 207 from a wind electrical generation 206. In this regard, the water meter and leak detection system 10, 126, 200 with shut-off/on mechanism 210 can be battery operated and utilize re-chargeable batteries or super capacitors that can be charged with a water turbine electric generator or have typical batteries that are replaceable. The water meter and leak detection system 10, 126, 200 with shut-off/on mechanism 310 can also be AC or DC powered. An antenna 322 is shown extending from the water meter collection node with water shut-off/on mechanism.

The housing for the water meter and leak detection system 10, 126, 200 (with water shut-off/on mechanism 310) can be fabricated from a metallic or polymeric material with sealing technology to protect from moisture damage, excessive heat or freezing conditions.

The joint between the water supply lines 208 and 210 and the water meter and leak detection system 10, 126, 200 with water shut-off/on mechanism 310 could be screw and thread fitting, compression fitting, flare fitting, solder, brazed, or sweat joint, adhesive technology and/or use typical plumbing techniques. The joint may be designed to be permanent or removable.

The water meter and leak detection system 10, 126, 200 can incorporate a freeze design feature (not shown) which, before a freezing condition (water temperature approaching 32 degrees Fahrenheit or zero degrees Celsius) is encountered, activates a sacrificial freezing mechanism. It is anticipated that the water meter and leak detection system would contact the home or corporate owner bt text, email or call when the temperature approaches the freezing temperature (e.g. 2-3 degrees above freezing but can be based on historical data or a rapid decrease in temperature. This technology is commonly called "frost plugs" or "freeze plugs". This protects the more expensive water meter and leak detection system 10, 126, 200 and private and public building water distribution piping by sacrificing the less expensive and easy to install frost/freeze plug. The optional frost/freeze plug technology is typically used in outside underground pits or poorly heated garages or utility rooms. In some extraordinary freezing situations, the optional frost/freeze plug can be incorporated with a draining mechanism or system (not shown) that allows the water to passively drain from the private or public property(ies) water pipes or forcefully removes the water from the water pipes with a power system. Another method to protect from freezing conditions is to use a three-way control valve whereby the third port drains water from the private or public property (ies). Software will be designed to position the three-way control valve in all three positions. And it is anticipated that in these extraordinary freezing situations, the draining mechanism or system can also replace the water in the water pipes with air, nitrogen or other gas/liquid that have low freezing points and non-toxic conditions, that can withstand the freezing conditions to minimize damage to the water pipes. Furthermore, be communicating with a home router, the water meter and leak detection system 10, 126, 200 can communicate with intelligent thermostats sending a signal to turn on the residential or corporation heat to a temperature that will inhibit freezing water in the residential and corporation interior water pipes.

The water meter and leak detection system 10, 126, 200 with water shut-off/on mechanism 310 software controls when water is interrupted or allowed to flow into the private or public property(ies) facility or building, or to help program the for scheduled water interruption times (off from 8:30 a.m. until 4:30 p.m. then on, off again at 11:00 p.m. until 5:00 a.m. and then on again). A display means 211 can display calendar information, such as the date and current time (12 hr. or 24 hr. format). The water meter collection node 200 can be programmed using a wire or wireless technology such as an alarm system or use touch screen button technology on the display. The display and display housing must be able to sustain capability in outdoor wet and/or hot/freezing conditions. The display 211 can have a background light that is used for various purposes, for example, for providing better lighting conditions or changing color e.g. from green to red, to display an alarming condition. The display can utilize touch screen technology.

One of the key features of the water meter and leak detection system 10, 126, 200 is that it has a convenient means that facilitates activation and/or deactivation of the water flow from the main water supply when a private or public property(ies) facility or building when it becomes vacated or unsupervised. An vacated or unsupervised private or public property(ies) facility or building can utilized a passive infrared sensor (PIR sensor) is an electronic sensor that measures infrared light radiating from objects in its field of view. The PIR sensor can communicate wired or wirelessly with a router that sends a signal to the water meter and leak detection system 10, 126, 200. Shown in FIG. 7, is an individual 212 holding a cell phone, smart phones, or similar electronic mobile apparatus 400 for communicating with the water meter and leak detection system 10, 126, 200 to control the water flow.

For leak detection capability is would be, preferred that the water meter and leak detection system 10, 126, 200 with a water shut-off/on mechanism 310 include programming instructions with a timing circuit to allow a user to program a defined time schedule. In this manner, the private or public property(ies) owner may simply establish that the water supply will be shut, off or blocked during non-working hours, during a vacation, and/or during sleeping hours. The scheduling could be a daily, weekly, monthly or annual or on a water use basis. The Programming of the timing schedule could be input into the CPU of the water meter collection node or the communication huh (or receiving station) via various methods, e.g. wireless or wired communication with a computer with appropriate software, using the remote controller using touch screen technology on the display means, or cell phone, smart phones, or similar electronic mobile apparatus 400. The vacation schedule can even be programmed, to turn on for the irrigation schedule to water the home or corporate plants, shrubbery or ground cover. This modified programming will turn off the supply water during a vacation and automatically turn on the supply water when the irrigation controlling is programmed to water the yard or area, e.g. 6-8 a.m. on Monday, Wednesday and Friday.

Figure 8:
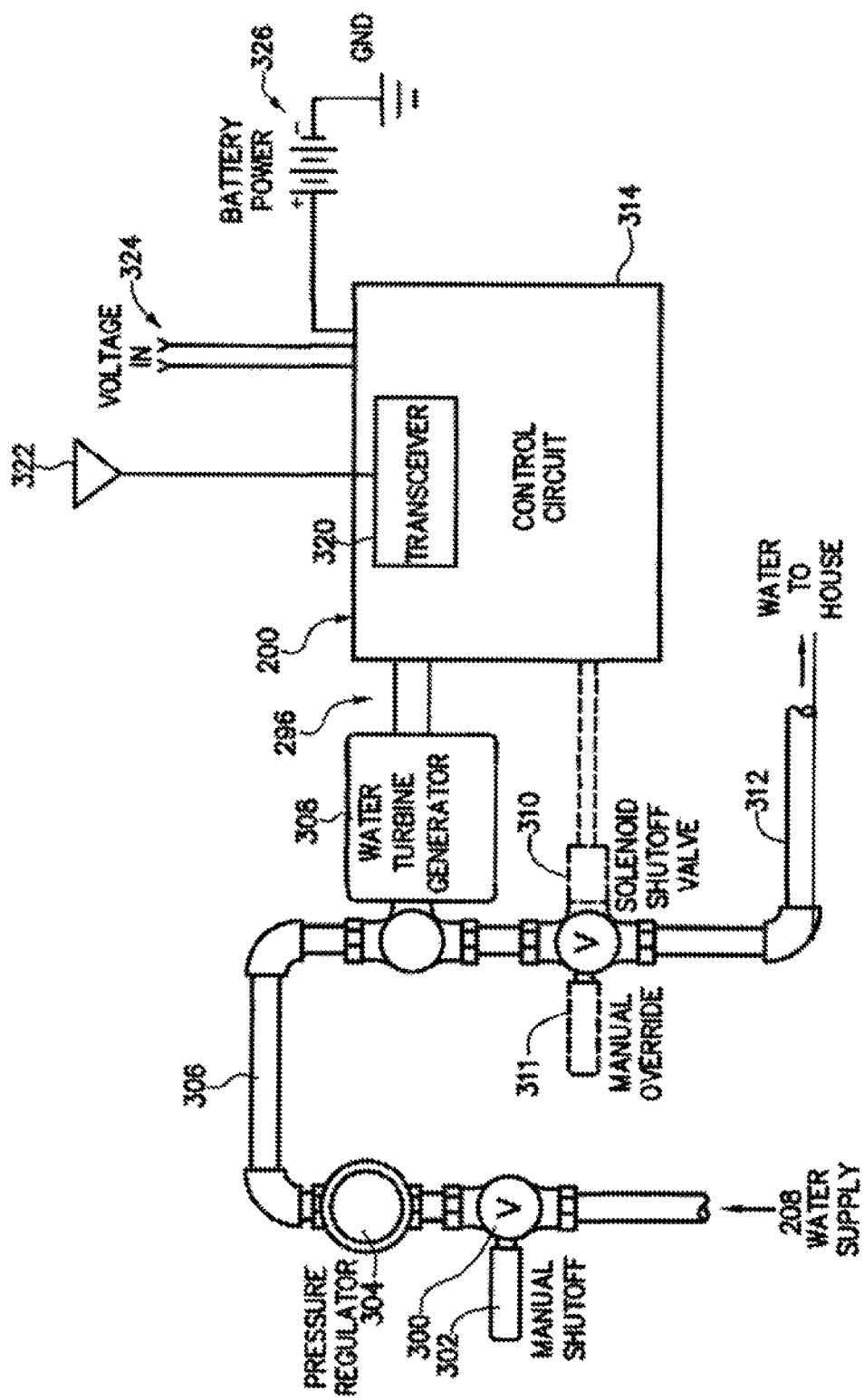
FIG. 8 is a more detailed illustration of the water meter collection node with the control circuit, a wireless transceiver, power supply, a water shut-off/on mechanism with a manual control, and water supply plumbing with optional water turbine energy generator that connected in series to the water supply line.

Now referring to FIG. 8, shown is a perspective more detailed view of the water meter and leak detection system 10, 126, 200 with water shut-off/on mechanism 310 and water supply plumbing, and with optional water turbine generator 308 that is located within the water supply line. The water supply line from the water main 208 can optionally include a manual shut off valve 300 with handle 302. The manual shut off valve 300 can be a ball valve, solenoid valve, gate value type, piston valve, or other known technology. Further along the water supply line is an optional pressure regulator 304 with a connecting pipe 306 to the water meter and leak detection system 10, 126, 200 with water shut-off/on mechanism 310. The optional water turbine generator 308 could be utilized to produce electrical energy for recharging the rechargeable battery source 326. The water shut-off/on mechanism 310 can be a ball valve, solenoid valve, gate value type, piston valve, or other known technology with electronic activation. A mechanical lever or electric button/toggle switch 311 can be incorporated on the water shut-off/on mechanism to allow the modification of the mechanism to open or close the water flow in emergency and necessary situations. The water meter and leak detection system 10, 126, 200 has a transceiver 320 that includes an antenna 322 which can be external or internal. The control circuit for the water meter and leak detection system 10, 126,

200 shown in more detail in FIG. 3, includes programmable CPU, a power source using either a battery or super capacitor (rechargeable) 326 or typical AC or DC supply 324, and/or electrical circuitry, wireless or hard-wired components, and optional sensors and associated circuitry. Also shown is a battery voltage 326 which would electronically engage the optional solar cell 302 or wind generator 206 to provide additional electrical energy. It is anticipated by the Applicant's that the water shut-off/on mechanism 311 (ball valve or solenoid shutoff valve), and if used, the optional water turbine generator 308, could be incorporated within the water meter and leak detection system 10, 126, 200 as a single unit. It is also anticipated that the water meter and leak detection system 10, 126, 200 with water shut-off/on valve 310 could replace and additionally include the function of a pressure regulator (see FIG. 9), eliminating one of the components shown in this drawing. Exiting from water meter and leak detection system 10, 126, 200 with water shut-off/on mechanism 310 is the main water supply 312 to the private or public property(ies) building or structure. It is also anticipated that water meter and leak detection system 10, 126, 200 with water shut-off/on valve 310 could replace, and function as, the main water meter.

Figure 9:
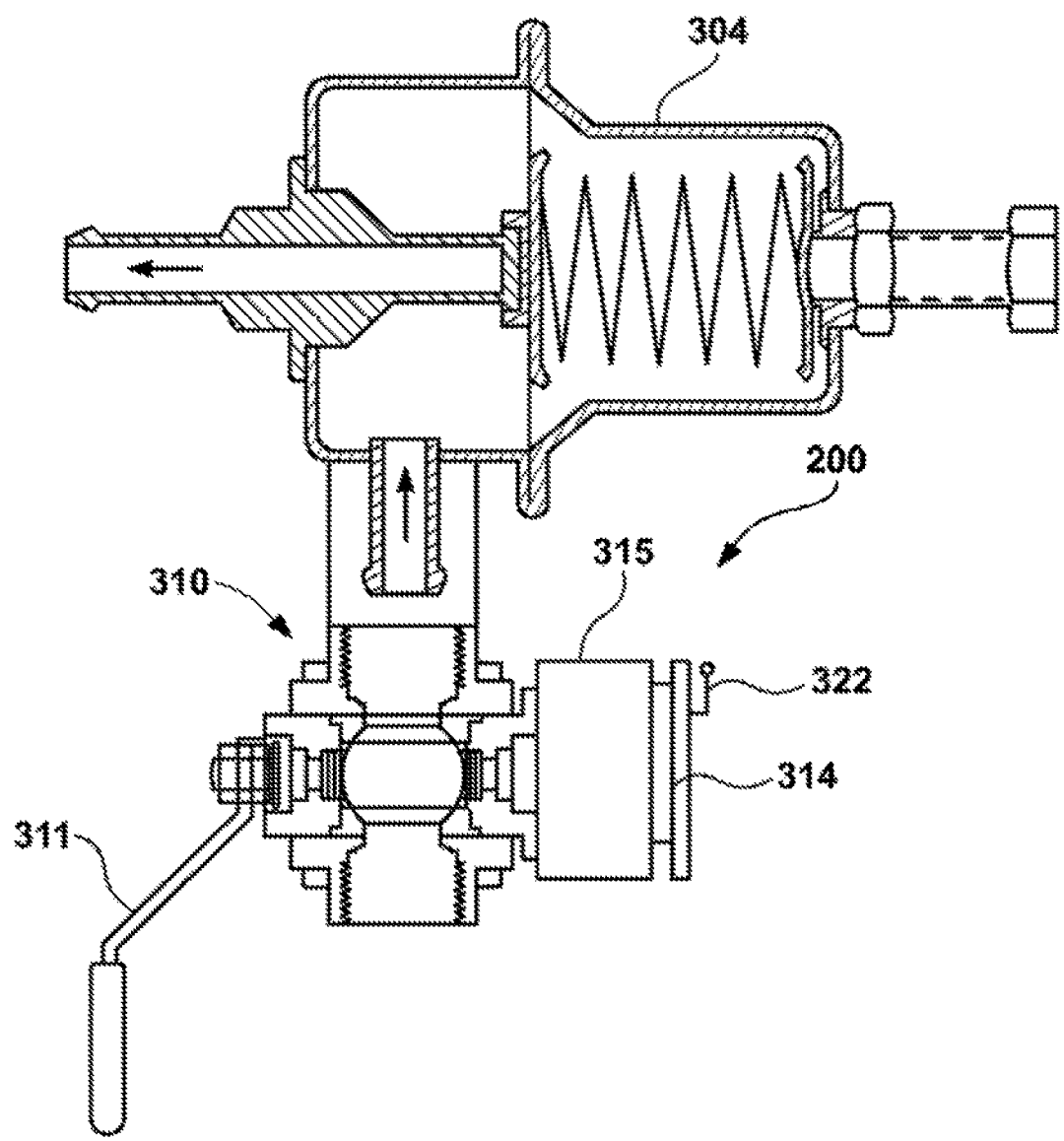
FIG. 9 is another embodiment of the present invention with a detailed illustration of the water shut-off/on mechanism combined with an independent pressure reduction valve and functioning as a combined system consisting of a water meter collection node with one or more water flow sensors having a water shut-off/on mechanism and pressure reduction valve.

FIG. 9 is another embodiment of the water meter and leak detection system 10, 126, 200 with a perspective detailed view of the water shut-off/on mechanism combined with an independent pressure regulator or reduction valve and functioning as a combined system consisting of a water meter collection node with one or more water flow sensors having a water shut-off/on mechanism and pressure reduction valve. Shown is a typical water pressure reduction valve 304 connected directly with the water meter and leak detection system 10, 126, 200 with water shut-off/on mechanism 200 having a ball valve 310, a manual on-off handle 311, an electric motor 315, electrical circuitry 314 with a wireless antenna 322.

Figure 12:
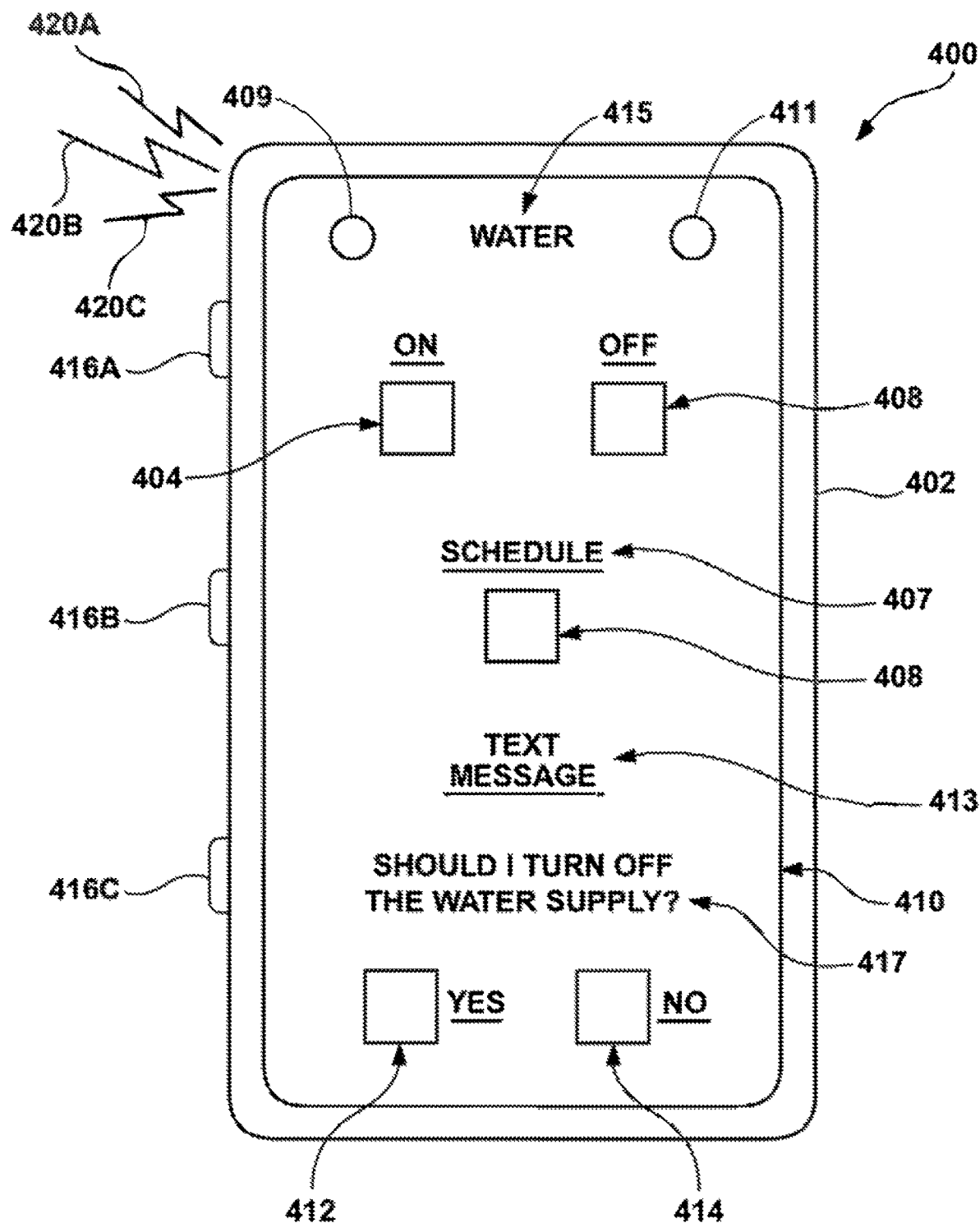
FIG. 12 is an enlarged illustration of another typical cell or smart phone, computer or similar electronic apparatus having an "APP" or programmed application, or another page of an "APP" or programmed application to display the soft buttons or control activator to turn on/or the water system, program a schedule to control the water shut off/on mechanism, or receive a text message.
Figure 13:
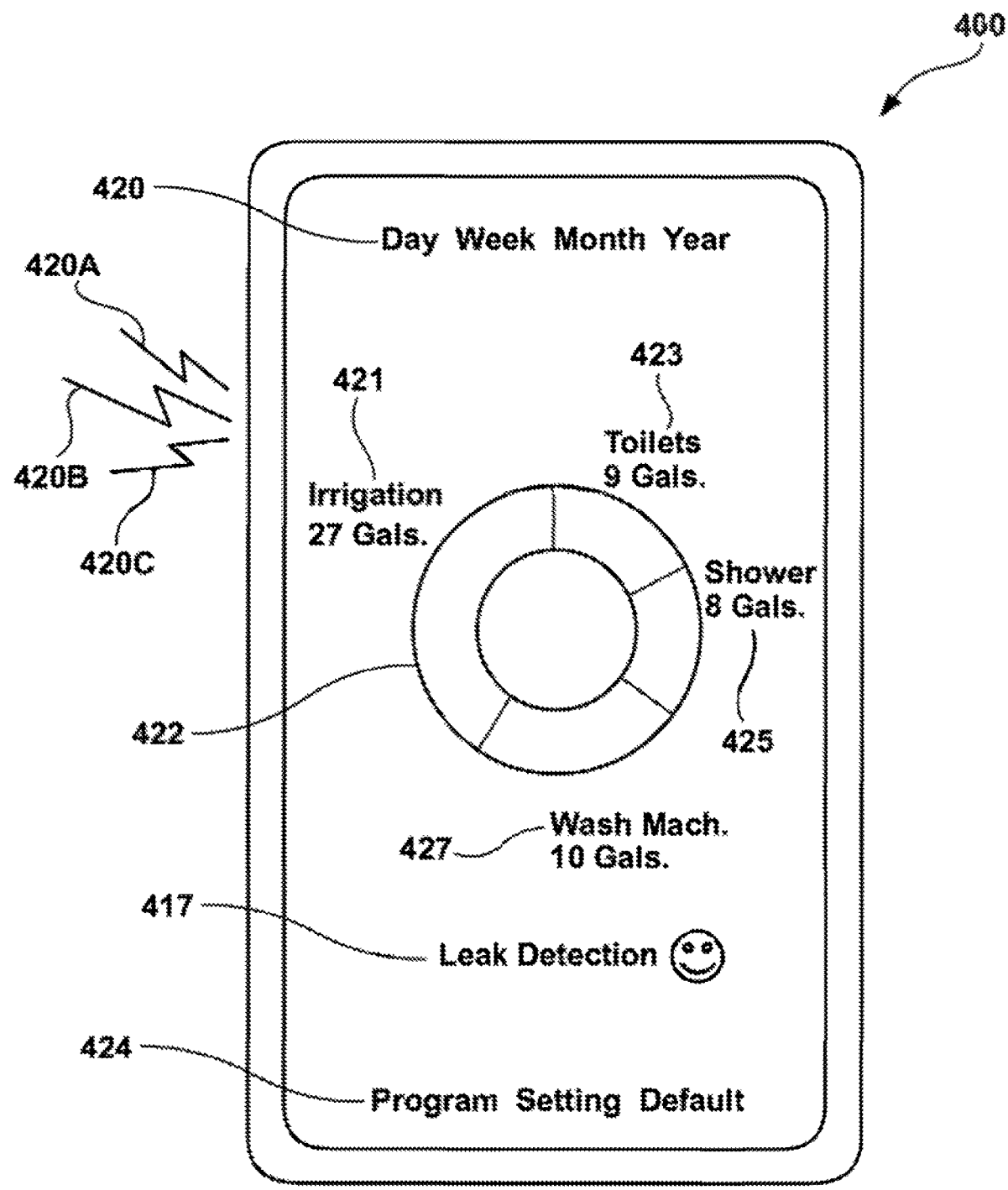
FIG. 13 is an illustration of a typical cell or smart phone, computer or similar electronic apparatus having another "APP" or programmed application, or another page of an "APP" or programmed application to display the soft buttons to determine the period for displaying, graphical of water use devices, leak detection graphical item, and programming and settings features.

Now referring to more detail in FIG. 10, (with additional application programs, or APPs as shown in FIGS. 11, 12, 13) where water parameter data can be display on a cell phone, smart phone, computer and other electronic apparatus 400 as defined herein.

FIGS. 10-13 show a cell or smart phone, computer, or other apparatus 400 running an "APP" or a sequence of "APP" pages that show, in a pie chart, bar chart, or other format, the water uses of particular areas of the private and or public property(ies). The water meter and leak detection system's flow rate sensor(s) and software uses calculations from the water flow rate, water use duration, and total volume of water to differentiate water use devices (e.g. shower, faucet, bathtub, toilet, washing machine, water heater, dishwasher, and outside irrigation system) can be to show the water uses. Other outdoor water uses such as pool or hot tub or water fountain water maintenance can be included for water use monitoring. The addition of an acoustic sensor can monitor valve movement, vibration, and noise patterns (sound and pressure patterns) which can sense water valve position or movement, with the water meter and leak detection system 10, 126, 200 can provide more specific differentiation of water use devices. Using AI software technologies, the acoustic sensor could be calibrated to monitor water rate flow and water pressure.

The cell phone, smart phone or other electronic apparatus 400 or custom display and/or a recording apparatus 50, 56 and 110 has the convenient function of providing an individual or entity to review water use and water parameter data on a real time basis for auditing or monitoring purposes. The wireless communication means can use radio-frequency, Bluetooth, Bluetooth low energy ZigBee Wi-Fi, Wi-Fi3, LoRa, 6LoWPAN, Ultra Narrow Band (UWB), standard cellular or advanced 3GPP, NB-IoT, LTE-M and 5G cellular technology or other wireless technology for transferring the water parameter data generated by the sensors and collected by the microprocessor and sent by wireless communication technology for data transfer through either a private or public network system and/or the optional collection hub or receiving station to an Internet router. And command signals can be sent back to the water meter and leak detection system 10, 126, 200 with water shut-off/on mechanism 310 or software updates, activate or deactivate the water shut-off/on mechanism. Examples of Bluetooth modules (using the 2.4 GHz band) that can be utilizes by the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., the Proton or Electron from Particle (formally Spark) in San Francisco and/or the BT-21 module from Amp'ed RF wireless solutions in San Jose, Calif. Examples of wireless protocols that can be utilized with the present invention include, but are not limited to, the IEEE 802,11a, IEEE 802.11b, IEEE 802.11g, and IEEE 802.11n, and IEEE 802.11x modulation techniques and the newer protocol associated with Wi-Fi3. Another example of the wireless protocols that can be utilized with the present invention is the ZigBee, Z-wave and IEE 802.15.4 modulation technology. Furthermore, wireless low power and long-range technology known as "LoRa" marketed by many manufactures such as Semetech and the HopeRF RFM95 W-91552 can be used with the present invention. Ultra Narrow Band chips are marketed by Texas Instruments as CC1125 Ultra High-Performance RF Narrowband Transceiver. Applicants recognize that there are numerous wireless protocols that have been developed that, although not specifically listed, could be utilized with the present invention for data transfer purposes.

The water meter and leak detection system 10, 126, 200 with water shut-off/on mechanism 310, can transmit water parameter data to a router that connects to the internet and then to remote computers/servers, can also communicate the water leak condition with a user or owner of a home, condo, apartment or other residence, rental/leased house, condo or apartment or other resident, owner or representative of a company or corporate entity, owner or staff of a hotel/motel, institution facility, and/or a governmental agency, housing or facility using a cellular format technology that refers to all current and future variants, revisions and generations (e.g. third generation (3G), fourth generation (4G), fifth generation (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DBCT), Digital AMPS (IS-136/TDMA, Integrated Digital Enhance Network (iDEN), HSPA+, WIMAX, LTE, Flash-OFDM, HIPERMAN, WiFi, IBurst, UNTS, W-CDMA, HSPDA+HSUPA, UMTS-TDD and other formats for utilizing cell phone technology, telephony antenna distributions and/or any combinations thereof, and including the use of satellite, microwave technology, the internet, cell tower, telephony and/or public switched telephone network lines. The wireless communication of water leaking conditions can be between the water meter and leak detection system 10, 126, 200 with water shut-off/on mechanism 310 and a cell phone, smart phones, or other electronic apparatus 400 includes all remote cellular phones defined above (with cellular equipment, public switched telephone network lines, satellite, tower and mesh technology), mobile phones, PDA, tablets (e.g. refers to all current and future variants, revisions and generations of the Apple™ IPAD™, Samsung™ Galaxy™, HP™, Acer™, Microsoft™, Nook™, Google™ Nexus™, Sony™, Kindle™ and all future tablets manufactured by these and other manufactures), Apple™ IPOD™ Touch™, or a television, watch, timepiece or fob watch and other similar apparatus with Wi-Fi and wireless capability, and remote computers and controllers having internet or wireless connectivity. The display of the water leaking condition data can be in various pleasing format using digits, analog display, graphics, pictures, charts and/or other characters to exhibit the leaking condition to, a user. Also, the transfer of data can use authentication, encryptions, integrity and non-repudiation technology to ensure that data or information is communicated securely.

The water meter and leak detection system 10, 126, 200 with water shut-off/on mechanism 310 can also function to monitor the water use in homes, companies, buildings or other structures by including either sensitive flow sensors, standard invasive flow sensors, (e.g. turbine, Pelton, paddle wheel flow, piston, and pressure sensors and other invasive sensors), non-invasive flow use sensors (e.g. Doppler or time-transit ultrasonic, laser or magnetic flow sensors and other non-invasive flow use sensors) to communicate either or both the inside and/or irrigation water flow use on a real time daily, weekly, monthly, and/or yearly basis or on a water use basis. Such water flow use data can be transferred to a remote central monitoring computer service, municipality or government agency, via cell towers, satellite, microwave technology, the internet, telephone lines, and the like. The water meter and leak detection system 10, 126, 200 that transfer water parameters and data to the internet and to remote computer/servers can also communicate, with a user or owner of a home, condo, apartment or other residence, rental/leased house, condo or apartment or other resident, owner or representative of a company or corporate entity, owner or staff of a hotel/motel, institution facility, and/or a governmental agency, housing or facility using a cellular format technology that refers to all current and future variants, revisions and generations (e.g. third generation (3G), fourth generation (4G), fifth generation (5G) and all future generation) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, Wi-Fi, IBurst, UMTS, W-CDMA, HSPDA+HSUPA, UNTS-TDD and other formats for utilizing cell phone technology, telephony antenna distributions, and/or any combinations thereof, and including the use of satellite, microwave technology, Wi-Fi, WIMAX, Wi-Fi3, LoRa technology, the internet, cell tower, telephony and/or public switched telephone network lines. The wireless communication of real time, daily, monthly, weekly, monthly, and/or yearly water indoor and irrigation water use can be between the water meter and leak detection system 10, 126, 200 and a typical cell phone, smart phones, or other electronic apparatus 400 includes all remote cellular phones using (with cellular equipment, public switched telephone network lines, satellite, tower and mesh technology), mobile phones, PDAs, tablets (e.g. refers to all current and future variants, revisions and generations of the Apple™ IPAD™, Samsung™ Galaxy™, HP™, Acer™, Microsoft™, Nook™, Google™ Nexus™, Sony™, Kindle™ and all future tablets manufactured by these and other manufactures), Apple™ IPOD™ Touch™, or a television, watch, timepiece or fob watch and other similar apparatus with Wi-Fi and wireless capability, and remote computers and controllers having internet or wireless connectivity. The display of the indoor and irrigation water use data can be in various pleasing format using digits, analog displays, graphics, pictures, charts and/or other characters to exhibit the water use to a user. Also, the transfer of data can use authentication, encryptions, integrity and non-repudiation technology to ensure that data or information is communicated securely. The sensitive water flow sensors, standard invasive flow sensors, (e.g. turbine, Pelton, paddle wheel flow, piston, and pressure sensors and other invasive sensors), non-invasive flow use sensors (e.g. Doppler or time-transit ultrasonic, laser or magnetic flow sensors and other non-invasive flow use sensors) with transceivers can have an extended battery life by utilizing the interval wireless communications or transmissions and with a long lasting battery pack, such as, for example, the Tadiran series of batteries manufactured by Tadiran U.S. Battery in Lake Success, N.Y. Some candidates for use with the present invention water meter with leak detection system 10, 126, 200 are the standard or rechargeable lithium industrial type batteries, LiSOCl.sub.2 bobbin or serial type batteries, one or more super capacitors, or LiSOCl.sub.2 bobbin type with hybrid supercapacitor. Or with a turbine, paddle wheel or Pelton wheel energy generator 95 in hydraulic communication with the water supply line, solar energy, or wind energy, a rechargeable battery or super capacitor can be utilized. In addition, the batteries can be recharging type and accessed with an electrical coupler accessed from the outside of the sensitive flow sensors with transceivers. Or the flow sensors can be powered by low voltage AC e.g. 24 volts AC, or DC current. High voltage current e.g. 240 or 120 volts can also be used and if necessary, the voltage, can be reduced with transformers and the like.

FIG. 12 shows the water meter and leak detection system APP, which manages the water control valve mechanism enabling one to turn the water supply on/off, to program a water on/off schedule, and to receive notification of a leak condition with the option to remotely turn off the water supply. The water meter and leak detection system's flow sensor(s) 105 can communicate wirelessly or wired 101, 102, 103 with the microprocessor, CPU or microcontroller 84 that has software that learns about water usage at a Private or public property(ies) or areas thereof.

Referring to FIG. 12, which shows a perspective view of a typical cell phone, smart phones, or similar other electronic apparatus 400 having an application 410, commonly known as an "APP", programmed to display soft buttons or use control activators on a cell phone, smart phone, or similar apparatus 400, designed to wirelessly communicate or send signals to and from the water meter and leak detection system 10, 126, 200 with water shut-off/on mechanism 310. It is also anticipated that the apparatus 400 could be an Apple™ IPAD™, HP™, Samsung™, LG™, or other manufacture's tablet and that the application 402 that would function as described below. Furthermore, apparatus 400 could be a remote computer or television that is connected to the internet or has wireless capability. Shown in FIG. 12A is an example of an application 410 which will typically display soft buttons for controlling water on 404 and water off 406 by sending wireless instructions to the water meter with leak detection system 10, 126, 200. It is anticipated by the Applicant that other configuration of application displays for remotely communicating with the Water meter and leak detection system 10, 126, 200. The application 410 can also have a soft schedule button 408 which sequentially adds displays for entering a predetermined schedule for turning on and off the water at the collection node of the Water meter and leak detection system 10, 126, 200. The predetermined schedule can be sent to the water meter with leak detection system 10, 126, 200 for continuous sequencing operations on an hourly, daily, weekly, monthly or yearly basis. The predetermined schedule can be programmed into a memory module at the water meter and leak detection system 10, 126, 200.

An option of the application 410 is shown as a decisional text message 413 inquiring if the individual, would like the water turned off and sent to display 402 of the cell phone, smart phone or apparatus 400. The cell phone, smart phone or other electronic apparatus 400 would preferably have incorporated GPS technology that can determine the location of the cell phone, smart phone or similar apparatus, and know or saved the home or water meter with leak detection system 10, 126, 200 locations. Triangulation techniques between cell towers can also be used if the cell phone, smart phone or other electronic apparatus 400 does not have GPS capability. The application 402 could or will have a routine that can program the distance from the water meter and leak detection system 10, 26, 200 that an individual desire to be provided a notice of the decisional text message. If the water is not turned off when the individual leaves the private or public property(ies), and the cell phone, smart phone or other electronic apparatus 400 has been programmed for a set distance from the water meter collection node or optional communication hub e.g. ¼ mile, then the decisional text message 417, for example, "Should I turn off the water supply", will be sent to the cell phone, smart phone or other electronic apparatus 400. The rational for the decisional text message is that, for the present invention to function as a water damage prevention system, substantial compliance with routine turning off the water when a private or public property(ies) in unoccupied is necessary. The decisional text message 417 provides the individual a soft button "yes" 412 to turn off the water at the collection node of the Water meter and leak detection system 10, 126, 200 or "no" 414 and leave the collection node of the water meter and leak detection 10, 126, 200, with the water control valve on. Hard button activators 416a, 416b and 416c can also be used to communicate with the water meter and leak detection system 10, 126, 200 that transfers water parameter data to the internet and then to remote computers/servers for cell phones, smart phones or a similar other electronic apparatus that a display screens or no touch screen capability. For example, hard button 416a can communication with the water meter and leak detection system 10, 126, 200 to turn the water system on, hard button 416b can communication with the water meter and leak detection system 10, 126, 200 to turn the water system off, and hard button 416c can communication with water meter and leak detection system 10, 126, 200 to open a schedule page.

Another optional decisional text message 410 can sent to the cell phone, smart phone or other electronic apparatus 400 if one of the optional highly sensitive flow sensors and 123 detects a leaking condition. The text message could specify "Leak found in kitchen area, should I turn of the water supply". The decisional text message 410 provides the individual a soft button "yes" 412 to turn off the water at the water meter and leak detection system 10, 126, 200 or "no" 414 and leave the water meter and leak detection 10, 126, 200 with the water control valve on. Hard button activators 416a, 416b and 416c can also used to communicate with the water meter and leak detection system 10, 126, 200 for cell phones, smart phones or a other electronic apparatus that a limited display screens or no touch screen capability. This optional leak detection message could also be sent the insurance or municipality agency monitoring station by PSTN or wireless means to notify of the leakage condition. It is also anticipated by the Applicant that the leak detection message could also be transferred to the supplying municipality to inform them of the leak such that the municipality can act to repair the leak condition.

Shown below in this FIG. 10 is a perspective view of an "APP" or programmed application that provides water use data in various example formats that is transferred from the water meter collection node or optional communication hub to a remote display/recording apparatus 18, 50, 56, or a remote computer or a cell phone, smart phone, or other electronic apparatus 400. The programmed application or APP shows an average time of water use data, average water use data, water cost data, energy calculations using the water heater type, the state located, cost of natural gas or oil per Therm, efficiency information, and the average ambient water temperature and the desired water temperature use for hot water devices (e.g. shower, faucets). On the bottom of FIG. 16 is the water energy calculation and water costs for the day, week, month, year, and 2-year dates. The Applicant contends that many different water energy calculations can be used with the present invention without deviated from its intended use. The water meter and leak detection system can communicate with a said typical cell phone, smart phones, or other electronic apparatus includes an application for a consumer/resident, corporate entity, or municipality that show the daily, weekly and/or monthly water use and/or daily, weekly or monthly water costs.

Shown in FIG. 11 is a perspective view of a first example application (APP), or a first page of an application (APP) 300, displayed on a typical cell phone, smart phone or other electronic apparatus 400 (see FIGS. 12 and 13). This example application (APP) or page 300 is designed as a line graph format to be used by the resident of a home or a representative of a company or a corporation to monitor water conservation, but is it anticipated by the Applicant that the application (APP) 300 could be used by municipal or government representatives.

FIG. 11 shows and example of an application or page (APP) 300 for Water Use 302 having a daily 304 graph 306 with day hours 308, designated by the symbol AM 312 and the night hours 310 designated by the symbol PM 314. At the right side of the example application or page (APP) 300 is the daily total use of water 316 and the daily total cost in dollars (or other currency) 318 that has been downloaded the data 340 from the registered or serving water municipality. Within the daily graph 306 is a plotted line 307 that shows the hourly water use. The plotted line 307 can have a rolling feature whereby new data replaces the oldest data in the graph. A gallon or liter scale can be included on the left side of the daily graph 305 (not shown).

The example of an application or page (APP) 300 for Water Use 302 can also have a weekly 320 graph 322 with days 324. At the right side of the example first application or page (APP) 300 is the weekly total use of water 326 and the weekly total cost in dollars (or other currency) 328 that has been downloaded the data 340 from the registered or serving water municipality. Within the weekly graph 322 is a plotted line 327 that shows the daily water use. The plotted line 327 can have a rolling feature whereby new data replaces the oldest data in the graph. A gallon or liter scale can be included on the left side of the weekly graph 322 (not shown).

The example of an application or page (APP) 300 for Water Use 302 can also have a monthly 334 graph 330 with months 332. At the right side of the example first application or page (APP) 300 is the monthly total use of water 336 and the monthly total cost in dollars (or other currency) 338 that has been downloaded the data 340 from the registered or serving water municipality. Within the monthly graph 330 is a plotted line 337 that shows the daily water use. The plotted line 337 can have a rolling feature whereby new data replaces the oldest data in the graph. A gallon or liter scale can be included on the left side of the monthly graph 330 (not shown).

The water meter and leak detection system 10, 126, 200 is designed to transfer data and information by utilizing the wireless communication with the one or more remote display and/or recorder apparatus, or cell phone, smart phone or other electronic apparatus whereby the remote display and/or recorder apparatus or cell phone, smart phone or other electronic apparatus can automatically convert back and forth from radio frequency format, ZigBee or Bluetooth format to a cellular format technology to accommodate different range requirements.

FIG. 11 shows a Download Button 340 which is designed to manually or automatically download water rate and expense data from the servicing and registered water municipality or other source. The cost per gallon, hundred cubic feet (HCF) or other measurement is usually dependent on volume used over a given period. For example, from 0-8 HCF could be billed at $3.64 per BCF, 9-24 HCF could be billed at $4.08 per BCF, and 25-36 HCF could be billed at $5.82 per HCF. This is only an example data that can be downloaded and utilized to determine the daily cost 318, weekly cost 328, or monthly cost 338. Other data can be downloaded from the water municipality or other source such as warnings for drought conditions, metering policies, quality messages, limits, alarms, etc.

FIG. 11 also depicts a user, whether it is a home owner or company representative, who can Set Limits 342 for water use to command the water meter and leak detections system 10, 126, 200 to turn the water completely off for example, if a limit of water flow exceeds a limit, or sound a verbal or audio alarm. It is anticipated that the servicing and registered water municipality or other source can upload Set Limits 342 to the individual water meter and leak detections system 10, 126, 200. It addition, the Set Alarms 344 for water use can be used to display visually or provide audio signals of alarming conditions associated with the daily, weekly or monthly water use. The application (APP) 300 is designed to promote water conservation and monitor for leaking conditions.

FIG. 11 also shows an optional Water Quality section 350 of the application (APP) 300. As shown, optional water quality Sensor 1 (one) 352 can monitor one or more halogen elements or compounds, monitoring total dissolve solids, monitoring a metallic or iron element or compound, monitoring water hardness, monitoring biological or coliform contaminates, monitoring pH, or any combinations thereof. The plotted line 358 for Sensor 1 (one) shows peaks and valley over the time period 360. The time period can be selected for daily, weekly or monthly. Sensor 2 (two) 354, can be another water quality sensor and Sensor X 356 can be one or more water quality sensor taken from the group define above.

For the optional Water Quality sensors 350, shown is a Frequency Soft Button which allows the user to define the time period, daily, weekly or monthly. A user, whether it is a home owner or company representative, who can Set Limits 372 for water quality to command the water meter and leak detection system 10, 126, 200 to turn the water completely off, limit the flow, or sound a verbal or audio alarm. It is anticipated that the servicing and registered water municipality or other source can upload Set Limits 372 to the individual water meter and leak detection system 10, 126, 200 (with water shut-off/on mechanism 310). It addition, the Set Alarms 374 for water use can be used to display visually or provide audio signals of alarming conditions associated with the daily, weekly or monthly water use.

As FIG. 11 is only an example of presentation of the water use and water quality data, it is anticipated that other formats for displaying the daily, weekly, monthly, or annual water use and water quality use. Such formats can be in bar graph format, pie graph format, cosmography formats, tabular formats, time series graph formats, histogram formats, data plot format, scatter plot format, other graph formats, or a combination of these graph formats. In addition, it is anticipated that the water flow data presented in line graphs, tabular formats or graphic formats or any combination of the formats listed herein can be presented on one or more pages or screens of the typical cell phone, smart phone or similar apparatus.

FIG. 12 shows one or more visual signals 409, 411 (e.g. LED or LCD) lights that are turned on (and off after a period of time) to communicate to an individual that the water meter and leak detection system 10, 126, 200 with water shut-off/on mechanism 310 has completed the programmed activity. For example, only, 409 could be a red LED light that illuminates when the water system is turned off and 411 could be a green LED light that illuminates when the water system is turned on. It is anticipated by the Applicant that verbal signal (verbal "water off" or verbal "water on" or simply a playing certain ringtones) can also be used to communicate that the programmed activity has been completed. Also shown near the middle of the "APP" (program) page is a soft button 404 for turning on the water system and anther soft button 408 for turning off the water system. A labeled 407 soft button 408 is used to bring up another page(s) that allows an individual to input a water on/off schedule. For example, one can have the water system or supply turned off automatically Monday-Friday from 8:00 a.m. until 5:00 p.m. when all residences have vacated the residence (e.g. at work or school). For business and companies, the scheduling soft button 408 can turn off the water system or supply automatically when the employees of the business or company are vacated (e.g. from 6:00 p.m. until 7:00 a.m. Monday-Friday and all-day Saturday-Sunday. Various hard buttons 416A, 416B, and 416C can be used to supplement the soft buttons and/or menu pages for movement within the page or inputting data. On the bottom of the "APP" (program) is a text message sent to the home owner or resident or business or company employee the option to turn on or off the water system or supply if the water meter and leak detection system is aware that the home, building or company is vacated (e.g. by temporal measurements, passive infrared sensors, entry and/or exit (badge) identification information. Shown on the side are the Bluetooth 420A, Wi-Fi 420B and cellular communication 420C means that wirelessly connects the cell phone, smart phone or similar apparatus 400 to the water meter and leak detections system 10, 126, 200.

Typical cell phones, smart phones, and other electronic apparatuses 400 may have one or more means of communication that can be established with a particular water meter and leak detections system 10, 126, 200 for wireless communication. The use of Bluetooth wireless technology 420a is commonly a feature found on many cell phones, smart phones and similar apparatus. Such Bluetooth wireless communication 420a can be a means to communicate with the water meter and leak detection system 10, 126, 200 with water shut-off/on mechanism 310 to turn the water on or off or receive decisional text messages 410. Zigbee is another wireless technology that can be used. However, most current cell phones, smart phones or other electronic apparatus 400 do not possess Zigbee wireless capability.

The use of Wi-Fi (IEEE 802.11 family of wireless local area network) and upcoming Wi-Fi3 wireless technology 420b is commonly a feature found on many cell phones, smart phones and similar apparatus 400 and wireless routers/servers. Such Wi-Fi wireless communication 420b can be a means to communicate remotely from a router server directly to, or by the communication hub circuitry to the collection node circuitry of the water meter and leak detections system 10, 126, 200 with water shut-off/on mechanism 310 to turn the water on or off or receive text messages. The water meter and leak detection system 10, 126, 200 can have the capability to receive and transfer wireless signals and decisional text messages 410 using Wi-Fi technology directly to the water meter and leak detection system 10, 126, 200 with water shut-off/on mechanism 310. Alternately, the Wi-Fi communication 420b will communicate with a wireless router/server that has a HTML or other communication-based interface and configuration page graphic user interfaces. Remote access from the cell phone, smart phone or similar apparatus 400 could use a short message service (SMS) interface and/or voice of Internet Protocol (VOIP) which communicates with the wireless router. This Wi-Fi technology will access the Internet through the wireless router and can recognize the cell phone, smart phone or other electronic apparatus 400 phone number for remote capability using SMS interface. A digit numbers security can be used to maintain restricted integrity. Wireless Transmitters and Receivers can be used for Wi-Fi communication 420b to the water mater and leak detection system 10, 126, 200 for individuals lacking internet capability at their residence.

The use of cellular wireless technology 420c is a primary feature of cells phones, smart phones and similar apparatus. Such cellular wireless communication 420c can be a means to communicate with the water meter and leak detection system 10, 126, 200 with water shut-off/on mechanism 310 to turn the water on or off or to receive text messages.

The application 410 an have to interface with the Bluetooth 420a, Wi-Fi 420b, or cellular 420c wireless communication means, and send instructions for a specific pairing operation for a water meter and leak detection system 10, 126, 200 with water shut-off/on mechanism, the pairing operation allows for access to 1) observe the recorded data or 2) prevent an unauthorized individual to regulate the water control valve. Various pairing methods between the water meter and leak detection system 10, 124, 200 with water shut-off/on mechanism 310 and the cell phone, smart phone or other electronic apparatus 400 are contemplated to be necessary to ensure that proper communication is established between a single and unique water meter and leak detection system 10, 126, 200 in addition to one or more unique cell phone, smart phone or other electronic apparatus 400. A Quick Response Code (QR code) unit address located on water meter and leak detection system 10, 126, 200 can communicate with a cell phone, smart phone or other electronic apparatus 400 having a camera to read QR and establish link to the water meter and leak detection system 200. Standard barcodes or QR codes could pair and establish a link between the water meter and leak detection system 10, 126, 200 with water shut-off/on mechanism 310 and the cell phone, smart phone or other electronic apparatus 400. Near field link and RE ID chip technology can also be used to facilitate pairing and establish a link between the water meter and leak detections system 10, 126, 200 and the cell phone, smart phone or other electronic apparatus 400. Currently bar code readers are applications that can be downloaded for a particular cell phone, smart phone or similar apparatus operation system. Near field links are only recently becoming available on Samsung smart phones, but this technology may be expanded to many, if not all, cell phones, smart phones or similar apparatus.

In operation, an individual who wants to turn off the water system would touch the off the soft button 408 or reply to the text message to turn off the water system "yes" soft button 412, or push the hard button 416b on the a cell phone, smart phone or other electronic apparatus 400 which will communication with the water/energy use monitoring display apparatus 10, 200 via the Internet, wireless technology (e.g. Bluetooth, ZigBee, Wi-Fi, Wi-Fi3, Ultra Narrow Band (UNB), LoRa, WiMAX, 6LoWPAN, and/or cellular format technology (NB-IoT, standard cellular GSM/CDMA technology, cellular GPP, cellular LTE-M and 5G) and then the paired water meter and leak detection system 10, 126, 200 with water shut-off/on mechanism 310 would turn off the water system off and then when completed (specified by switches and/or a flow sensor) will send a returned communication signal to the a cell phone, smart phone or other electronic apparatus 400 and turn on signal (audio or visual) message 409 that the water system is off. Comparable, an individual who wants to turn on the water system would touch the "on" the soft button 404 or reply to the text message to turn off the water system 410 "no" soft button 412, or push the hard button 416a on the a cell phone, smart phone or similar apparatus 400 which will communication with water meter and leak detections system 10, 126, 200 with water shut-off/on mechanism 310 via the internet, wireless technology (e.g. Bluetooth, ZigBee, Wi-Fi, Wi-Fi3, Ultra Narrow Band (UNB), LoRa), WiMAX, 6LoWPAN and/or cellular format technology (NB-IoT 6LoWPAN, standard cellular GSM/CDMA technology, cellular 3GPP, cellular LTE-M, NB-IoT and 5G) and then the paired water meter and leak detection system 200 would turn off the water system off and then when completed (specified by switches and/or a flow sensor) will send a returned communication signal to the a cell phone, smart phone or other electronic apparatus 400 and turn on signal (audio or visual) message 409 that the water system is off.

FIG. 13 is a perspective view of the embodiment comprising a home with the water meter and leak detection system 10, 126, 200 (with or without the water shut-off/on mechanism 310) interposed within the main water supply system 208 and the first distribution line for the home or company 310 and communicating wirelessly with a cell phone, smart phone or similar apparatus 400 held in the hand 221 of an individual 212. The cell phone, smart phone, or similar apparatus 400 communicates with the water meter and leak detections system 10, 126, 200 using Bluetooth or ZigBee wireless technology 420a, Wi-Fi wireless communication 420b, WiFi3, LoRa and/or cellular wireless technology 420c.

Figure 14:
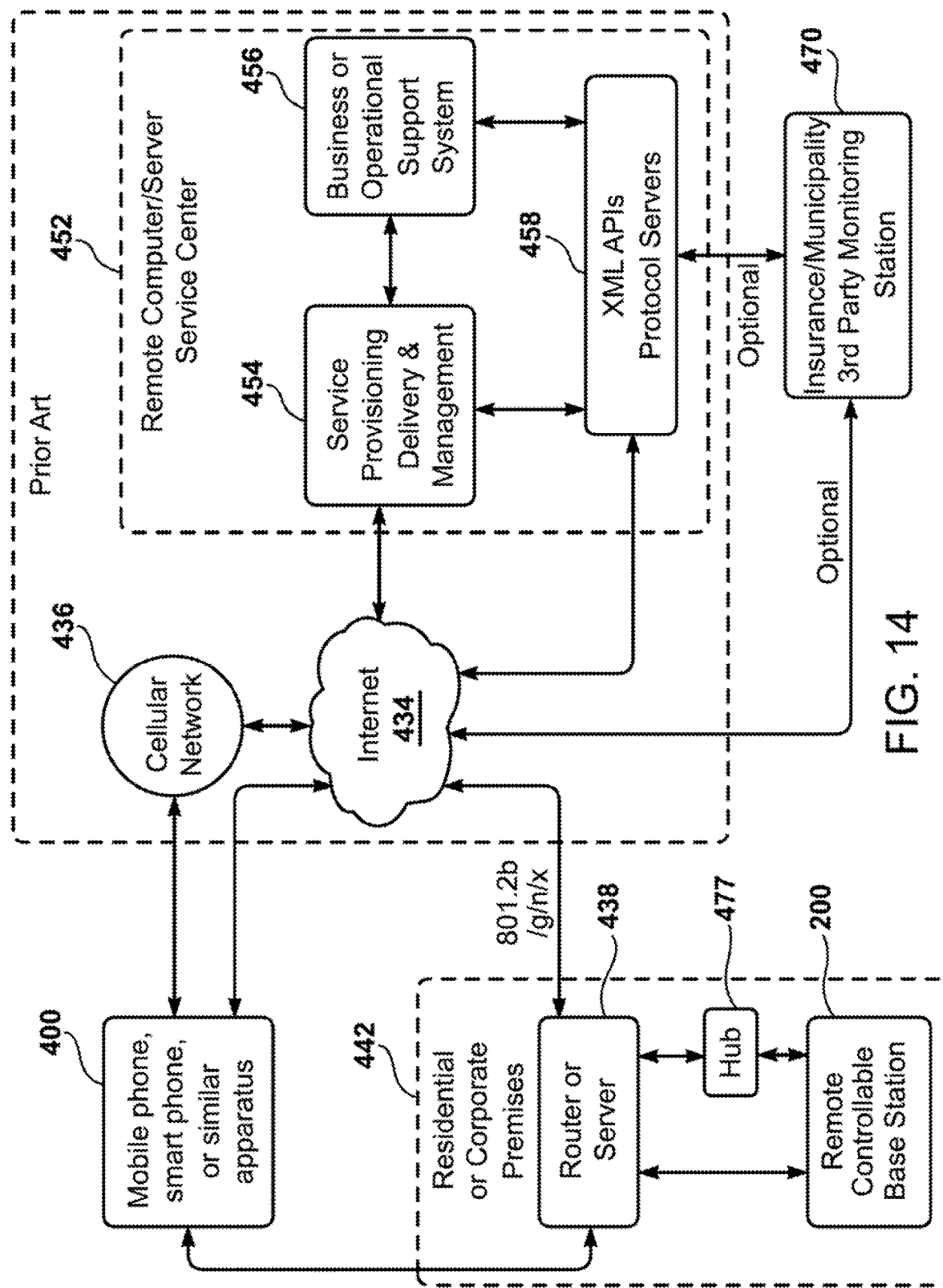
FIG. 14 is block diagram of the more integrated system showing the software, hardware and applications of the home or corporate premises communicating with the Water Meter and Leak Detection System and communicating with the internet and remote computer services ("the Cloud").

FIG. 14 is block diagram of the overall system showing the software, hardware and software applications of the private or public property(ies) communicating with the water meter and leak detection system 10, 126, 200 and communicating with the internet and remote computer service station ("the Cloud"). The water meter and leak detection system 10, 126, 200 (with water shut-off/on mechanism 310) includes, a preferred, but optional receiving station or communication hub 477 that connects either hard wired or wireless to a router/server 438 which connects in a duplex communication 440, 441 to the internet 434. The Internet has duplex communication 461, 462 with the Remote Computer/Server Service Center 452 (e.g. Amazon™, Microsoft™, Oracle™ and Google™). Within the Remote Computer/Server Service Center communicating with a cell or mobile phone, smart phone, or other electronic apparatus 400, smart internet TVs, smart central hub listening and speaker devices, and home control systems (408). At a user's private or public property(ies), the water meter and leak detection system 10, 126, 200 (with water shut-off/on mechanism 310) connects to the router/server 438 with authentication, and preferable encrypted data. The water meter and leak detection system 10, 126, 200 (with water shut-off/on mechanism 310) system communicates with the remote computers 452 located in the service provider's data center or hosted in integrated security system data center), with the communication taking place via a communication network (e.g., cellular network, internet, etc.).

The cell or mobile phone, smart phone, or other electronic apparatus 400, remote computer, smart internet TVs, smart central hub listening and speaker devices, and home control systems, can be used to wirelessly communicate with the water meter and leak detection system 10, 126, 200 (with water shut-off/on mechanism 310) via router/internet/remote servers to perform various functions and include numbers capabilities. The cell or mobile phone, smart phone, or other electronic apparatus 400, computer, cell phone, smart phone and similar apparatus, smart internet TVs smart central hub listening and speaker devices, and home control systems, preferably have downloaded programs or applications) ("APPs") that communicated with the water meter and leak detection system 10, 126, 200 (with water shut-off/on mechanism 310) for displaying water us e energy use and water quality as described herein. The cell or mobile phone, smart phone, or other electronic apparatus 400, remote computer, smart Internet TVs, smart central hub listening and speaker devices, and home control systems, that downloaded program or applications ("Apps") can specifically turning on and off the water supply to a private or public property(ies) either directly using a soft button of the APP or program a schedule using the APP. The water meter and leak detection system 10, 126, 200 (with water shut-off/on mechanism 310) is not only designed to monitor for water use, energy use, and water quality, but to monitor of leak detection, conditions and provide text messages, alerts signals, or emails regarding water leak conditions. The water meter and leak detection system 10, 126, 200 (with water shut-off/on mechanism 310) can be programmed by the user to automatically shut off the water supply when a leak condition is observed. For purposes of brevity, water use data, water energy data, water quality data and leak detection signals and alerts utilizing the communication means described below.

The following remote computer components manage the main elements of the remote computer service, but this only exemplary and is not so limited. Several of the component defined and described can be replaces by a newly design operation (s), combine operations, or eliminate some operation(s). Professional companies, such as Amazon Web Services, handle most if not all of, the OSS and BSS services, database access, connectivity and database maintenance (e.g. SQL databases like MySQL™, MariaSQL™, and Aurora™, Redshift™, and non-SQL databases like Dynamodb™), server component access and maintenance and load balancing, all for a cost base on various factors. Data access by cell phones, mobile phones, and other electronic apparatus 400, and remote computers can access the commercial database using certain protocols.

There are large cloud-computing companies with several computer server farms around the world that supplant the independent comprehensive internet infrastructure and communication network. Companies like Amazon®, Microsoft®, Oracle® and Google® have all built a significant quantity of computing infrastructure. Their data centers are vastly bigger, and significantly more efficient, than those operated by or could be built by most other independent companies. The cloud-computing companies with their worldwide server farms allow for scalable and redundant data storage capabilities (Redundant Array of Independent Disks or RAID technology). The large cloud-computer companies can temporarily extend or customize the functionality for a client by transferring logic to it that it can execute. Examples of this may include compiled components such as Java applets and client-side scripts such as JavaScript. Complying with these constraints, and thus conforming to the REST architectural style (REST an acronym for REpresentational State Transfer), which will enable any kind of distributed hypermedia system to have desirable emergent properties, such as performance, scalability, simplicity, modifiability, visibility, portability and reliability (RestAPI). These large companies are presently marketing and rented out their computing capacity to developers and companies around the world. The developer or company doesn't have to incur the capital expense associated with designing network connectivity system, employing various Information technology (IT) professionals, purchasing the necessary computers and servers, developing the custom and non-custom software and conducting the significant maintenance procedures.

A programmer/developer or a company simply pays for the cloud-computing services. Using the cloud-computing services provide the developer and company access to fundamentally unlimited computing power marketed by the cloud computing companies without must incur the expenses for developing and maintaining a private or corporate computer infrastructure.

There are various services, divided into certain categories, that are provided by the cloud computing companies. Infrastructure as a Service, or "IaaS," is the most basic layer of cloud computing. It provides customers with virtual servers and database storage and Internet of Things (IoT) sensor communication and access. Platform as a Service, or "PaaS," which is the set of application tools and services that make it easier for developers and IT professionals to build applications without the capital expense of purchasing software for application development. Software as a Service, or SaaS, which refers to applications that run in the cloud like Microsoft's Office 365, Google's G Suite and Salesforce's products for sales and marketing.

The plan for a cloud-computing companies is to make their services indispensable to both independent software developers and small, medium and large companies. Customers might venture into cloud computing with a single software application (APP) but as their businesses grow, their cloud-computer needs increase and the cloud-computing service companies are expecting that their cloud usage and revenue will increase. Amazons has increased their presence in the cloud industry, by sacrificing short term profits to enhance the customer experience and maximize long-term gain. The more customers a cloud platform provider contracts with, the more servers and serving farms under their control can be developed. And the more servers the cloud-computing companies have, the better they can take advantage of economies of scale and offer customers lower prices for more robust features, including appeal to large enterprises. The efforts to market cloud-computing services supports that the near future of internet infrastructures and communication networks will increasing be controlled and maintained by the large cloud-computing companies.

Specific communication protocols are becoming important to interface between the cloud-computing companies and the company's local or cloud database for computer, cell phone, smart phone and similar apparatus, smart internet TVs, smart central hub listening and speaker devices, and home control systems, access to acquire requested data (e.g. SQL database requests) and perform instructional activities (turn on/off water). Of these protocols, the Representational state transfer or RestAPI (or REST API), SOAP API, Java API or XML API seem to be appropriate.

Once a user sets up a service, an activation application 494 delivers a first display to the user on either a display means of a remote computer, cell phone, smart phone, mobile phone or other electronic apparatus 400, smart Internet TVs, smart central hub listening and speaker devices, and home control systems, on the water meter and leak detection system 200 and/or on a display means on the remote devices 480. This pairing technology or other application secure means associates a new user with a purchased or installed remote device and the water meter and leak detection system 10, 126, 200.

Figure 15A:
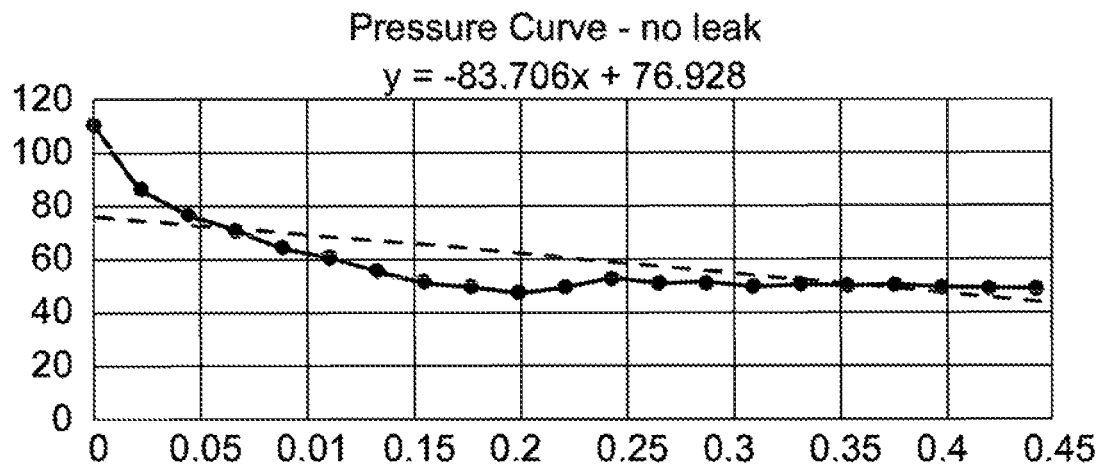
FIG. 15a is an illustration of the pressure drop within a typical 3-bedroom residence have copper plumbing wherein there is no leak.

Shown in FIG. 15a is an illustration of the pressure drop within a typical 3-bedroom household having copper piping wherein there is no leak. The illustration is a plot of the pressure drop over time when the water supply is turned off by a control valve before the major water distribution lines. The graph has a Y axis that shows the pressure reading and an X axis representing the time parameter. FIG. 15a shows that when the water is initially turn off on a no leaks system, there may be an initial drop in pressure that is thought to be due to an interaction of the pressure regulator. But as shown in FIG. 15a the initial pressure drop levels off and maintains relatively constant pressure over time. Also shown is a calculated regression line shown in linear dashes and provides the calculated variables (e.g. Y=−83.7X+76.9). The regression calculation can be used by the monitoring software to determine the quantitative loss in pressure over time and allow for artificial intelligence software (AI) to determine what type leak is present.

Figure 15B:
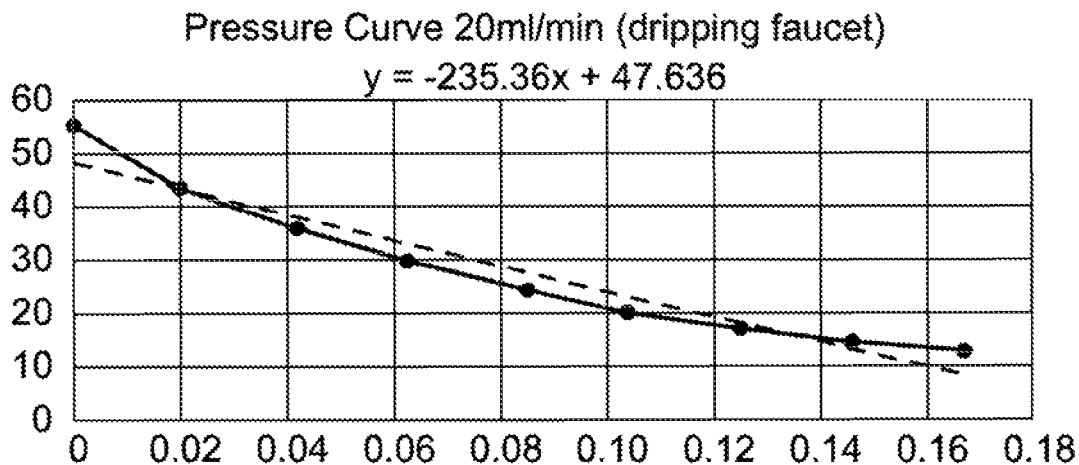
FIG. 15b is an illustration of the pressure drop within a typical 3-bedroom residence have copper plumbing wherein the leak is approximately 20 ml/min.

Shown in FIG. 15b is an illustration of the pressure drop with a typical 3-bedroom household having copper piping wherein there the leak is approximately 20 ml/min. The illustration is a plot of the pressure drop over time when the water supply is turned off by a control valve before the major water distribution lines. The graph has a Y axis that shows the pressure reading and an X axis representing the time parameter. FIG. 15b shows that when the water is initially urn off on the exemplary 20 ml/min leak, there is a continual relatively slow drop in pressure over time where the pressure approaches zero pressure. Also shown is a calculated regression line shown in linear dashes and provides the calculated variables (e.g., 235.4×47.6). The regression calculation can be used by the monitoring software to determine the quantitative loss in pressure over time and allow for artificial intelligence (AI) to determine what type of leak is present.

Figure 15C:
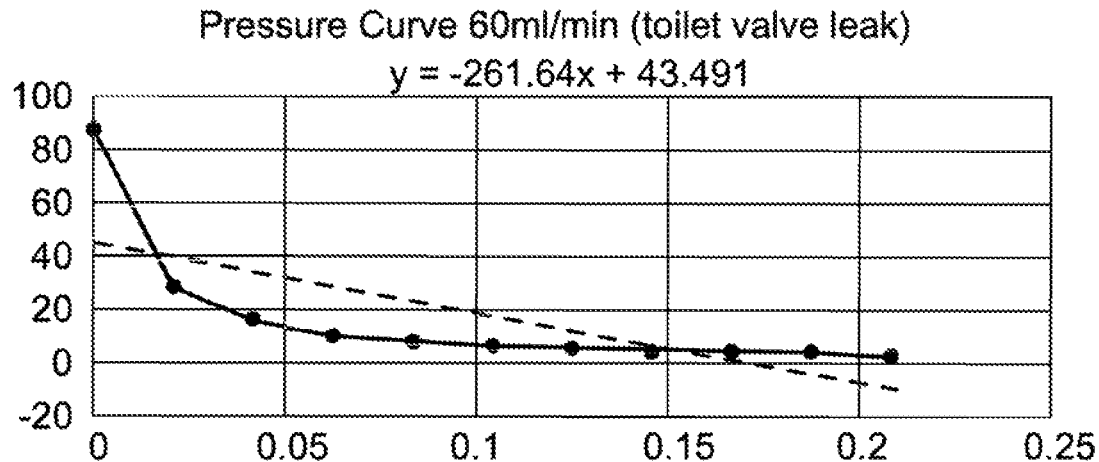
FIG. 15c is an illustration of the pressure drop within a typical 3-bedroom residence have copper plumbing wherein the leak is approximately 60 ml/min.

FIG. 15c is an illustration of the pressure drop with a typical 3-bedroom household having copper piping wherein there the leak is approximately 60 ml/min. The illustration is a plot of the pressure drop over time when the water supply is turned off by a control valve before the major water distribution lines. The graph has an Y axis that shows the pressure reading and a X axis representing the time parameter. FIG. 15c shows that when the water is initially turn off on the exemplary 60 ml/min leak, there is a continual relatively fast drop in pressure overtime where the pressure approaches zero pressure. Also shown is a calculated regression line shown in linear dashes and provides the calculated variables Y=−261.6×43.5). The regression calculation can be used by the monitoring software to determine the quantitative loss in pressure over time and allow for artificial intelligence (AI) to determine what type of leak is present.

A number of applications provided by the large cloud-computing companies ensure overall management of the computer infrastructure and network service. These pre-defined applications are configured to offer off-the-shelf programs and operating systems solutions management of the integrated cloud-computing system service, overall service monitoring, customer support, and reporting.

While this invention has been described as having a preferred design, the present invention can be further modified within the spirit and scope of this disclosure. The application is therefore intended to cover any variations, uses, or adaptations of the invention using its general principles. Further, this application is intended to cover such departures from the present disclosure that arise from known or customary practice and the art to which this invention pertains, and which fall within the limits of the appended claims.

The invention claimed is:

1. A water meter and leak detection system comprising:
   a base station having a water control mechanism interposed between a main water supply line and a water supply for a building or structure;
   said base station further comprising;
   a) electrical circuitry including at least one of a CPU, microprocessor and microcontroller with an integrated memory or separate memory module, and a power source;
   b) said base station having one or more low rate sensors designed to monitor at least one of a water use data, water energy use data, water quality data, and leak detection information from said building or structure, said one or more flow rate sensors connected to the main water supply and connected with said electrical circuitry;
   c) the power source is at least one of an AC powered, DC powered, and one or more standard or rechargeable batteries, said rechargeable batteries capable of being supplemented with a turbine or other rotational mechanism that generates electrical energy, said power source is electrically connected to said electrical circuitry;
   d) the CPU, microprocessor, or microcontroller with the electrical circuitry that is monitoring at least one of a water use data, water energy use data, water quality data, and detecting leak conditions is further capable of transmitting a water flow event data using one or more wireless communication technologies;

e) wherein the CPU, microprocessor, or microcontroller can include software that selects a device calibration mode or an automatic learning mode, wherein the device calibration mode utilizes activation of the water use devices, appliances and fixtures and monitors the water flow event at specific intervals, wherein the automatic learning mode utilizes a period of self-learning of the water flow events of water use devices, appliances and fixtures;

f) the one or more wireless communication technologies comprising at least one of a Wi-Fi, LoRa, Sigfox, Ultra Narrow Band, 6LowPAN, NB-IoT, LTE-M cellular, and 5G cellular technology;

wherein when the CPU, microprocessor, or microcontroller with one or more flow rate sensors detects the initiation of water flow, the CPU, microprocessor or microcontroller instructs the water sensor to increase the sampling rate at a sufficient frequency capable to monitor at least one or more water flow rates, one or more water use durations and one or more total volume of water uses until water flow stops defining a water flow event;

an acoustic sensor that monitors vibration frequencies from water use device control valves and assist in at least one of identifying the particular water control valves fixtures or appliances and monitoring for water leaks, and the base station can either use the water flow event data to locally process, or transfer to a remote computer, the method of utilizing software instructions, algorithms, and artificial intelligence technology for at least one of analyzing water signatures and patterns for identifying water devices, fixtures, and appliances and for providing analytical detection of leak conditions.

2. The water meter and leak detection system as recited in claim 1, wherein said one or more wireless communication technologies interface with remote computers or servers utilizing an application programming interface (REST-API or SOAP-API) technology.

3. The water meter and leak detection system as recited in Claim I wherein said one or more standard or rechargeable batteries comprises standard or rechargeable lithium batteries, $LiSOCl_2$ bobbin or serial batteries, lithium metal, lithium-air, solid state lithium, lithium sulfur, sodium-ion or $LiSOCl_2$ bobbin with hybrid super capacitor.

4. The water meter and leak detection system as recited in claim 1, further comprises one or more other electronic communication devices that can communicate with the base station that includes at least one of a smart cell phone, mobile phone, PDA, tablet, computer, smart or internet capable television, wireless smartwatch and other electronic communication apparatuses with Wi-Fi and wireless capability.

5. The water meter and leak detection system as recited in claim 1, further including at least one of a mesh and peer-to-peer technology circuitry that can communicate with at least one of other water meter base stations.

6. The water meter and leak detection system as recited in claim 1, transmitting at least one of a water use data, water energy use, water quality data, and leak detection information initiated by a command signal from said smart phone, computer, server, tablet, web portal, or other electronic communication technology devices.

7. The water meter and leak detection system as recited in claim 1, wherein the leak information can provide the registered owners and users a warning or signal on at least one of said smart phone, computer, server, web portal, and other electronic communication devices when a leak condition is observed, wherein said registered owners and users can be provided a number of corrective selections that comprise at least one of the ability to remotely turn off the main water system and contact an individual by phone call, text, or email for initiating corrective actions.

8. The water meter and leak detection system as recited in claim 1, further comprising a temperature sensor in close proximity to said water supply, said temperature sensor can communicate with said water meter and leak detection system and initiate water freezing protection procedures when the water supply line approaches the water freezing point of 32 degrees Fahrenheit or 0 degrees Celsius, such freezing procedures can include at least one of incorporating a freeze plug mechanism, draining the distribution lines with a three way valve, replacing the water in the water line with air, nitrogen or other gas or liquid having a low freezing point.

9. The water meter and leak detection system as recited in claim 8, wherein said water meter and leak detection system, can send a freezing warning message on at least one of said smart phone, computer, server, tablet, web portal, or other electronic communication devices when said freezing condition exists.

10. The water meter and leak detection system as recited in claim 1, utilizing programming instructions to turn off the control valve and water supply during a vacation schedule or work schedule using a software program application associated with at least one of said smart phone, computer, server, tablet, web portal, or other electronic communication devices.

11. The water meter and leak detection system as recited in claim 1, further comprising at least one of a pressure sensor and an acoustic sensor wherein said at least one of a pressure sensor and an acoustic sensor supplies data for software instructions and artificial intelligence algorithms for detecting water patterns and signatures of fixtures and appliances and conditions.

12. A water meter and leak detection system as recited in claim 11, wherein said pressure sensor is capable of quantifying a leak condition when the water meter closes the water control valve mechanism and monitors any pressure changes and is capable of transferring pressure monitoring data information to the base station for making one or more software calculations to determine the leak type or leak category.

13. The water meter and leak detection system as recited in claim 1, further comprising a wired communication technology comprising at least one of an X10, UPE, and HART technology.

14. The water meter and leak detection system as recited in claim 1, is capable of including a second wireless technology comprising at least one of a Bluetooth, and Wi-Fi wireless technology that is capable of performing an authentication pairing procedure for initially establishing remote wireless communications by inputting a network user name and a password, scan a QR code, or perform a two-step authentication scheme.

15. The water meter and leak detection system as recited in claim 1, wherein when said monitoring indicates a leak condition, a message or signal is sent to at least one of a smart phone, computer, server, tablet, web portal, and other electronic communication devices allowing the user to turn off the water control valve mechanism or to program the water meter and leak detection system to automatically turn off the water control valve mechanism.

16. The water meter and leak detection system as recited in claim 1, further comprising a programming setting managed by the user, remotely a mode setting, and a default or restricted setting processed by the manufacturing factory to:
   a) record the water flow event to a local memory bank or removable memory device for regional or controlled analysis,
   b) combine a plurality of water flow events into a local memory bank and subsequently schedule the transfer of the water flow event dataset to a remote computer or server, or to a cloud service company,
   c) directly transfer the water flow event to a remote computer or server, or to a cloud service company, or
   d) transfer the water flow data utilizing a blockchain format to one or more remote computers or servers, or cloud service company.

17. A water meter and leak detection system as recited in claim 1 further comprising an acoustic sensor that monitors vibration frequencies from water use device control valves and identifying the particular water control valves fixtures or appliances while monitoring for water leaks.

18. A water meter and leak detection system as recited in claim 1, wherein an owner or user can communicate with at least one of a smart phone, computer, server, tablet, web portal and one or more other electronic communication devices that includes a software program application capable of displaying an icon, menu, or submenu at least one function of:
   (d) providing a graphical display of at least one of water use history, water energy usage history, and water quality history from a selected water fixture or water appliance, said history transferred from at least one of said base station, said remote central computer and the cloud service provider or web-based computer;
   (e) displaying an alarm condition based on one of said water use history, water energy usage history, or water quality history programmed into said base station;
   (f) turning on, or off the water supply by sending a command signal transferred to the base station;
   (e) showing or modifying a program, setting, or a default menu incorporated within the base station;
   (h) Specifying the water control valve mechanism operational position by sending a request to the base station;
   (i) downloading updates or regional water rates into the base station; and
   (j) programming a vacation or work water schedule into the base station.

19. A water meter and leak detection system as recited in claim 1, further comprising that the one or more wireless communication technologies capable of transferring to the internet water use data, water energy use data, water quality data, detecting leak conditions, and sending a control signal utilizing block chain technology.

20. A water meter and leak detection system as recited in claim 1, further comprising wherein the CPU, microprocessor, or microcontroller with the electrical circuitry including one or more wireless communication technologies can enter into one or more sleep modes when not transmitting water data, not detection a water leak condition receiving commands or instructions or are between water flow events.

21. A water meter and leak detection system as recited in claim 1, further comprising the base station can either 1) recording to least one of a memory bank, removable memory bank, and local network at least one of a water flow water event, transmitting water data, detecting a water leak condition, and receiving a command or instruction, or 2) can transmit at least one of a water flow water event, transmit water data, detect water leak condition, and receiving a command or instruction utilizing at least one of an internet connection, a private network system, and a corporate owned network system that communicates with at least one of a remote computer or server, a commercial cloud-service company, and a web-based computer company.

22. A water meter and leak detection system comprising:
   a collection node having a water control mechanism interposed between a main water supply line and a water supply for a building or structure;
   said collection node further comprising;
      a) a first electrical circuitry including at least one of a first CPU, microprocessor, and microcontroller with a first integrated memory or separate memory module, and a first power source;
      b) said collection node having one or more flow rate sensors designed to monitor at least one of a water use data, water energy use data, water quality data and leak detection information from said building or structure, said one or more flow rate sensors connected to the main water supply and connected with said first electrical circuitry;
      c) the first power source is at least one of an AC powered, DC powered, and one or more standard or rechargeable batteries, said rechargeable batteries capable of being supplemented with a turbine or other rotational mechanism that generates electrical energy, said power source is electrically connected to said electrical circuitry;
      d) the at least one of a first CPU, microprocessor, or microcontrollers that is monitoring at least one of a water use data, water energy use data, water quality data, and detecting leak conditions is further capable of transmitting a water flow event data using one or more first wireless communication technologies;
      e) one or more first wireless communication technologies comprising at least one of LoRa, Sigfox, WiMAX, Ultra Narrow Band, 6LowPAN, NB-IoT, LTE-M cellular, and 5G cellular technology; and
      f) wherein said one or more first wireless communication technologies utilizes authentication and encryption technologies for pairing operations and to prevent unauthorized access to the water use data or information;
   wherein when the CPU, microprocessor, or microcontroller with one or more flow rate sensors detects the initiation of water flow, the CPU, microprocessor or microcontroller instructs the water sensor to increase the sampling rate at a sufficient frequency capable to monitor at least one or more water flow rates, one or more water use durations and one or more total volume of water uses until water flow stops defining a water flow event;
   wherein the first CPU, microprocessor, or microcontroller transfers the water flow event by wired. or wireless communication technology to one or more remote communication hubs;
   wherein the one or more communication hubs having one or more wireless communication technology that corresponds to the one or more first wireless communication technology, wherein the one or more communication hubs function to extend the range of wireless technology;
   the one or more communication hubs having a second electrical circuitry including at least one of a second CPU, microprocessor, and microcontroller, a second integrated memory or separate memory module, and a second power source;

wherein the electrical circuitry has programmed instructions processing the water flow data from the long-range first wireless radio into a second wireless radio that communicates with at least one of a wireless router, or another RF technology or cellular radio that communicates with a private or public corporate network;

the one or more communication hubs can have at least one of Wi-Fi wireless technology or radio that communicates with a wireless router connected to the internet or network system and a wired connection that communicates with a router, internet or network connection;

the second CPU, microprocessor or microcontroller can at least include one of a programming setting managed by the user, remotely a mode setting, and a default or restricted setting processed by the manufacturing factory to:

a) record the water flow event to a local memory bank or removable device for regional or controlled analysis, b) combine a plurality of water flow events into a local memory bank and subsequently schedule the transfer of the water flow event dataset to a remote computer or server, to a cloud service company, c) directly transfer the water flow event to a remote computer or server, or to a cloud service company, or d) transfer the water flow data utilizing a blockchain format to one or more remote computers or servers, or cloud service company, and the communication hub can either use the water flow event to locally process, or transfer to a remote computer, the method of utilizing software instructions, algorithms, and artificial intelligence technology for analyzing water signatures and patterns for identifying water devices, fixtures, and appliances and for providing analytical detection of leak conditions.

23. The water meter and leak detection system as recited in claim 22, wherein said one or more wireless communication technologies interface with remote computers or servers utilizing an application programming interface (REST-API or SOAP-API) technology.

24. The water meter and leak detection system as recited in claim 22, wherein said one or more standard or rechargeable batteries comprises standard or rechargeable lithium batteries, $LiSOCl_2$ bobbin or serial batteries, lithium metal, lithium-air, solid state lithium, lithium sulfur, sodium-ion or $LiSOCl_2$ bobbin with hybrid super capacitor.

25. The water meter and leak detection system as recited in claim 22, wherein the other electronic communication devices include at least one of a PDA, tablet, computer, a smart or internet capable television, wireless smartwatch, and other electronic apparatuses with Wi-Fi and wireless capability.

26. The water meter and leak detection system as recited in claim 22, further including at least one of a mesh and peer-to-peer technology circuitry that can communicate with at least one of another water meter collection nodes and communication hubs.

27. The water meter and leak detection system as recited in claim 22, transmitting at least one of a water use data, water energy use data, water quality data, and leak detection information initiated by a command signal from at least one of said smart phone, computer, server, tablet, web portal, and other electronic communication technology devices.

28. The water meter and leak detection system as recited in claim 22, wherein the collection node or communication hub can locally store data, or said remote computers can store data such that water use, water energy use, and/or water quality recorded on at least of one of an hourly, daily, weekly, monthly and yearly basis that is available for review for specified individuals or agencies.

29. The water meter and leak detection system as recited in claim 22, wherein the leak information can provide the registered owners and users a warning or signal on at least one of a smart phone, computer, server, tablet, web portal, and other electronic communication devices when a leak condition is observed, wherein said registered owners and users can be provided a number of corrective selections that comprise at least one of the ability to remotely turn off the main water system and contact an individual by phone call, text, or email for initiating corrective actions.

30. The water meter and leak detection system as recited in claim 22, further comprising a temperature sensor in close proximity to said water supply, said temperature sensor can communicate with said water meter and leak detection system and initiate water freezing protection procedures when the water supply line approaches the water freezing point of 32 degrees Fahrenheit or 0 degrees Celsius, such freezing procedures can include at least one of incorporating a freeze plug mechanism, draining the distribution lines with a three way valve, replacing the water in the water line with air, nitrogen or other gas or liquid having a low freezing point.

31. The water meter and leak detection system as recited in claim 30, wherein said water meter and leak detection system, can send a freezing warning message on at least one of a smart phone, computer, server, table, web portal, and other electronic communication devices when said freezing condition exists.

32. The water meter and leak detection system as recited in claim 22, utilizing programming instructions to turn off the water control valve mechanism and water supply during a vacation schedule or work schedule using a software program application associated with at least one of a smart phone, computer, server, tablet, web portal, and other electronic communication devices.

33. The water meter and leak detection system as recited in claim 22, further comprising at least one of a pressure sensor and an acoustic sensor wherein said at least one of a pressure sensor and an acoustic sensor supplies data for software instructions and artificial intelligence algorithms for detecting water patterns and signatures of fixtures and appliances and leak conditions.

34. A water meter and leak detection system as recited in claim 33, wherein said pressure sensor is capable of quantifying a leak condition when the water meter closes the water control valve mechanism and monitors any pressure changes and is capable of transferring pressure monitoring information to the base station for making one or more software calculations to determine the leak type or leak category.

35. The water meter and leak detection system as recited in claim 22, is capable have a further comprising second wireless communication technology utilizing at least of one of a Bluetooth, Bluetooth low energy, Zigbee, Z-wave and Wi-Fi wireless technology for performing an authentication pairing procedure to initially establishing remote wireless communications by inputting a network user name and a password, scan a QR code or perform a two-step authentication scheme.

36. The water meter and leak detection system as recited in claim 22, wherein when said monitoring indicates a leak condition, a message or signal is sent to at least one of a smart phone, computer, server, tablet, web portal, and other electronic communication device allowing the user to turn off the water control valve mechanism or program the water meter and leak detection system to automatically turn off the water control valve mechanism.

37. A water meter and leak detection system as recited in claim 22, further comprising a wired communication technologies comprising at least one of a X10, UPB, and HART technologies.

38. A water meter and leak detection system as recited in claim 22, wherein owner or user can communicate with at least one of a smart phone, computer, server, tablet, web portal and one or more other electronic communication devices that includes a software program application capable of displaying an icon, menu, or submenu at least one function of:
  (g) providing a graphical display of at least one of water use history, water energy usage history, and water quality history from a selected water fixture or water appliance, said history transferred from at least one of said base station, said remote central computer and the cloud service provider or web-based computer;
  (h) displaying an alarm condition based on one of said water use history, water energy usage history, or water quality history programmed into said base station;
  (i) turning on or off the water supply by sending a command signal transferred to the base station;
  (f) showing or modifying a program, setting, or a default menu incorporated within the base station;
  (k) Specifying the water control, valve mechanism operational position by sending a request to the base station;
  (1) downloading updates or regional water rates into the base station; and
  (m) programming a vacation or work water schedule into the base station.

39. A water meter and leak detection system as recited in claim 22, further comprising that the one or more wireless communication technologies capable of transferring to the internet water use data, water energy use data, water quality data, detecting leak conditions, and sending a control signal utilizing block chain technology.

40. A water meter and leak detection system as recited in claim 22, further comprising wherein the first CPU, microprocessor, or microcontroller with the first electrical circuitry including one or more first wireless communication technologies can enter into one or more sleep modes when not transmitting water data, not detection a water leak condition, receiving commands or instructions or are between water flow events.

41. A water meter and leak detection system as recited in claim 22, further comprising that the one or more communication hubs can at least one of a 1) recording to least one of a memory bank, removable memory bank, and local network at least one of a water flow water event, transmitting water data, detecting a water leak condition, and receiving a command or instruction, or 2) can transmit at least one of a water flow water event, transmit water data, detect water leak condition and receiving a command or instruction utilizing at least one of an internet connection, a private network system, and a corporate owned network system that communicates with at least one of a remote computer or server, a commercial cloud-service company, and a web-based computer company.

42. A water meter and leak detection system comprising:
a base station having a water control mechanism interposed between a main water supply line and a water supply for a building or structure;
said base station further comprising;
  a) electrical circuitry including at least one of a CPU, microprocessor and microcontroller with a power source;
  b) one or more flow rate sensor connected to the main water supply and connected to said electrical circuitry and designed to monitor at least one of a water use data, water energy use data, water quality data and leak detection information from said building or structure, said one or more flow rate sensors connected to the main water supply and connected with said electrical circuitry;
  c) said power source that is at least one of an AC powered, DC powered, and one or more standard or rechargeable batteries, said rechargeable batteries capable of being supplemented with a turbine or other rotational mechanism that generates electrical energy said power source is electrically connected to said electrical circuitry;
  d) one or more wireless communication technologies comprising at least one of a LoRa, Sigfox, Ultra Narrow Band 6LowPAN, NB-IoT, LTE-M cellular, and 5G cellular technology;
  e) wherein said one or more wireless communication technologies utilizes authentication and encryption technologies for pairing operations and to prevent unauthorized access to the water data or information; and
  f) wherein the long-range LoRa, Sigfox, UNB, NB-IoT, 6LoWPAN, WiMAX, cellular technology 3GPP and LTE-M and 5G consist of a duplex technology to both receive at least one of a water use data, water energy use data, water quality data and leak detection information and send commands to regulate the control valve mechanism
the CPU, microprocessor or microcontroller can at least include one of a programming setting managed by the user, remotely a mode setting, and a default or restricted setting processed by the manufacturing factory to:
  a) record the water flow event to a local memory bank or removable memory device for regional or controlled analysis,
  b) combine a plurality of water low events into a local memory bank and subsequently schedule the transfer of the water flow event dataset to a remote computer or server, or to a cloud service company,
  c) directly transfer the water .flow event to a remote computer or server, or to a cloud service company, or
  d) transfer the water flow data utilizing a blockchain format to one or more remote computers or servers, or cloud service company; and
the one or more wireless communication technologies capable of transmitting at least one of a 1) water use data, water energy use data, water quality data and leak detection information and, 2) obtains an instruction or signal to command the management of the water control valve or perform a command operation, using at least one of an Internet connection, a private network system, and a corporate owned network system, and a smart phone, computer, server, tablet, web portal, and other electronic communication device, that communicates with at least one of a remote computer or server, a commercial cloud-company, and a web-based company.

43. A water meter and leak detection system as recited in claim 42, further comprising a temperature sensor in close proximity to said water supply, said temperature sensor can communicate with said water meter and leak detection system and initiate water freezing protection procedures when the water supply line approaches the water freezing point of 32 degrees Fahrenheit or 0 degrees Celsius, such freezing procedures can include at least one of incorporating a freeze plug mechanism, draining the distribution lines with a three way valve, replacing the water in the water line with air, nitrogen or other gas or liquid with low freezing point.

44. A water meter and leak detection system as recited in claim 42, further comprising at least one of a pressure sensor and an acoustic sensor are capable of quantifying a leak condition when the water meter closes the water control valve mechanism and monitors any pressure changes and is capable of transferring pressure monitoring information to the base station for making one or more software calculations to determine the leak type or leak category.

45. A water meter and leak detection system as recited in claim 42 further comprising one or more communication hubs is in wired communication with the base station or having a wireless communication technologies corresponding with the one or more wireless communication technologies of the base station that transfers water use data, water energy use data, water quality data or a leak detection condition to at least one of an Internet connection, private network system, and corporate owned network system that communicates with at least one of a remote computer or server, a commercial cloud-company and a web-based company.

46. A water meter and leak detection system as recited in claim 42, is capable have a further comprising second wireless communication technology utilizing at least of one of a Bluetooth, Bluetooth low energy, and Wi-Fi wireless technologies for performing an authentication pairing procedure to initially establishing remote wireless communications by inputting a network username and a password, scan a QR code or perform a two-step authentication scheme.

47. A water meter and leak detection system as recited in claim 42, wherein an owner or user can communicate with at least one of a smart phone, computer, server, tablet, web portal and one or more other electronic communication devices that includes a software program application capable of displaying an icon, menu, or submenu at least one function of:

(a) providing a graphical display of at least one of water use history, water energy usage history, and water quality history from a selected water fixture or water appliance, said history transferred from at least one of said base station, said remote central computer and the cloud service provider or web-based computer;

(b) displaying an alarm condition based on one of said water use history, water energy usage history, or water quality history programmed into said base station;

(c) turning on or off the water supply by sending a command signal transferred to the base station;

(d) showing or modifying a program, setting, or a default menu incorporated within the base station;

(e) Specifying the water control valve mechanism operational position by sending a request to the base station;

(f) downloading updates or regional water rates into the base station; and (g) programming a vacation or work water schedule into the base station.

48. A water meter and leak detection system as recited in claim 42, wherein one of collection nodes are capable of including at least one of a mesh and/or and peer-to-peer technology circuitry that can communicate with at least one of another water meter collection nodes and communication hubs.

49. A water meter and leak detection system as recited in claim 42, wherein one of more communication hubs are capable of including at least one of a mesh and/or and peer-to-peer technology circuitry that can communicate with at least one of another water meter collection nodes and communication hubs.

50. A water meter and leak detection system as recited in claim 42, further comprising one or more wired communication technology comprising at least one of a X10, UPB, and HART technology.

51. A water meter and leak detection system as recited in claim 42, further comprising that the one or more wireless communication technologies capable of transferring to the internet water use data, water energy use data, water quality data, detecting leak conditions, and sending a control signal utilizing block chain technology.

* * * * *

UNITED STATES PATENT AND TRADEMARK OFFICE
CERTIFICATE OF CORRECTION

Page 1 of 5

PATENT NO. : 11,549,837 B2
APPLICATION NO. : 16/356870
DATED : January 10, 2023
INVENTOR(S) : Michael Klicpera It is certified that error appears in the above-identified patent and that said Letters Patent is hereby corrected as shown below:

In the Specification

Replace Column 1, Lines 26-39 as follows:
Water is increasingly becoming a precious resource. While freshwater supplies have been challenged due to climate (short rainy seasons and long droughts) and increased pollution, water demand has been rising due to the growing population along with increased development. The increasingly limited supply of fresh water is a humanitarian concern and water conservation is becoming a major issue for many communities. An apparatus for real-time monitoring of water use and real-time detection of leak conditions at private and/or public property(ies) (e.g., residential structures and yards, business/industrial/commercial facilities, and utilities/governmental/institutional sites) can be useful in assessing and controlling water resources and supporting water conservation.

Replace Column 7, Lines 13-18 as follows:
In the water meter environment, non-repudiation refers to the technology that confirms or ensures and prevents a sender or receiver from denying that a message(s), control/command signal(s), data, and/or information was sent or received. Blockchain technology is an upcoming technology that will ensure non-repudiation compliance.

Replace Column 23, Lines 20-46 as follows:
In the water meter environment, non-repudiation refers to the technology that confirms or ensures and prevents a sender or receiver from denying that a message(s), control/command signal(s), data, and/or information was sent or received. Blockchain technology is an upcoming technology that will ensure non-repudiation compliance.

Replace Column 25, Lines 28-58 as follows:
Several current security techniques that utilize public key cryptography are the Public Key Infrastructure (PKI), the Public Key Encryption (PKE) and the Digital Signature protocols. PKI enables digital certificates to be used to electronically identify an individual or an organization. A PKI requires a certificate authority (CA) that issues and verifies digital certificates and can utilize a registration authority (RA) that acts as the verifier of the CA when a new digital certificate is issued.

Signed and Sealed this
Fifteenth Day of October, 2024

Katherine Kelly Vidal
*Director of the United States Patent and Trademark Office*

PKE is a message or command signal that is encrypted with a recipient's public key. The message cannot be decrypted by any individual or machine that does not possess the matching private key. PKE is a security protocol that is used to maintain confidentiality, Similarly, Digital signatures are also utilized with key pair technology, in association with authentication, integrity and non-repudiation confidentiality techniques. In practice, when a user transmits a message or signal or data with a digital signature, the message or signal includes a one-way hash prior to transmission, and the recipient uses the sender's public key to decrypt the hash and verify the digital signature. PKI, PKE, and digital signers are currently being supplemented with two factor authentication that utilizes a confirmation protocol after password input with a follow up email, phone call, or utilizing a authenticator number scheme. Furthermore, the PKI, PKE and digital signature techniques might become archaic when blockchain technology becomes more generally adopted.

Replace Column 26, Lines 23-40 as follows:
Encryption, authentication, integrity and non-repudiation or blockchain may be important characteristics when the water meter and leak detection system 10 (126 shown in FIGS. 6 and 200 shown in FIG. 7 ) is transferring water use or water quality data or information to a remote server/database via a public or private network that provide wireless subsequent access to registered computers and cell, smart and mobile phones 400. When the water mater and leak detection system 10 (126 shown in FIGS. 6 and 200 shown in FIG. 7 ) receives or uploads data and information such as a control command signal to send or transmit data and information it is critical that the device can authenticate the sender and be sure of the integrity of the data and information. Encryption provides privacy by converting the data or information into an "encrypted" code to prevent unauthorized access. Encryption can be provided point-to-point, or end-to-end, and transmit messages using encryption schemes such as Pretty Good Privacy (PGP), Secure/Multipurpose Internet Email (S/MIME), XML, or SSL encryption protocols. Non-repudiation prevents the sender from denying that they sent or received data/information or a message. Non-repudiation can be provided by signing, electronic witnessing and technologies that assert a document was read before it was signed. One of the main advantages of the blockchain technology is that non-repudiation is nearly immutable. Here, the water meter and leak detection system 10 (126 shown in FIGS. 6 and 200 shown in FIG. 7 ) can include digital signature technology, data packets or messages using PGP, S/MIE, XML and Digital Signature, TLS/SSL and two-step authentication to provide for non-repudiation of those messages, information or data.

Replace Column 44, Lines 46-58 as follows:
FIG. 11 shows an example of an application or page (APP) 300 for Water Use 302 having a daily 304 graph 306 with day hours 308, designated by the symbol AM 312 and the night hours 310 designated by the symbol PM 314. At the right side of the example application or page (APP) 300 is the daily total use of water 316 and the daily total cost in dollars (or other currency) 318 the weekly total use of water 326 and the weekly total cost in dollars 328, and the monthly total use of water 336 and the monthly total cost in dollars 338 by year 334 per regional water rates that has been downloaded the data 340 from the registered or serving water municipality. Within the daily graph 306 is a plotted Line 307 that shows the hourly water use. The plotted Line 307 can have a rolling feature whereby new data replaces the oldest data in the graph. A gallon or liter scale can be included on the left side of the daily graph 305 (not shown).

CERTIFICATE OF CORRECTION (continued)

U.S. Pat. No. 11,549,837 B2

In the Claims

Replace Column 60, Line 1-Column 62, Lines 1-46 as follows:
42. A water meter and leak detection system comprising:
a base station having a water control valve mechanism interposed between a main water source and a water supply line for a building or a structure;
the base station further comprising:
a) an electrical circuitry including at least one of a CPU, a microprocessor, or a microcontroller, or any combination thereof;
b) one or more flow rate sensors connected to the water supply line and designed to monitor at least one of a water use data, a water energy use data, a water quality data, or a leak detection information, or any combination thereof, from the building or the structure, the one or more flow rate sensors connected with the electrical circuitry;
c) a power source that is at least one of an AC powered, a DC powered, or a one or more standard or rechargeable batteries, or any combination thereof, the rechargeable batteries capable of being supplemented with a turbine or other rotational mechanism that generates electrical energy, the power source is electrically connected to the electrical circuitry;
d) one or more wireless communication technologies comprising at least one of a LoRa, a Sigfox, an Ultra Narrow Band (UNB), a 6LoWPAN, a WiMAX, a NB-IoT, a 3GPP cellular, a 4G/LTE-M cellular, or a 5G cellular technology, or any combination thereof;
e) wherein the one or more wireless communication technologies utilizes authentication and encryption technologies for pairing operations and to prevent unauthorized access to a water data or information; and
f) wherein the one or more wireless communication technologies comprising at least one of the LoRa, the Sigfox, the Ultra Narrow Band (UNB), the 6LoWPAN, the WiMAX, the NB-IoT, the 3GPP cellular, the 4G/LTE-M cellular, or the 5G cellular technology, or any combination thereof, consists of a duplex technology to transmit the water use data, the water energy use data, the water quality data, or the leak detection information, or any combination thereof, and send commands to regulate the water control valve mechanism;
the CPU, the microprocessor, or the microcontroller, or any combination thereof, includes at least one of a programming setting managed by a user to remotely set a mode setting or modify a default setting processed by a manufacturer to:
a) record a water flow event to an integrated memory bank or a removable memory device for analysis;
b) combine a plurality of water flow events into the integrated memory bank and subsequently schedule the transfer of the water flow events to a one or more remote computers or servers or to a cloud computing company;
c) transfer the water flow event to the one or more remote computers or servers or to the cloud computing company;
d) transfer the water data or information utilizing a blockchain technology to the one or more remote computers or servers or to the cloud computing company;
e) modify water units or timing units;
f) establish alarm set points;
or any combination thereof; and
the one or more wireless communication technologies configured to:

(i) transmit at least one of the water use data, the water energy use data, the water quality data, or the leak detection information, or any combination thereof, to the one or more remote computers or servers or to the cloud computing company; and (ii) receive an instruction or signal to command the management of the water control valve mechanism or perform another command operation;

using at least one of an Internet connection, a private network system, or a corporate owned network system that communicates with a smart phone, a computer, a server, a tablet, a web portal, or another electronic communication device.

43. A water meter and leak detection system as recited in claim 42, further comprising a temperature sensor in close proximity to the water supply line, the temperature sensor communicates with the water meter and leak detection system and initiates a water freezing protection procedure when the water supply line approaches a water freezing point of 32 degrees Fahrenheit or 0 degrees Celsius, the freezing protection procedure includes at least one of incorporating a freeze plug mechanism, draining water distribution lines with a three-way valve, or replacing water in the water supply line with an air, a nitrogen, or another gas or a liquid with low freezing point.

44. A water meter and leak detection system as recited in claim 42, further comprising at least one of a pressure sensor or an acoustic sensor configurable to quantify a leak condition when the water meter and leak detection system closes the water control valve mechanism by monitoring pressure changes and capable of transferring monitored pressure or acoustic information to the base station for making a one or more software calculations to determine a leak type or a leak category.

45. A water meter and leak detection system as recited in claim 42, further comprising one or more communication hubs in wired communication with the base station or having a wireless communication technology corresponding with the one or more wireless communication technologies of the base station, wherein the one or more communication hubs transfers the water use data, the water energy use data, the water quality data, or the leak detection information, or any combination thereof, to at least one of the Internet connection, the private network system, or the corporate owned network system that communicates with company the one or more remote computers or servers or with the cloud computing company.

46. A water meter and leak detection system as recited in claim 42, further comprising a second wireless communication technology utilizing at least of one of a Bluetooth, a Bluetooth low energy, or a Wi-Fi wireless technology for performing an authentication pairing procedure to initially establish remote wireless communications by inputting a network username and a password, scanning a QR code, or performing a two-step authentication scheme, or any combination thereof.

47. A water meter and leak detection system as recited in claim 42, wherein an owner or the user communicates with at least one of the smart phone, the computer, the server, the tablet, the web portal, or the other electronic communication device that includes a software program displaying an icon, a menu, or a submenu that provides at least one function of:

(a) providing a graphical display of at least one of the water use data, the water energy use data, or the water quality data, or any combination thereof, from a selected water fixture or a water appliance, the water data or information transferred from at least one of the base station, a remote central computer, or the cloud computing company;

(b) displaying an alarm condition based on one of the water use data, the water energy use data, or the water quality data, or any combination thereof, and programmed into the base station;

(c) turning on or off a water supply by sending a command signal to the base station;

(d) showing or modifying the software program, a setting, or a default menu included within the base station;

(e) identifying an operational position of the water control valve mechanism by sending a request to the base station;
(f) downloading updates or regional water rates into the base station; or
(g) programming a vacation or work water schedule into the base station.

48. A water meter and leak detection system as recited in claim 45, wherein the base station includes at least one of a mesh or a peer-to-peer technology circuitry that communicates with a one or more base stations or the one or more communication hubs.

49. A water meter and leak detection system as recited in claim 45, wherein the one or more communication hubs includes at least one of a mesh or a peer-to-peer technology circuitry that communicates with a one or more base stations.

50. A water meter and leak detection system as recited in claim 42, further comprising a one or more wired communication technology comprising at least one of a an X10, an UPB, or a HART technology.

51. A water meter and leak detection system as recited in claim 42, wherein the one or more wireless communication technologies transfers to the Internet, the water use data, the water energy use data, the water quality data, or the leak detection information, or any combination thereof, and transmits a control signal utilizing the blockchain technology.